(12) United States Patent
McManus et al.

(10) Patent No.: US 12,503,855 B2
(45) Date of Patent: Dec. 23, 2025

(54) PEDESTAL AND SUPPORT STRUCTURE FOR TILE

(71) Applicant: MBRICO, LLC, Bettendorf, IA (US)

(72) Inventors: Mark A. McManus, Bettendorf, IA (US); Jason McManus, Bettendorf, IA (US)

(73) Assignee: MBRICO, LLC, Bettendorf, IA (US)

( * ) Notice: Subject to any disclaimer, the term of this patent is extended or adjusted under 35 U.S.C. 154(b) by 0 days.

(21) Appl. No.: 18/653,120

(22) Filed: May 2, 2024

(65) Prior Publication Data

US 2024/0360671 A1    Oct. 31, 2024

Related U.S. Application Data

(63) Continuation of application No. 17/841,319, filed on Jun. 15, 2022, and a continuation-in-part of (Continued)

(51) Int. Cl.
*E04D 1/34* (2006.01)
*E04B 5/02* (2006.01)
(Continued)

(52) U.S. Cl.
CPC ............... *E04D 1/34* (2013.01); *E04B 5/023* (2013.01); *E04D 11/007* (2013.01);
(Continued)

(58) Field of Classification Search
CPC . E04D 1/34; E04D 12/004; E04D 2001/3447; E04B 5/023; E04B 5/10;
(Continued)

(56) References Cited

U.S. PATENT DOCUMENTS 94,493 A * 9/1869 Hinkley ................ C08L 93/04
428/150
96,060 A  10/1869 Wallace
(Continued)

FOREIGN PATENT DOCUMENTS

DE    3405755 A1   12/1985
DE   19609115 A1    9/1997
(Continued)

OTHER PUBLICATIONS

PCT/US2016/058511 International Search Report and Written Opinion, Apr. 13, 2017.

*Primary Examiner* — Brian D Mattei
*Assistant Examiner* — Joseph J. Sadlon
(74) *Attorney, Agent, or Firm* — Charles A. Damschen; BrownWinick Law Firm

(57) ABSTRACT

A support structure configured for attachment to a pedestal upper surface with a support structure spine extending upward from the support structure; a first support structure rail and second support structure rail each extending perpendicularly outward from the support structure spine. A tile comprising a groove formed in at least one of the plurality of side edges; wherein the groove of the at least one of the plurality of edges of the tile is configured for engagement by the first support structure rail of the support structure.

21 Claims, 67 Drawing Sheets

Related U.S. Application Data application No. 16/793,607, filed on Feb. 18, 2020, now Pat. No. 11,371,245, which is a continuation-in-part of application No. 15/881,490, filed on Jan. 26, 2018, now Pat. No. 10,934,714, which is a continuation of application No. 15/332,700, filed on Oct. 24, 2016, now Pat. No. 10,041,254, which is a continuation-in-part of application No. 14/841,211, filed on Aug. 31, 2015, now Pat. No. 9,702,145, which is a continuation of application No. 14/524,431, filed on Oct. 27, 2014, now Pat. No. 9,151,063.

(60) Provisional application No. 63/210,707, filed on Jun. 15, 2021, provisional application No. 62/806,404, filed on Feb. 15, 2019, provisional application No. 62/394,705, filed on Sep. 14, 2016, provisional application No. 62/331,004, filed on May 3, 2016, provisional application No. 62/245,130, filed on Oct. 22, 2015, provisional application No. 61/895,930, filed on Oct. 25, 2013.

(51) Int. Cl.
  *E04D 11/00* (2006.01)
  *E04F 15/02* (2006.01)
  *E04F 15/08* (2006.01)
  *E04B 5/10* (2006.01)
  *E04B 5/12* (2006.01)
  *E04D 12/00* (2006.01)
  *E04D 13/12* (2006.01)

(52) U.S. Cl.
  CPC .. *E04F 15/02005* (2013.01); *E04F 15/02044* (2013.01); *E04F 15/02183* (2013.01); *E04F 15/08* (2013.01); *E04F 15/082* (2013.01); *E04B 5/10* (2013.01); *E04B 5/12* (2013.01); *E04D 2001/3447* (2013.01); *E04D 12/004* (2013.01); *E04F 2015/0205* (2013.01); *E04F 2015/02061* (2013.01); *E04F 2015/02094* (2013.01)

(58) Field of Classification Search
  CPC ............. E04B 5/12; E04F 15/02005; E04F 15/02044; E04F 15/02183; E04F 15/08; E04F 15/082; E04F 2015/0205; E04F 2015/02061; E04F 2015/02094
  USPC ........................................... 52/126.7
  See application file for complete search history.

(56) References Cited

U.S. PATENT DOCUMENTS

| | | | |
|---|---|---|---|
| 240,729 A | 4/1881 | Jones | |
| 776,419 A * | 11/1904 | Platt | E04D 11/005 52/603 |
| 1,395,423 A | 11/1921 | Richard | |
| 1,399,088 A | 12/1921 | William | |
| RE16,416 E | 9/1926 | Whittaker | |
| 1,897,338 A | 2/1933 | Seaton | |
| 2,033,404 A | 3/1936 | Charles | |
| 2,063,457 A | 12/1936 | Nold et al. | |
| 2,084,853 A * | 6/1937 | Marks | E04B 5/10 52/364 |
| 2,129,976 A | 9/1938 | Urbain et al. | |
| 2,183,450 A | 12/1939 | Domenico | |
| 2,382,761 A | 8/1945 | Wilks | |
| 2,665,104 A | 1/1954 | Myers | |
| 2,807,063 A | 9/1957 | Berow | |
| 2,830,332 A | 4/1958 | Pawlowski | |
| 3,012,639 A | 12/1961 | Pavlecka | |
| 3,027,140 A | 3/1962 | Holzbach | |
| 3,061,055 A | 10/1962 | Nijhuis | |
| 3,065,506 A | 11/1962 | Tremer | |
| 3,180,460 A | 4/1965 | Liskey, Jr. | |
| 3,271,916 A | 9/1966 | Omholt | |
| 3,295,272 A | 1/1967 | Tomonobu | |
| 3,348,459 A | 10/1967 | Harvey | |
| 3,379,104 A | 4/1968 | Scholl | |
| 3,385,183 A | 5/1968 | Kortz | |
| 3,398,933 A | 8/1968 | Haroldson | |
| 3,435,574 A * | 4/1969 | Hallock | E04B 1/6803 404/69 |
| 3,443,350 A | 5/1969 | Birum, Jr. | |
| 3,487,756 A | 1/1970 | Glaza et al. | |
| 3,553,919 A | 1/1971 | Omholt | |
| 3,555,762 A | 1/1971 | Costanzo, Jr. | |
| 3,557,670 A | 1/1971 | Sutton | |
| 3,566,561 A | 3/1971 | Tozer | |
| 3,645,054 A | 2/1972 | Olvera | |
| 3,745,736 A | 7/1973 | Fischer et al. | |
| 3,751,865 A | 8/1973 | Brigham | |
| 3,757,485 A | 9/1973 | Vincens | |
| 3,784,312 A | 1/1974 | Gordon | |
| 3,840,908 A | 10/1974 | Greene | |
| 3,861,098 A * | 1/1975 | Schaub | E04D 11/005 52/263 |
| 3,902,215 A | 9/1975 | Waldrop et al. | |
| 3,909,145 A | 9/1975 | Ayer et al. | |
| 3,932,975 A | 1/1976 | Hodge | |
| 3,961,453 A | 6/1976 | Couwenbergs | |
| 3,979,866 A | 9/1976 | Prescott | |
| 4,020,605 A * | 5/1977 | Zenos | E04B 1/7612 165/137 |
| 4,024,683 A | 5/1977 | Kilian | |
| 4,067,161 A | 1/1978 | Rensch | |
| 4,077,334 A | 3/1978 | Svirklys | |
| 4,114,595 A | 9/1978 | Barker | |
| 4,220,378 A | 9/1980 | Bienek | |
| 4,266,381 A | 5/1981 | Deller | |
| 4,296,580 A | 10/1981 | Weinar | |
| 4,320,613 A | 3/1982 | Kaufman | |
| 4,322,927 A | 4/1982 | Scott | |
| 4,370,841 A * | 2/1983 | Hayashi | E04F 13/0891 52/464 |
| 4,395,858 A | 8/1983 | Gwyther | |
| 4,397,125 A | 8/1983 | Gussler, Jr. | |
| 4,400,925 A | 8/1983 | Van Loghem et al. | |
| 4,408,427 A | 10/1983 | Zilch | |
| 4,432,177 A | 2/1984 | Amesso et al. | |
| 4,467,586 A | 8/1984 | Long et al. | |
| 4,516,373 A | 5/1985 | Osawa | |
| 4,546,580 A * | 10/1985 | Ueno | E04F 15/02476 52/126.1 |
| 4,573,299 A | 3/1986 | Meroni | |
| 4,599,842 A * | 7/1986 | Counihan | E04F 13/0803 52/586.2 |
| 4,601,137 A | 7/1986 | Bates | |
| 4,603,528 A * | 8/1986 | Sigerist | E04F 13/0803 52/471 |
| 4,616,462 A | 10/1986 | Abendroth | |
| 4,624,084 A | 11/1986 | Esposito | |
| 4,648,231 A | 3/1987 | Laroche | |
| 4,716,704 A | 1/1988 | Murr | |
| 4,719,127 A | 1/1988 | Greenberg | |
| 4,719,727 A | 1/1988 | Cooper et al. | |
| 4,730,428 A * | 3/1988 | Head | E04B 5/026 52/309.11 |
| 4,736,555 A | 4/1988 | Nagare et al. | |
| 4,835,924 A | 6/1989 | Blacklin et al. | |
| 4,895,335 A | 1/1990 | Oliver | |
| 4,911,971 A | 3/1990 | McCue et al. | |
| RE33,220 E | 5/1990 | Collier | |
| 4,923,728 A | 5/1990 | Snedeker | |
| 4,947,610 A | 8/1990 | Koerner | |
| RE33,563 E | 4/1991 | Heckelsberg | |
| 5,050,361 A | 9/1991 | Hallsten | |
| D320,685 S | 10/1991 | Huang | |
| 5,083,410 A | 1/1992 | Watson | |
| 5,090,170 A | 2/1992 | Propst | |

(56) References Cited

U.S. PATENT DOCUMENTS

| | | | |
|---|---|---|---|
| 5,111,627 A | 5/1992 | Brown | |
| 5,205,942 A | 4/1993 | Fitzgerald | |
| 5,325,646 A | 7/1994 | Hallsten et al. | |
| 5,333,423 A | 8/1994 | Propst | |
| 5,361,554 A | 11/1994 | Bryan | |
| 5,390,468 A | 2/1995 | Probst | |
| 5,394,667 A | 3/1995 | Nystrom | |
| 5,396,734 A | 3/1995 | Frey | |
| 5,409,192 A | 4/1995 | Oliver | |
| 5,456,189 A | 10/1995 | Belle Isle | |
| 5,483,776 A | 1/1996 | Poppe | |
| 5,497,593 A | 3/1996 | Riesberg | |
| 5,501,754 A | 3/1996 | Hiraguri | |
| 5,553,427 A | 9/1996 | Andres | |
| 5,588,264 A | 12/1996 | Buzon | |
| 5,606,840 A | 3/1997 | Hase | |
| 5,623,803 A | 4/1997 | Willis | |
| 5,660,016 A | 8/1997 | Erwin et al. | |
| 5,694,727 A | 12/1997 | Dobija | |
| 5,729,948 A | 3/1998 | Levy et al. | |
| 5,758,467 A | 6/1998 | Snear et al. | |
| 5,765,329 A | 6/1998 | Huang | |
| 5,768,850 A | 6/1998 | Chen | |
| 5,775,048 A | 7/1998 | Orchard | |
| 5,778,621 A | 7/1998 | Randjelovic | |
| 5,782,053 A * | 7/1998 | Arntjen | E04D 12/004 52/204.5 |
| 5,806,897 A | 9/1998 | Nagai et al. | |
| 5,813,180 A | 9/1998 | Whitney et al. | |
| 5,829,216 A | 11/1998 | Newcomb et al. | |
| 5,840,078 A | 11/1998 | Yerys | |
| 5,850,720 A | 12/1998 | Willis | |
| 5,852,908 A | 12/1998 | Nankin | |
| 5,881,508 A | 3/1999 | Irvine et al. | |
| 5,906,082 A | 5/1999 | Counihan | |
| 5,913,784 A | 6/1999 | Hite | |
| 5,921,030 A | 7/1999 | Ducotey et al. | |
| 5,927,041 A | 7/1999 | Sedlmeier et al. | |
| 5,953,878 A | 9/1999 | Johnson | |
| 5,992,109 A | 11/1999 | Jonker | |
| 5,997,209 A * | 12/1999 | Sachs | E04F 15/04 52/480 |
| 6,044,598 A | 4/2000 | Elsasser et al. | |
| 6,050,034 A | 4/2000 | Krinner | |
| 6,098,363 A | 8/2000 | Yaguchi | |
| 6,122,873 A | 9/2000 | Randjelovic | |
| 6,170,212 B1 * | 1/2001 | Suchyna | E04F 15/10 52/471 |
| 6,189,289 B1 | 2/2001 | Quaglia et al. | |
| 6,199,340 B1 | 3/2001 | Davis | |
| 6,226,950 B1 | 5/2001 | Davis | |
| 6,233,886 B1 | 5/2001 | Andres | |
| 6,279,282 B1 | 8/2001 | Krionidis | |
| 6,314,699 B1 * | 11/2001 | West | E04F 15/10 52/489.1 |
| 6,338,229 B1 | 1/2002 | Botzen | |
| 6,363,674 B1 | 4/2002 | Carver | |
| 6,367,227 B1 | 4/2002 | Veyna | |
| 6,374,561 B1 | 4/2002 | Ishiko | |
| 6,385,942 B1 | 5/2002 | Grossman et al. | |
| 6,408,584 B1 | 6/2002 | Rodriguez | |
| 6,418,690 B1 * | 7/2002 | Wheatley | E04F 15/10 52/177 |
| 6,430,883 B1 | 8/2002 | Paz et al. | |
| 6,467,224 B1 | 10/2002 | Bertolini | |
| 6,470,641 B1 | 10/2002 | Faure | |
| 6,502,791 B2 | 1/2003 | Parker | |
| D470,039 S | 2/2003 | Pelc | |
| 6,540,432 B2 * | 4/2003 | Albanese | F16B 2/20 403/231 |
| 6,550,206 B2 | 4/2003 | Lee | |
| 6,584,745 B1 * | 7/2003 | Johansson | E04F 15/225 248/188.4 |
| 6,584,748 B2 | 7/2003 | Bresnahan | |
| 6,594,961 B2 | 7/2003 | Leines | |
| 6,694,691 B2 | 2/2004 | Ku | |
| 6,695,541 B1 | 2/2004 | Spence | |
| 6,711,864 B2 | 3/2004 | Erwin | |
| 6,729,097 B2 | 5/2004 | Patel et al. | |
| 6,799,398 B1 | 10/2004 | Plevyak | |
| 6,804,923 B1 | 10/2004 | Potter | |
| 6,810,633 B2 * | 11/2004 | Harris, Sr. | E04F 15/04 52/489.2 |
| 6,863,768 B2 | 3/2005 | Haffner et al. | |
| 6,871,467 B2 | 3/2005 | Hafner | |
| 6,883,287 B2 | 4/2005 | Niese et al. | |
| 6,901,715 B2 | 6/2005 | Brown et al. | |
| 6,941,715 B2 | 9/2005 | Potter | |
| 6,973,881 B2 | 12/2005 | Bianchi | |
| D522,147 S | 5/2006 | Morton et al. | |
| 7,047,697 B1 | 5/2006 | Heath | |
| 7,070,667 B1 | 7/2006 | Kirby | |
| 7,409,803 B2 | 8/2008 | Grohman | |
| 7,454,869 B2 | 11/2008 | Owen | |
| 7,478,504 B2 | 1/2009 | Huebner et al. | |
| 7,600,353 B2 | 10/2009 | Hafner | |
| 7,621,089 B2 | 11/2009 | Potter | |
| 7,640,705 B2 * | 1/2010 | Kornfalt | B32B 37/12 52/395 |
| 7,698,859 B2 | 4/2010 | Marti | |
| 7,730,693 B2 | 6/2010 | Schrotenboer | |
| 7,743,575 B2 | 6/2010 | Ito | |
| 7,793,471 B2 | 9/2010 | Hill | |
| 7,805,899 B2 | 10/2010 | Montgomery | |
| 7,805,902 B2 * | 10/2010 | Martel | E04F 15/10 52/489.1 |
| 7,818,925 B2 | 10/2010 | Benedict | |
| 7,836,659 B1 | 11/2010 | Barnes | |
| 7,908,812 B2 | 3/2011 | Eberle, III | |
| 7,958,688 B2 | 6/2011 | Llop et al. | |
| 7,984,599 B2 | 7/2011 | Snell et al. | |
| 8,002,943 B2 | 8/2011 | Brown et al. | |
| 8,006,458 B1 | 8/2011 | Olofsson | |
| 8,011,153 B2 * | 9/2011 | Orchard | E04F 15/02 52/489.1 |
| 8,056,303 B2 | 11/2011 | Frobosilo | |
| 8,066,464 B1 | 11/2011 | Van Dyke | |
| 8,087,206 B1 | 1/2012 | Worley et al. | |
| 8,122,612 B2 * | 2/2012 | Knight, III | E04F 15/02183 33/542 |
| 8,127,505 B2 | 3/2012 | Lu et al. | |
| 8,156,694 B2 | 4/2012 | Knight, III et al. | |
| 8,177,385 B2 | 5/2012 | Porciatti | |
| 8,191,321 B2 * | 6/2012 | McClellan | F24S 25/636 52/173.3 |
| 8,196,367 B2 | 6/2012 | Bray | |
| 8,225,581 B2 | 7/2012 | Strickland et al. | |
| D667,143 S | 9/2012 | Swanson | |
| 8,256,172 B2 | 9/2012 | Benson | |
| 8,297,004 B2 | 10/2012 | Knight, III et al. | |
| 8,302,356 B2 * | 11/2012 | Knight, III | E04F 15/02452 52/263 |
| 8,375,672 B2 | 2/2013 | Hannig | |
| 8,381,461 B2 | 2/2013 | Repasky | |
| 8,387,317 B2 | 3/2013 | Kugler et al. | |
| 8,453,402 B2 * | 6/2013 | Huang | E04B 2/96 52/656.5 |
| 8,464,488 B2 * | 6/2013 | Pelc, Jr. | E04F 15/02 403/231 |
| 8,468,766 B1 * | 6/2013 | Keenan | E04B 5/023 52/703 |
| 8,505,257 B2 | 8/2013 | Boo et al. | |
| 8,511,014 B2 | 8/2013 | Delforte | |
| 8,516,762 B1 | 8/2013 | Jendusa | |
| 8,522,505 B2 * | 9/2013 | Beach | E04B 5/023 403/92 |
| 8,522,559 B2 | 9/2013 | Grote et al. | |
| 8,578,674 B2 | 11/2013 | Ross | |
| D704,864 S | 5/2014 | Chang | |
| 8,733,037 B2 * | 5/2014 | Bindschedler | E04D 13/00 52/173.3 |
| 8,769,895 B2 | 7/2014 | Amend | |

(56) References Cited

U.S. PATENT DOCUMENTS

| | | | |
|---|---|---|---|
| 8,769,901 B2 | 7/2014 | Todd et al. | |
| 8,806,826 B2 | 8/2014 | Mann | |
| 8,844,243 B1 | 9/2014 | Gillman | |
| 8,869,481 B2 | 10/2014 | Dzigava | |
| 8,919,068 B2 * | 12/2014 | Wright | E04F 15/02183 |
| | | | 52/302.1 |
| 8,925,263 B2 | 1/2015 | Haddock et al. | |
| 8,943,765 B2 * | 2/2015 | Danning | F24S 25/20 |
| | | | 52/173.3 |
| 8,984,818 B2 | 3/2015 | McPheeters et al. | |
| D728,185 S | 4/2015 | Pelc et al. | |
| 9,010,068 B2 | 4/2015 | Sullivan et al. | |
| 9,097,005 B2 * | 8/2015 | Cave | E04B 5/12 |
| 9,109,367 B2 | 8/2015 | Plozner | |
| 9,151,063 B2 | 10/2015 | McManus | |
| 9,180,941 B1 | 11/2015 | Vandenworm | |
| 9,181,715 B2 * | 11/2015 | Orchard | E04F 15/02044 |
| 9,181,717 B1 | 11/2015 | Jamison | |
| 9,187,899 B2 | 11/2015 | Nam | |
| 9,290,889 B2 | 3/2016 | Choo | |
| 9,314,936 B2 | 4/2016 | Pervan | |
| 9,322,167 B2 * | 4/2016 | Campbell-Lloyd | E04F 15/04 |
| 9,340,973 B2 | 5/2016 | Carbary et al. | |
| 9,347,227 B2 | 5/2016 | Ramachandra et al. | |
| 9,359,770 B1 * | 6/2016 | Bilge | E04F 13/0812 |
| 9,382,715 B2 * | 7/2016 | Cottier | E04F 13/0826 |
| 9,410,296 B2 | 8/2016 | Tabibnia | |
| 9,413,286 B2 * | 8/2016 | Danning | F16B 33/002 |
| 9,435,113 B2 | 9/2016 | Brandt et al. | |
| 9,447,643 B2 | 9/2016 | Jack et al. | |
| 9,534,377 B2 | 1/2017 | Lee | |
| 9,551,158 B1 | 1/2017 | Leines | |
| 9,580,914 B2 * | 2/2017 | Fountain | E04B 5/023 |
| 9,624,677 B2 | 4/2017 | Wright | |
| 9,637,934 B2 | 5/2017 | Wadsworth | |
| 9,752,330 B2 | 9/2017 | Ohshima et al. | |
| 9,868,147 B2 | 1/2018 | Wadsworth | |
| 10,247,222 B2 | 4/2019 | Bertovic | |
| 10,407,903 B1 | 9/2019 | Smalley | |
| 10,415,191 B2 | 9/2019 | Tabibnia | |
| 10,605,288 B2 | 3/2020 | Martel et al. | |
| 10,760,283 B2 | 9/2020 | Carrubba | |
| 2002/0059766 A1 | 5/2002 | Gregori | |
| 2002/0078638 A1 | 6/2002 | Huang | |
| 2002/0148186 A1 * | 10/2002 | Kasten | E01C 5/001 |
| | | | 52/762 |
| 2003/0046895 A1 | 3/2003 | Haffner et al. | |
| 2003/0074853 A1 | 4/2003 | Potter | |
| 2003/0101673 A1 | 6/2003 | West et al. | |
| 2003/0154662 A1 | 8/2003 | Bruchu et al. | |
| 2003/0157274 A1 | 8/2003 | Guerri | |
| 2003/0188500 A1 | 10/2003 | Voegele | |
| 2004/0244325 A1 * | 12/2004 | Nelson | E04F 15/04 |
| | | | 52/582.1 |
| 2004/0261329 A1 | 12/2004 | Kugler et al. | |
| 2006/0059822 A1 * | 3/2006 | Guffey | F16B 12/125 |
| | | | 52/480 |
| 2006/0220276 A1 | 10/2006 | Giuliani | |
| 2007/0022693 A1 | 2/2007 | Ran | |
| 2007/0113511 A1 | 5/2007 | Greiner | |
| 2009/0019805 A1 * | 1/2009 | Zanelli | E04F 15/02 |
| | | | 52/489.1 |
| 2009/0107077 A1 | 4/2009 | Zhang | |
| 2009/0173018 A1 | 7/2009 | Buzon | |
| 2010/0058701 A1 * | 3/2010 | Yao | E04D 13/10 |
| | | | 52/749.12 |
| 2010/0218447 A1 | 9/2010 | Gehring | |
| 2010/0275531 A1 * | 11/2010 | Andrews | E04D 11/005 |
| | | | 52/173.1 |
| 2011/0315646 A1 | 12/2011 | Otsubo | |
| 2012/0047834 A1 | 3/2012 | Stal et al. | |
| 2012/0110944 A1 * | 5/2012 | Hess | E04F 15/02044 |
| | | | 29/525.08 |
| 2012/0151867 A1 | 6/2012 | Smith et al. | |
| 2012/0291369 A1 | 11/2012 | Knight, III et al. | |
| 2013/0205703 A1 | 8/2013 | Baumer | |
| 2013/0283710 A1 | 10/2013 | Laurin et al. | |
| 2014/0007525 A1 | 1/2014 | Wright | |
| 2014/0349084 A1 | 11/2014 | Patki et al. | |
| 2015/0007872 A1 * | 1/2015 | Cap | F24S 25/50 |
| | | | 136/251 |
| 2015/0275500 A1 | 10/2015 | Dalla et al. | |

FOREIGN PATENT DOCUMENTS

| | | | | |
|---|---|---|---|---|
| DE | 102009037569 A1 | | 2/2011 | |
| DE | 102011101567 A1 | * | 11/2012 | E04F 15/02044 |
| DE | 202013102695 U1 | | 7/2013 | |
| EP | 0890689 A2 | * | 1/1999 | E04F 15/02183 |
| EP | 2669444 A2 | | 12/2013 | |
| FR | 2761095 A1 | | 9/1998 | |
| FR | 2950371 B1 | * | 12/2011 | E04F 15/02044 |
| GB | 662763 A | * | 12/1951 | |
| GB | 2348894 A | | 10/2000 | |
| GB | 2371609 A | | 7/2002 | |
| GB | 2508810 A | * | 6/2014 | E04C 2/40 |
| JP | 4238954 A | | 8/1992 | |
| JP | 2008508451 A | * | 3/2008 | E04F 15/02044 |
| JP | 2008240417 A | | 10/2008 | |
| JP | 2008285953 A | * | 11/2008 | |
| JP | 4268157 B2 | | 5/2009 | |
| JP | 4464875 B2 | | 5/2010 | |
| JP | 2010144372 A | | 7/2010 | |
| KR | 0134546 Y1 | * | 2/1999 | E04F 15/02464 |
| KR | 200433790 Y1 | * | 12/2006 | E04F 15/02405 |
| KR | 100676840 B1 | * | 1/2007 | E04F 15/02044 |
| KR | 20090056625 A | * | 6/2009 | E04F 19/061 |
| KR | 20090075446 A | * | 7/2009 | E04F 15/02044 |
| KR | 200447731 Y1 | * | 2/2010 | E04F 15/02044 |
| KR | 100966286 B1 | * | 6/2010 | E04B 1/24 |
| KR | 101177502 B1 | * | 8/2012 | E04F 15/02044 |
| WO | 1995016085 A1 | | 6/1995 | |
| WO | WO-0140595 A1 | * | 6/2001 | E04B 5/04 |
| WO | WO-2007051214 A1 | * | 5/2007 | E04F 15/04 |
| WO | WO-2011077386 A1 | * | 6/2011 | E04B 2/08 |
| WO | 2012060488 A1 | | 5/2012 | |

* cited by examiner

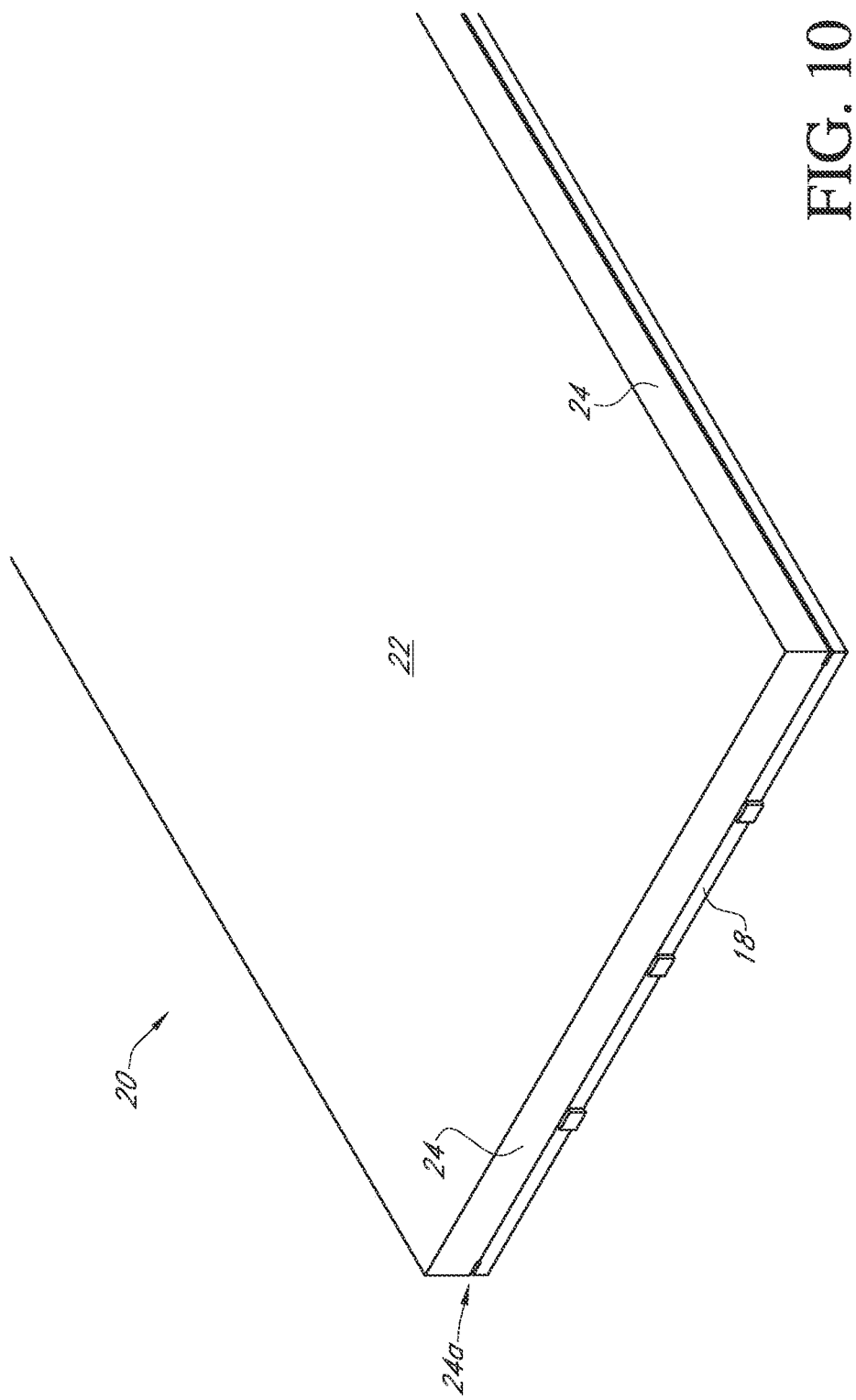

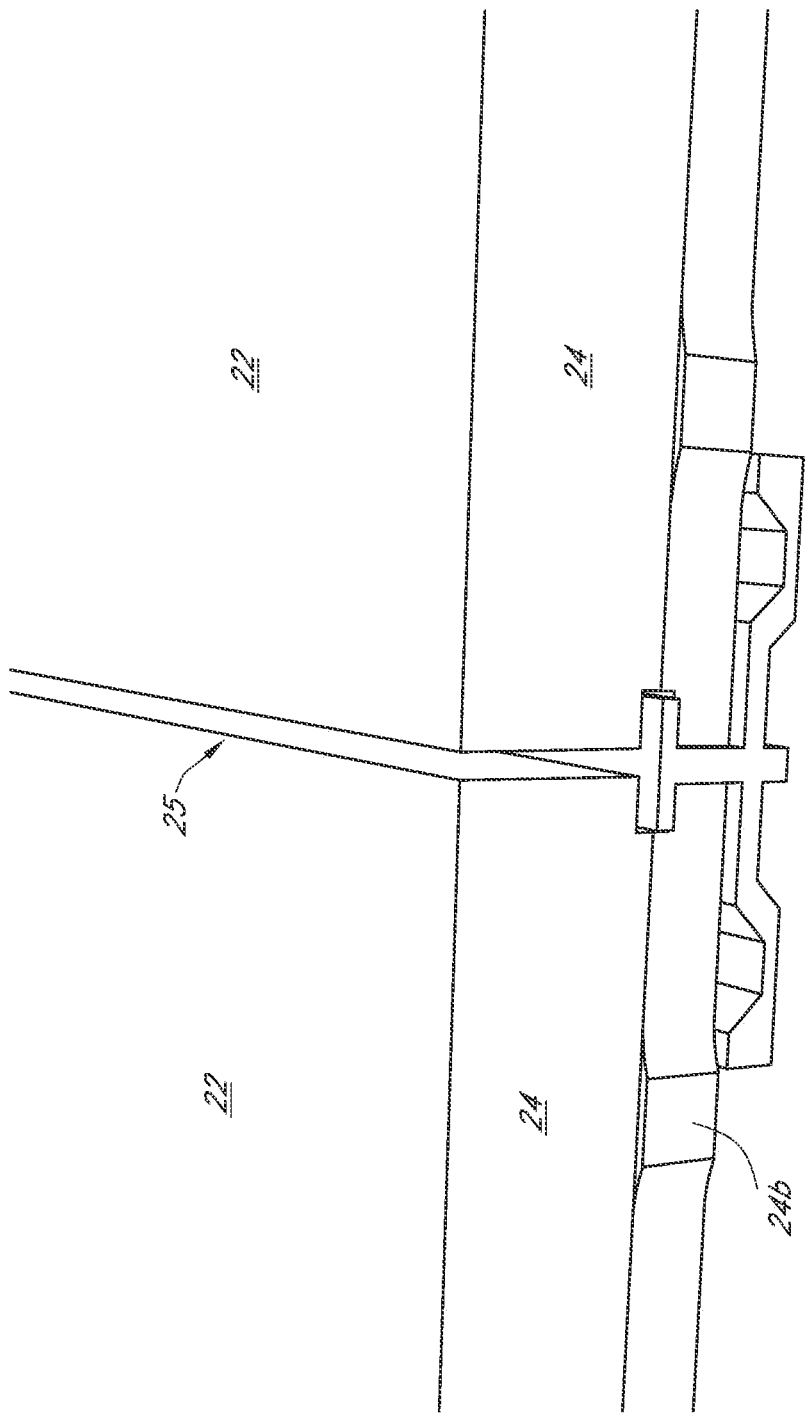

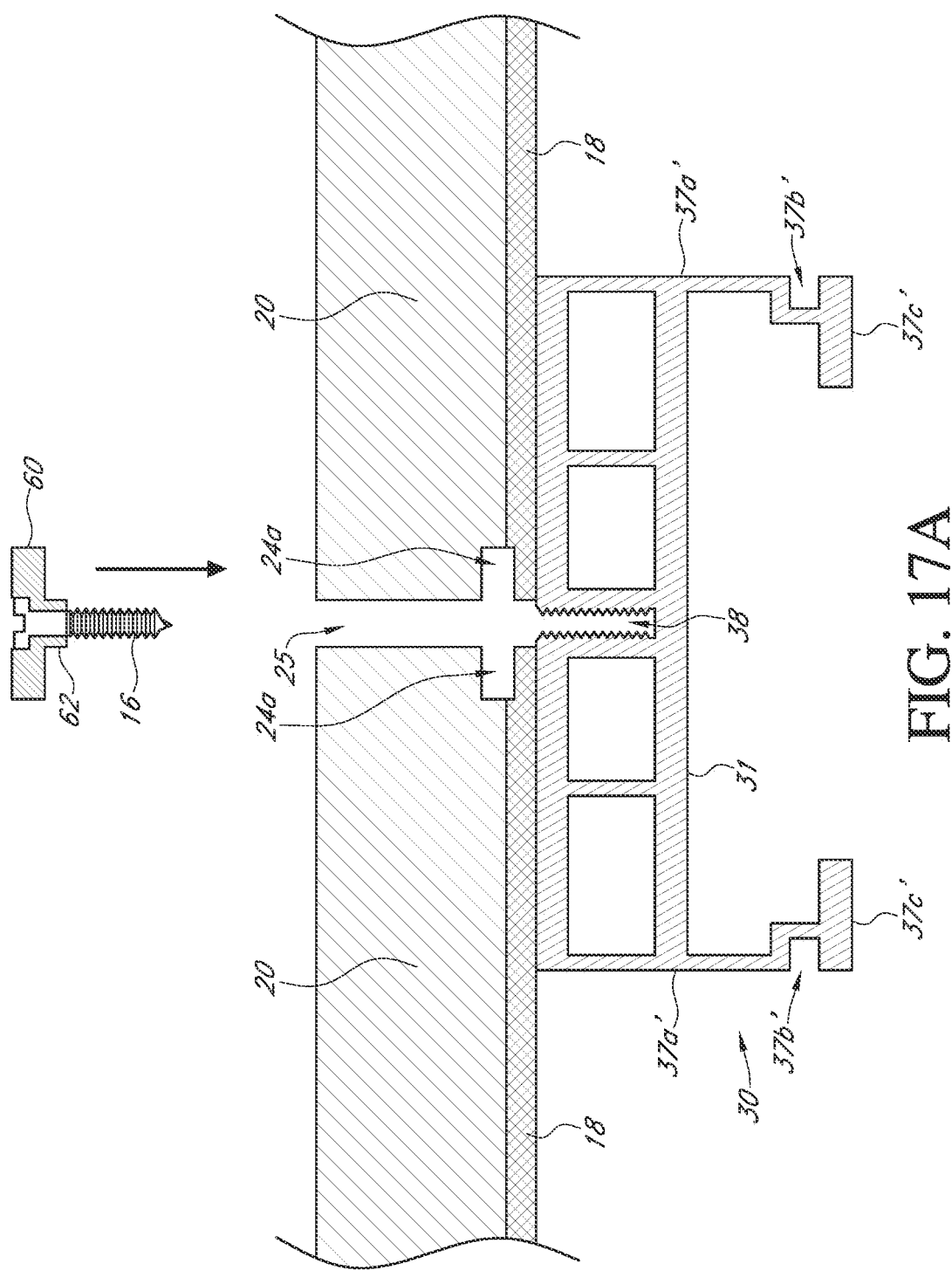

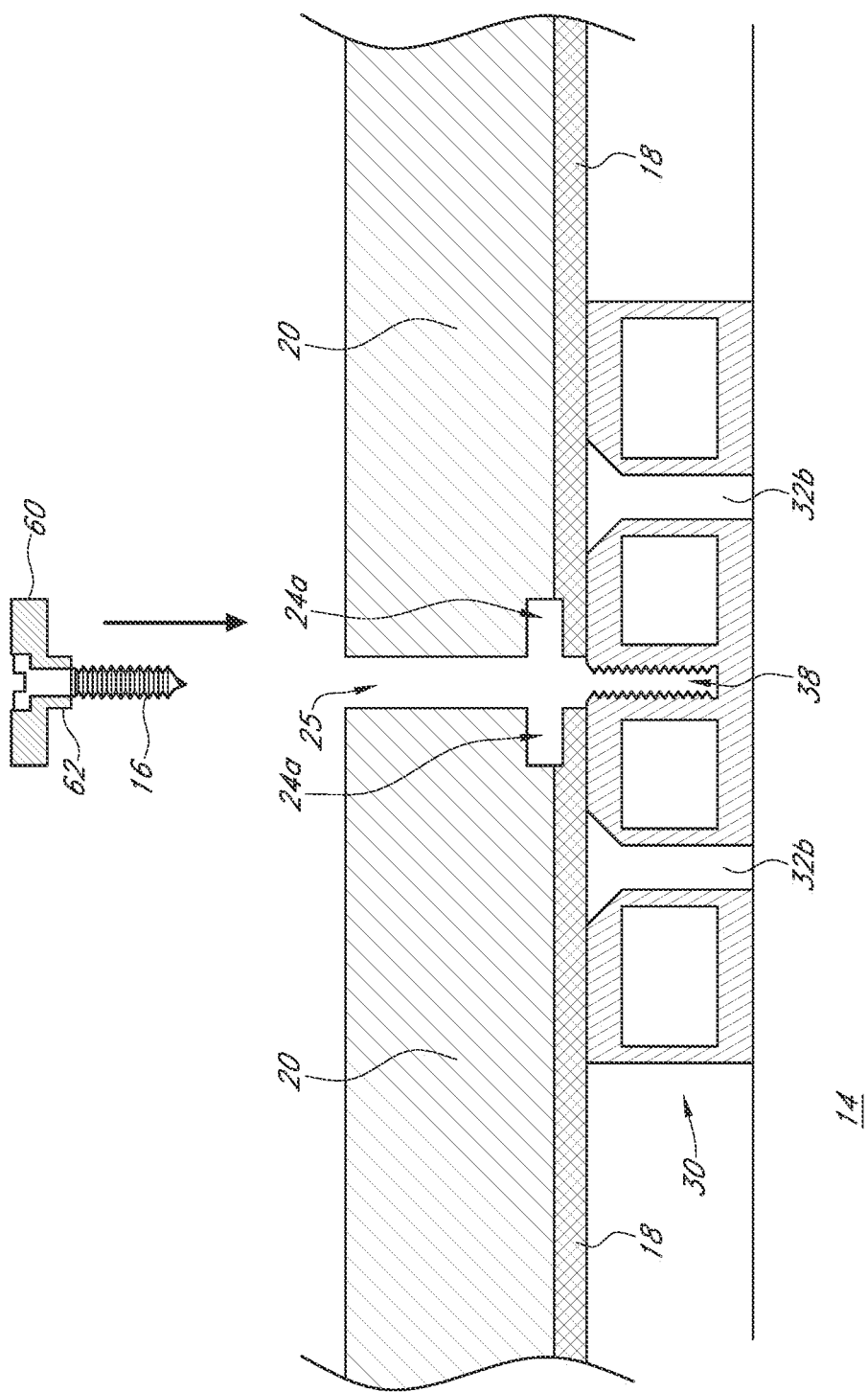

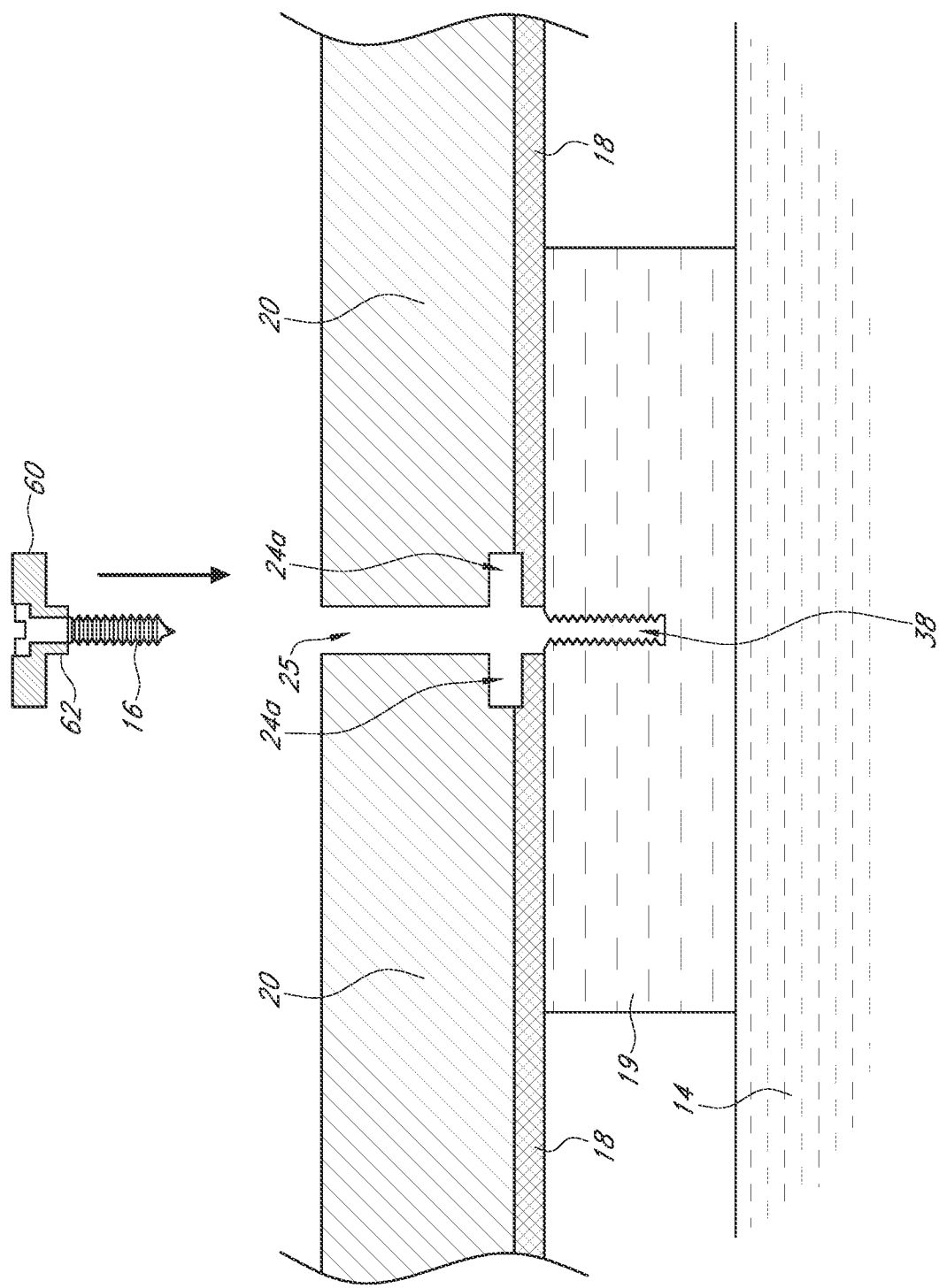

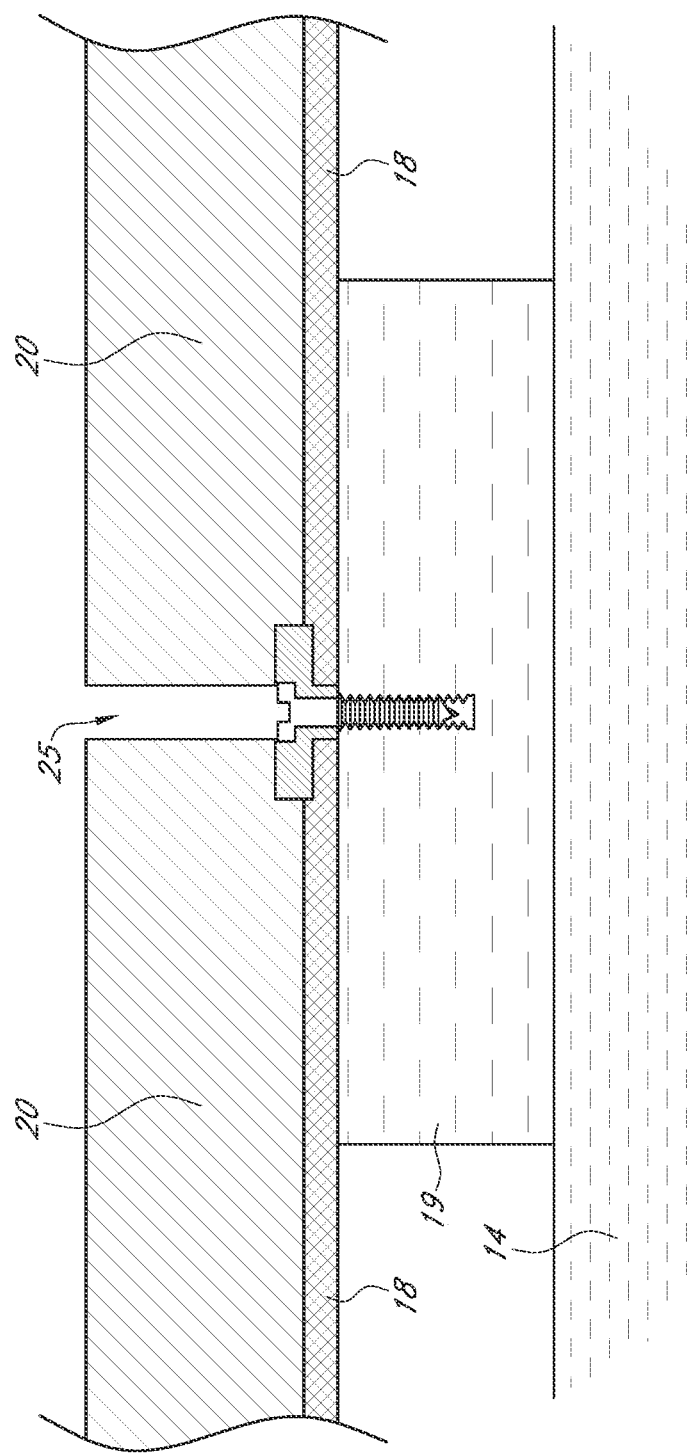

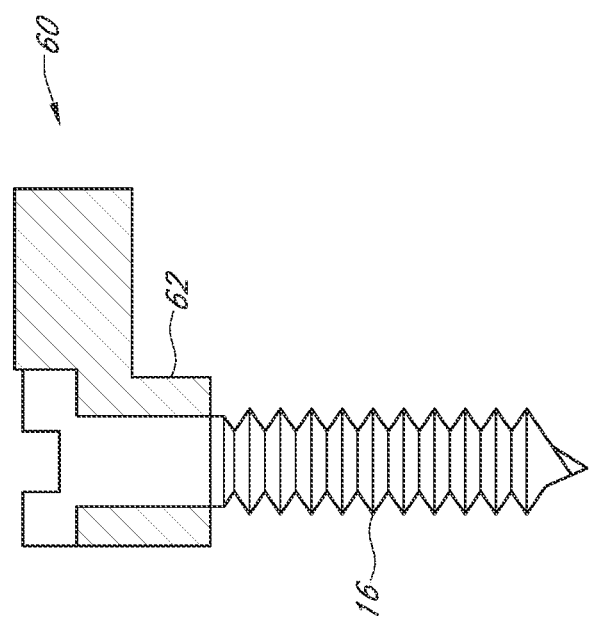

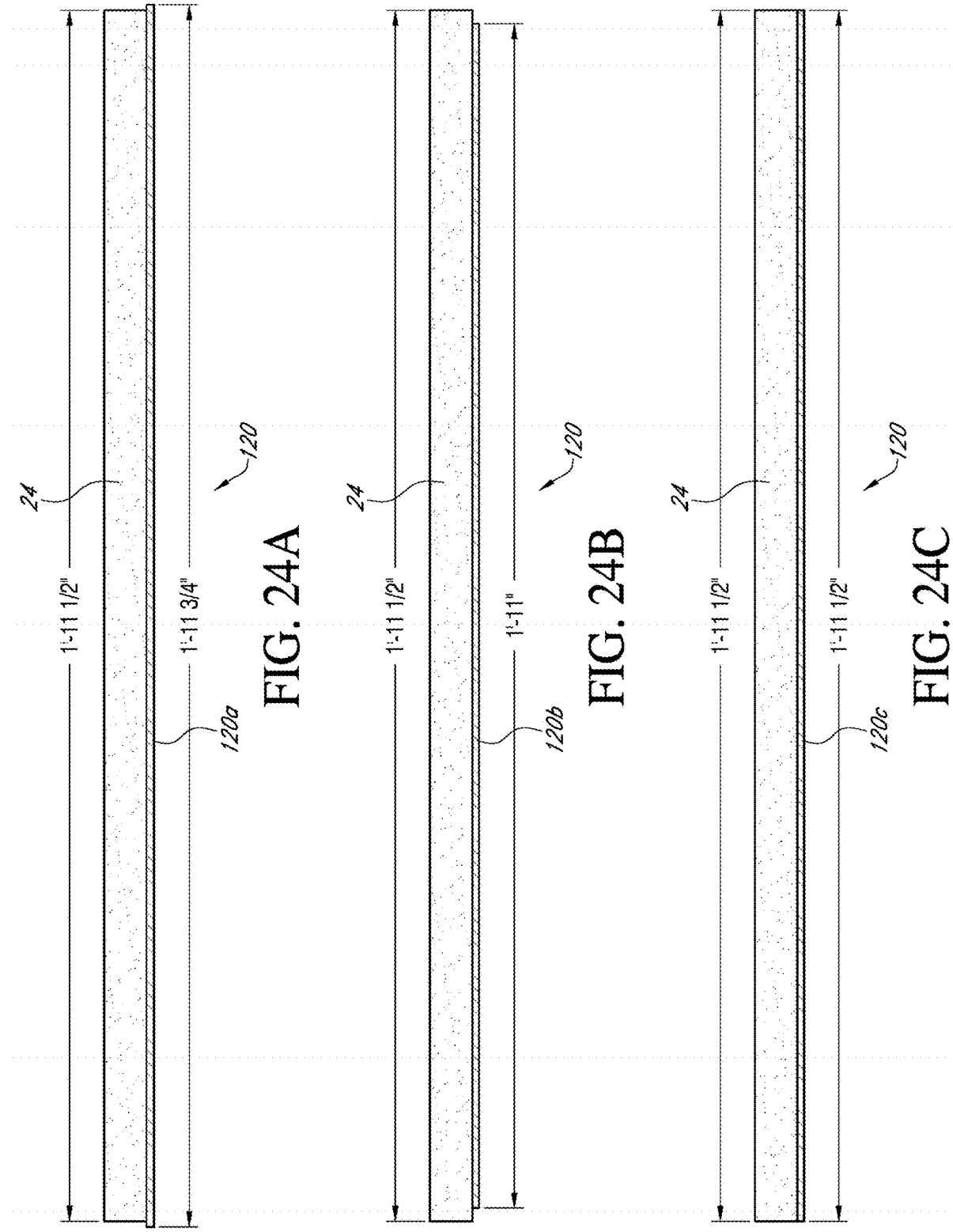

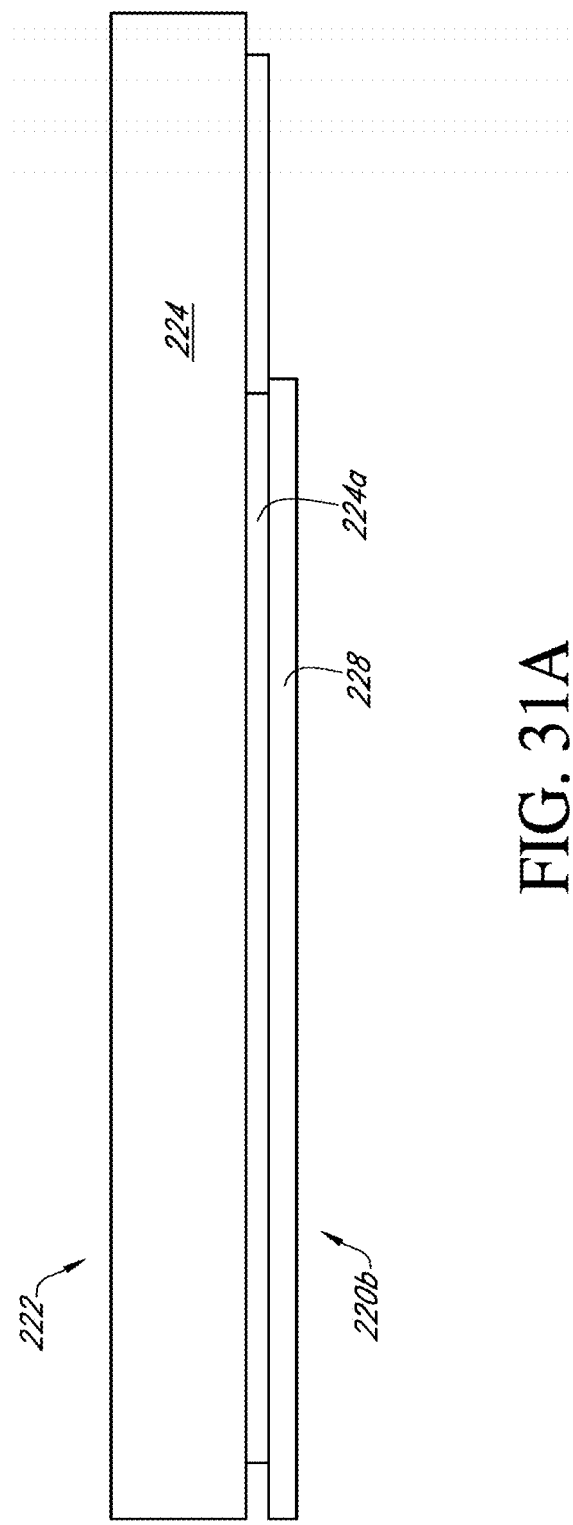

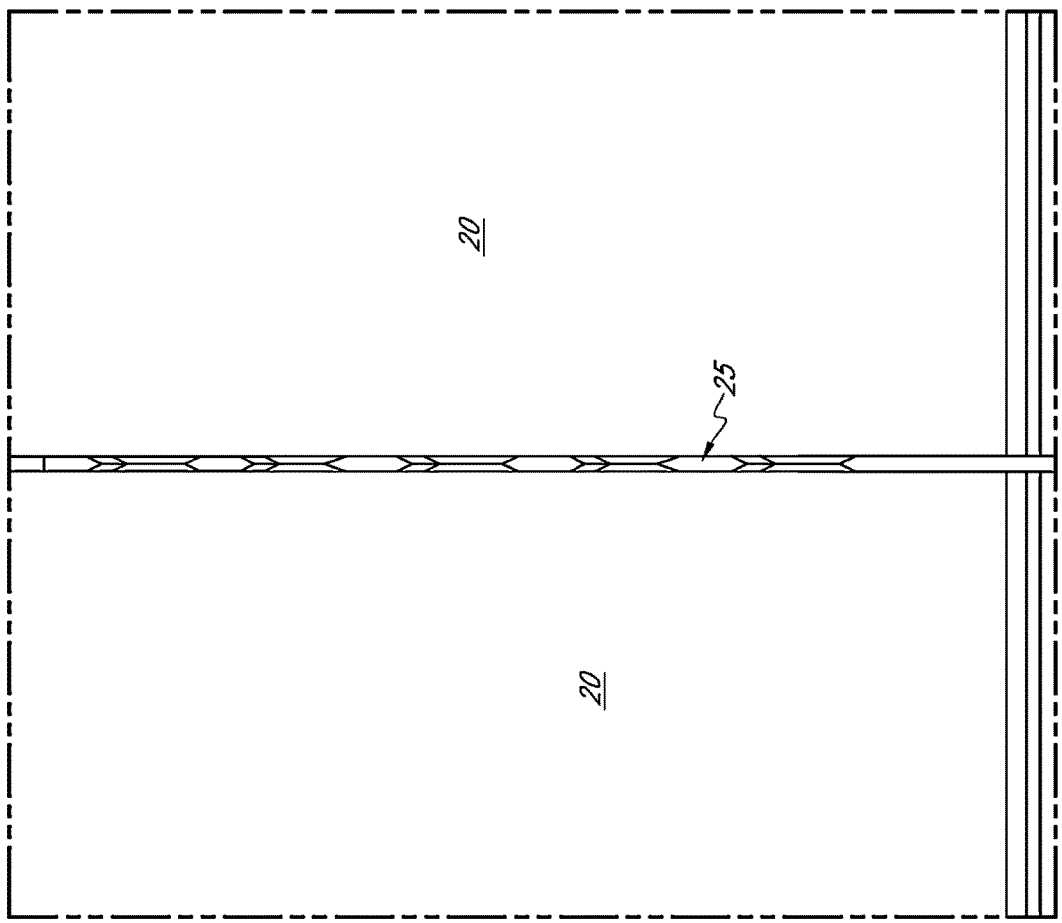

PEDESTAL AND SUPPORT STRUCTURE FOR TILE

CROSS REFERENCE TO RELATED APPLICATIONS

The present non-provisional patent application is a continuation of U.S. patent application Ser. No. 17/841,319 filed on Jun. 15, 2022, which claim priority from provisional U.S. Pat. App. No. 63/210,707 filed on Jun. 15, 2021 and is also a continuation-in-part of and claims priority from U.S. patent application Ser. No. 16/793,607 filed on Feb. 18, 2020 (now U.S. Pat. No. 11,371,245), which application claimed priority from provisional patent application No. 62/806,404 filed on Feb. 15, 2019 and which application is continuation-in-part of and claims priority from U.S. patent application Ser. No. 15/881,490 filed on Jan. 26, 2018 (now U.S. Pat. No. 10,934,714), which application was a continuation and claimed priority from U.S. patent application Ser. No. 15/332,700 filed on Oct. 24, 2016 (now U.S. Pat. No. 10,041,254), which application claimed priority from provisional U.S. Pat. App. Nos. 62/245,130 filed on Oct. 22, 2015; 62/331,004 filed on May 3, 2016; and, 62/394,705 filed on Sep. 14, 2016, and which application also was a continuation-in-part of and claimed priority from U.S. patent application Ser. No. 14/841,211, (now U.S. Pat. No. 9,702,145) filed on Aug. 31, 2015, which application was a continuation of and claimed priority from U.S. patent application Ser. No. 14/524,431, now (U.S. Pat. No. 9,151,063) filed on Oct. 27, 2014, which application claimed priority from provisional U.S. Pat. App. No. 61/895,930 filed on Oct. 25, 2013, all of which applications are incorporated by reference herein in their entireties.

FIELD OF THE INVENTION

The present disclosure relates to a tile and tile support structure allowing use of placement of rigid tiles for tiled surfaces, such as outdoor deck systems, façade/wall covering systems, and/or roof systems.

AUTHORIZATION PURSUANT TO 37 C.F.R. § 1.171 (C)

A portion of the disclosure of this patent document may contain material that is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BRIEF DESCRIPTION OF FIGURES

The accompanying drawings, which are incorporated in and constitute a part of this specification, illustrate embodiments and together with the description, serve to explain the principles of the methods and systems.

FIG. 10 is a perspective view of an illustrative tile that may be used with various aspects of a support structure.

FIG. 12B is a detailed perspective view showing various aspects of two illustrative tiles engaged with an illustrative support structure.

FIG. 17A is a cross-sectional view showing other aspects of a support structure.

FIG. 17B is a cross-sectional view showing further aspects of a support structure.

FIG. 17C is a cross-sectional view showing still further aspects of a support structure.

FIG. 17D is a cross sectional view of the support structure shown in FIG. 17C with the fastener and retaining element installed.

FIG. 18 is a cross-sectional view of a retaining element that may be used on a border.

FIG. 22B-23B provide various top views of a support system that may be engaged with a pedestal.

FIG. 24A provides a side view of an illustrative embodiment of a reinforced tile.

FIG. 24B provides a side view of a second illustrative embodiment of a reinforced tile.

FIG. 24C provides a side view of a third illustrative embodiment of a reinforced tile.

FIG. 31A is a side view of a horizontal end tile that may be used with a tile and support structure.

FIGS. 38A-38C provide various views of an illustrative embodiment of two tiles positioned adjacent one another.

Figure 1:
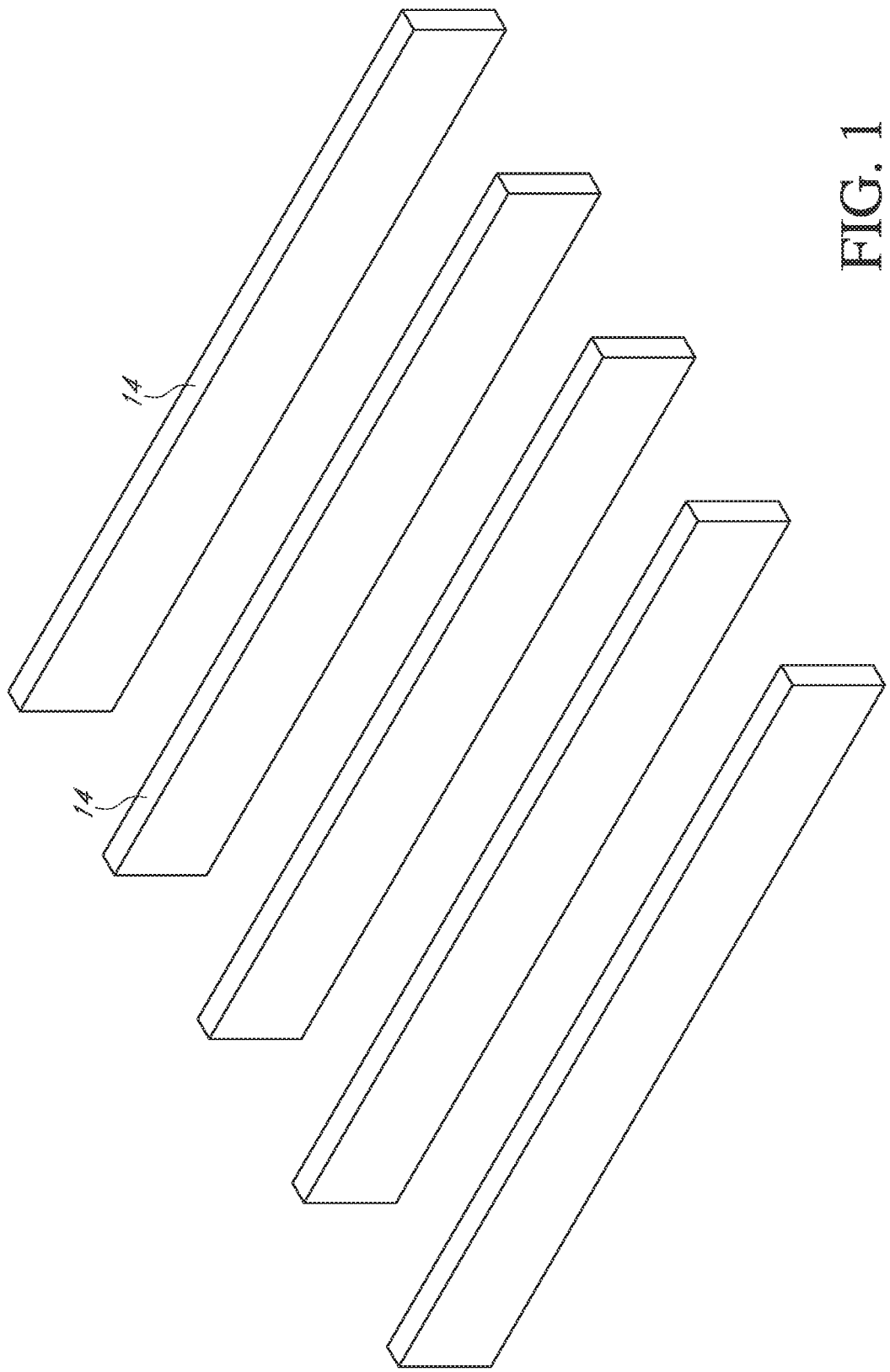
FIG. 1 is a perspective view of one arrangement of a plurality of illustrative joists configured in a manner that is typical for a building structure.

| DETAILED DESCRIPTION - LISTING OF THE ELEMENTS | |
|---|---|
| Element Description | Element Number |
| Tile & support structure | 10 |
| Deck | 12 |
| Joist | 14 |
| Fastener | 16 |
| Substrate | 18 |
| Lath | 19 |
| Tile | 20 |
| Face | 22 |
| Edge | 24 |
| Groove | 24a |
| Protrusion | 24b |
| Clearance | 25 |
| Support structure | 30 |
| Edge support structure | 30a |
| Base | 31 |
| Flange | 32 |
| Trough | 32a |
| Aperture | 32b |
| V-Channel | 32c |
| Lip | 33 |
| Spine | 34 |
| Tip | 34a |
| Rail | 36 |
| Anchor | 38 |
| Roof support structure | 30' |
| Roof edge support structure | 30a' |
| Base | 31' |
| Flange | 32' |
| Trough | 32a' |
| Aperture | 32b' |
| Lip | 33' |
| Spine | 34' |
| Tip | 34a' |
| Rail | 36' |
| Channel portion | 37' |
| Side member | 37a' |
| Notch | 37b' |
| Bottom member | 37c' |
| Inner member | 40 |
| Inner member bottom | 42 |
| Inner member side | 44 |
| Pedestal | 50 |
| Pedestal base | 52 |
| Adjustment portion | 53 |
| Pedestal upper surface | 54 |
| Lug | 55 |
| Retaining element | 60 |
| Neck | 62 |
| Retaining element | 60' |
| Neck | 62' |
| Securement clip | 70 |
| Vertical member | 72 |
| Ramp | 72a |
| Catch | 72b |
| Base member | 74 |
| Reinforced tile | 120 |
| Substrate | 120a |
| Support structure | 130 |
| Base | 131 |
| Flange | 132 |
| Trough | 132a |
| Aperture | 132b |
| Lip | 133 |
| Spine | 134 |
| Tip | 134a |

-continued

DETAILED DESCRIPTION - LISTING OF THE ELEMENTS

| Element Description | Element Number |
| --- | --- |
| Rail | 136 |
| Receiver portion | 137 |
| Groove | 137a |
| Engagement surface | 137b |
| Vertical limiter | 137c |
| Tile and support structure | 210 |
| Riser tile | 220a |
| Horizontal end tile | 220b |
| Face | 222 |
| Edge | 224 |
| Groove | 224a |
| Substrate | 228 |
| Upper riser support structure | 230a |
| Lower riser support structure | 230b |
| Base | 231 |
| Flange | 232 |
| Trough | 232a |
| Aperture | 232b |
| Lip | 233 |
| Spine | 234 |
| Tip | 234a |
| Rail | 236 |

DETAILED DESCRIPTION OF INVENTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes• from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed herein are various components that may be used to perform the disclosed methods and provide the disclosed systems. These in addition to other components that may be compatible with the disclosed methods and systems, and it is understood that when combinations, subsets, interactions, groups, etc. of these components are disclosed, that while specific reference of each various individual and collective combinations and permutation of these may not be explicitly disclosed, each is specifically contemplated and described herein, for all methods and systems of the present disclosure. This applies to all aspects of this disclosure including, but not limited to, steps in disclosed methods. Thus, if there are a variety of additional steps that may be performed, it is understood that each of these additional steps may be performed with any specific aspects or combination of aspects of the disclosed methods.

The present methods and systems may be understood more readily by reference to the following detailed description of systems and methods (including the various aspects thereof) and the examples included therein and to the Figures and their following description. Further, although some figures included herewith show various dimensions of some features of certain illustrative aspects of certain components of the present disclosure, such dimensions are for illustrative purposes only and in no way limit the scope of the present disclosure unless so indicated in the following claims.

The following detailed description is of the best currently contemplated modes of carrying out the present methods and systems. The description is not to be taken in a limiting sense, but is made merely for the purpose of illustrating the general principles of the various aspects of the present disclosure, since the scope of the invention is best defined by the appending claims. Various inventive features are described below herein that can each be used independently of one another or in combination with other features without limitation unless so indicated in the following claims.

A group of joists 14 in a typical arrangement is shown in FIG. 1, wherein the joists 14 are oriented parallel with respect to one another about their lengths. It is contemplated that in certain illustrative aspects of a tile and support structure 10 as disclosed herein, the tile and support structure 10 may be adapted for use with such joists 14 and/or arrangements thereof. However, the tile and support structure 10 may be used with other structures, structural components, and/or surfaces as described in detail below, and the use of joists 14 is therefore in no way limiting to the scope of the present disclosure unless so indicated in the following claims.

Figure 2:
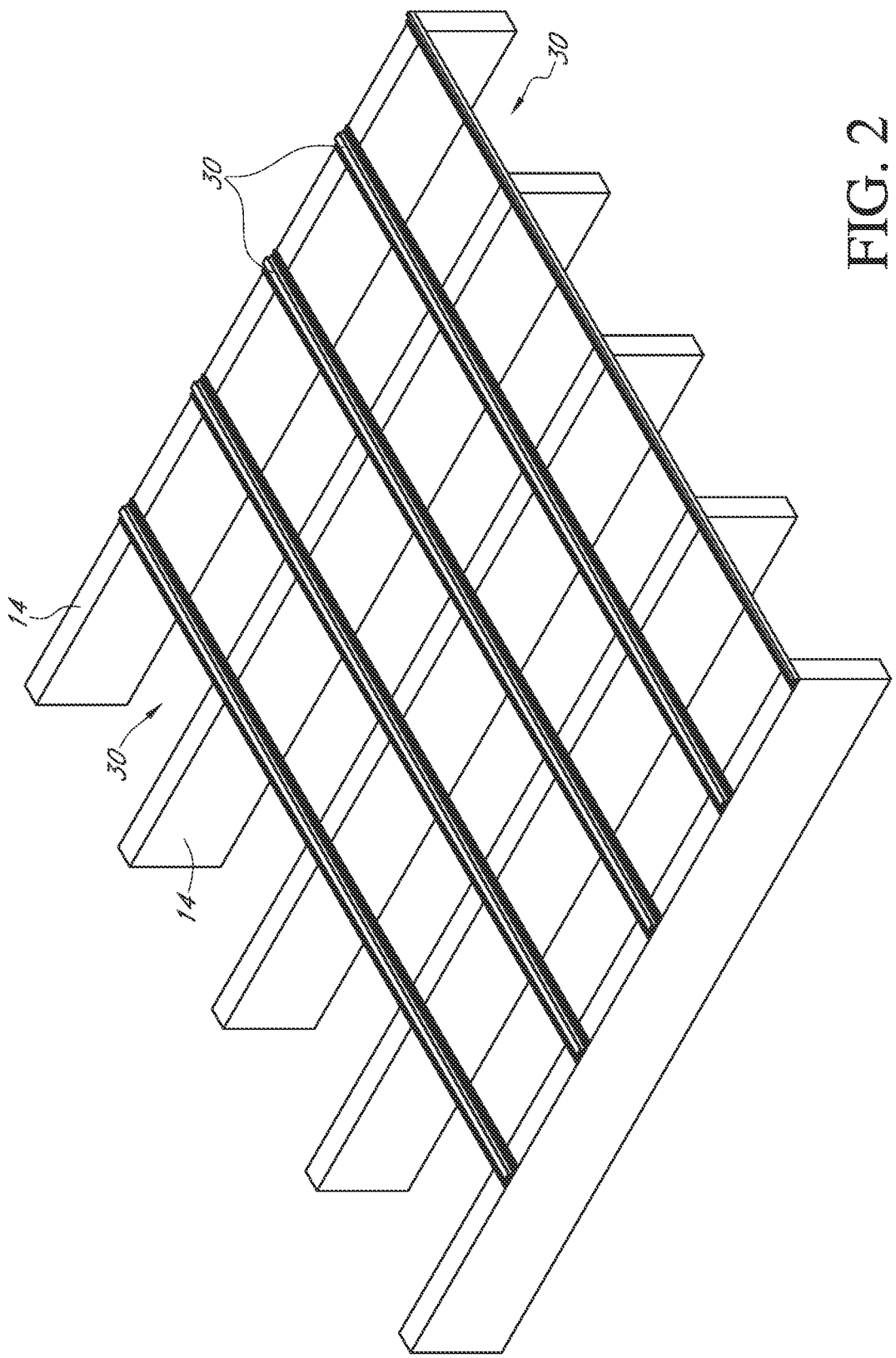
FIG. 2 is a perspective view of the joists from FIG. 1 having a plurality of illustrative support structures engaged with the joists.

As shown in FIG. 2, a plurality of support structures 30 may be engaged with the joists 14 such that the support structures 30 may be oriented parallel with respect to one another along their lengths. It is contemplated that the support structures 30 may be engaged with the top edge of the joists 14 via one or more fasteners 16 in a manner similar to that in which decking material may be engaged with joists 14. In one aspect, the fasteners 16 may be configured as wood screws. However, the specific method and/or structure used to engage the support structures 30 with the joists 14 (or other structure, structural component, and/or surface) in no way limits the scope of the present disclosure unless so indicated in the following claims. Additionally, the support structures 30 may be oriented such that they are not perpendicular with respect to the joists 14 (or other structure, structural component, and/or surface), but such that the support structures 30 are still oriented parallel with respect to one another without limitation unless so indicated in the following claims.

The support structures 30 may be configured such that they are oriented perpendicular with respect to the joists 14. In such a configuration, the joists 14 and support structures 30 may form a grid. In certain aspects it may be advantageous to position a cross lathe (not shown) under each support structure 30. In one aspect, the cross lathe may be configured as a wooden one-by-three inch board, a wooden one-by-four inch board, or any other suitable structure without limitation, including but not limited to plastic and/or polymer strips, unless so indicated in the following claims. The cross lathe and support structure 30 may be engaged with one another and the joists 14 and the relative positions thereof secured via one or more fasteners 16. It is contemplated that such a configuration may be especially useful if there is a reasonable likelihood that the position of the joists 14 and/or other underlying structure might shift over time. Accordingly, the scope of the present disclosure is in no way limited by whether a cross lathe is used unless so indicated in the following claims. Furthermore, the specific method and/or structure used to engage the cross lathes with the joists 14 and/or support structures 30 in no way limits the scope of the present disclosure unless so indicated in the following claims.

Figure 3:
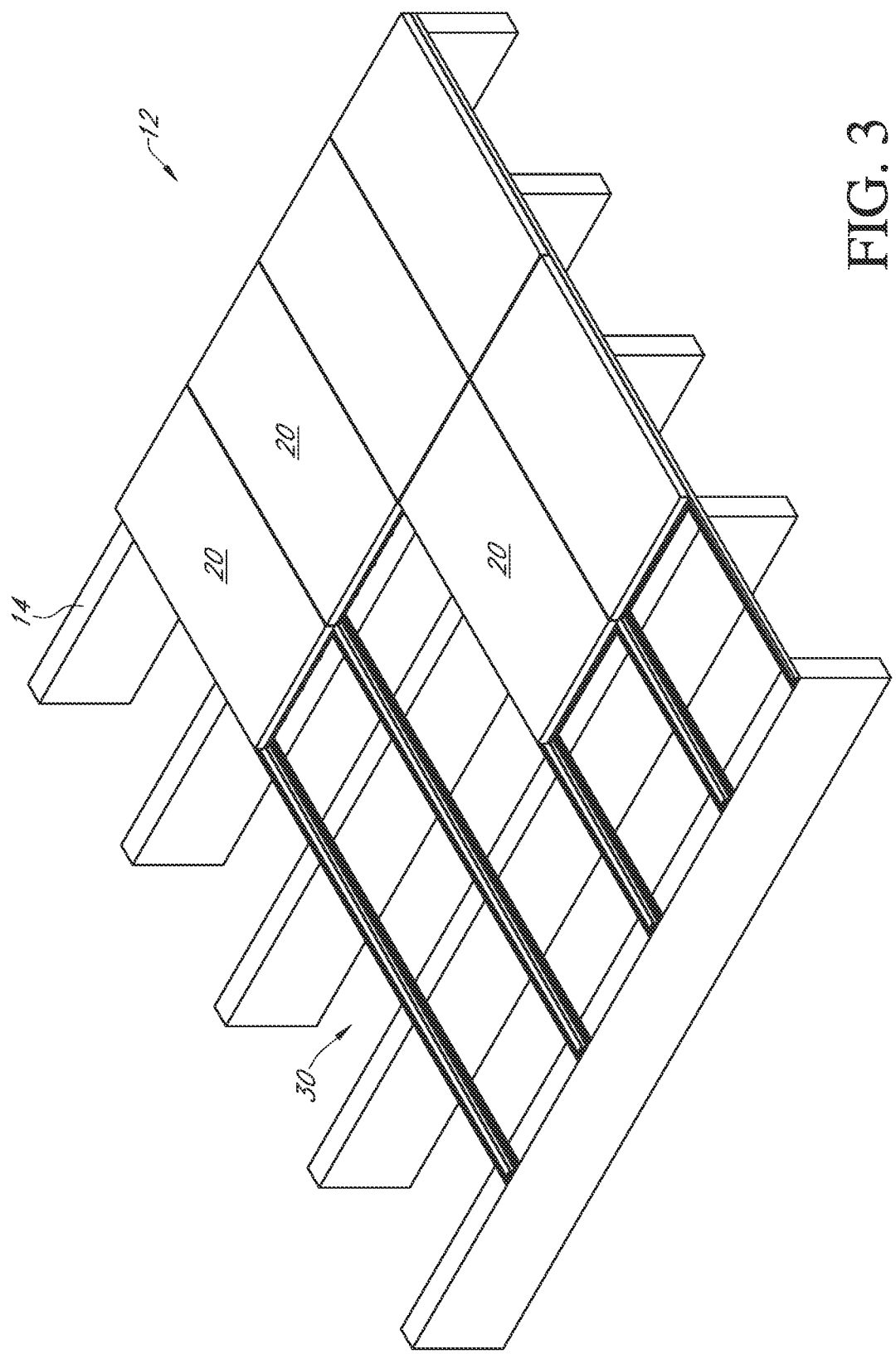
FIG. 3 is a perspective view of the joists and support structures from FIG. 2 wherein a plurality of illustrative tiles are engaged with the support structures.
Figure 4:
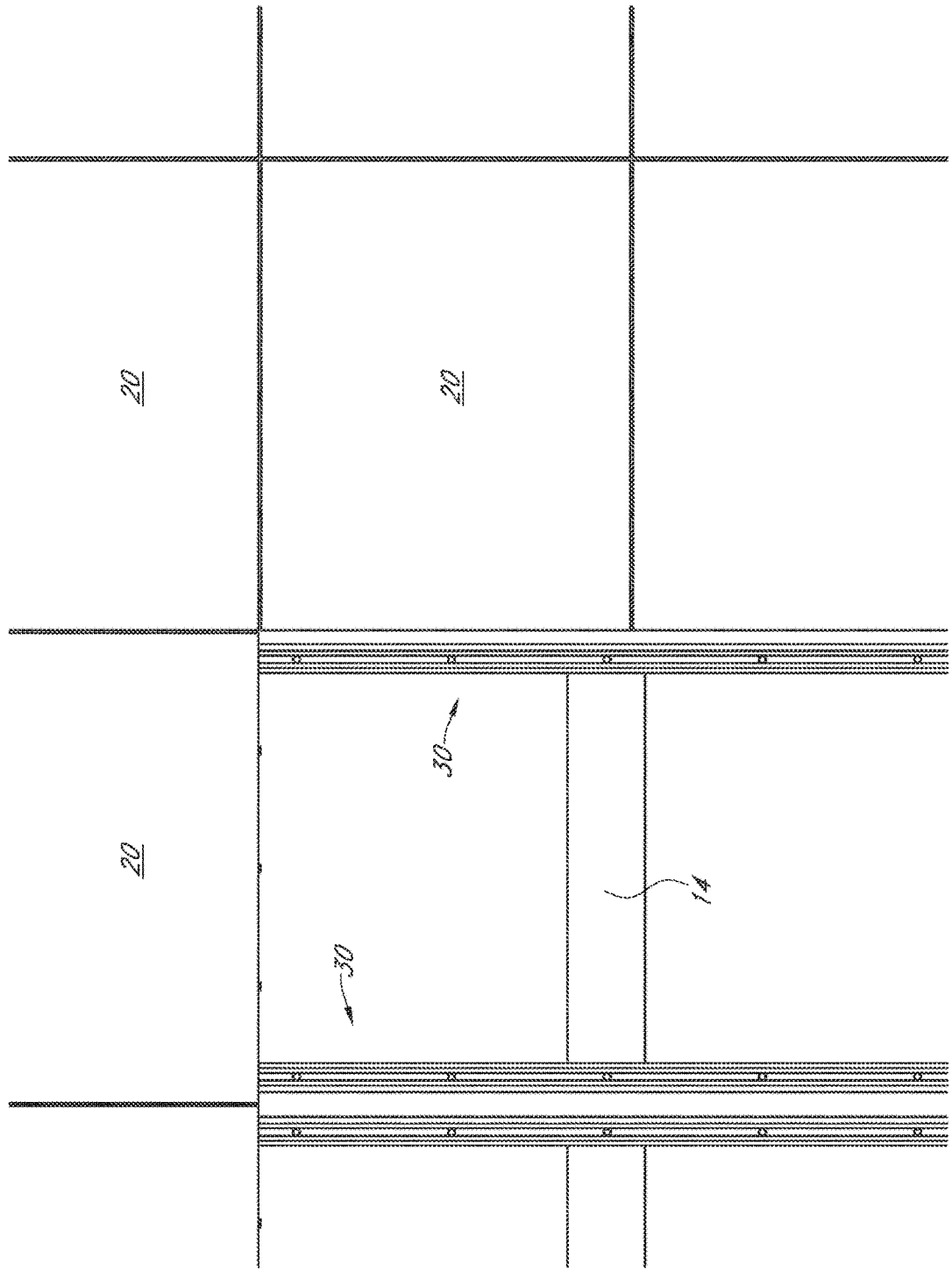
FIG. 4 is a top view of the support structures and tiles shown in FIG. 3.
Figure 5:
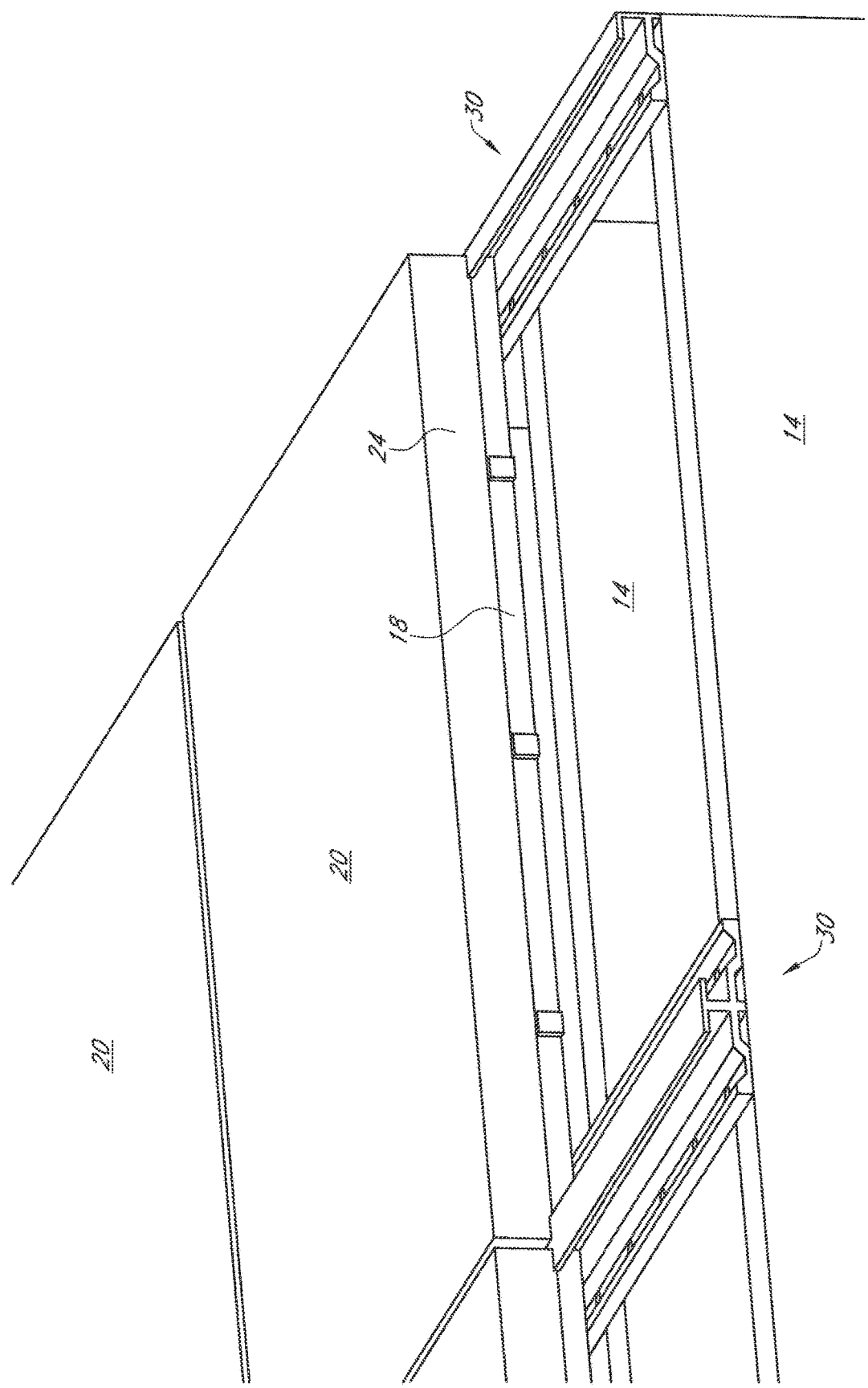
FIG. 5 is a detailed perspective view of a portion of the joists, support structures, and tiles shown in FIGS. 3 and 4.
Figure 6:
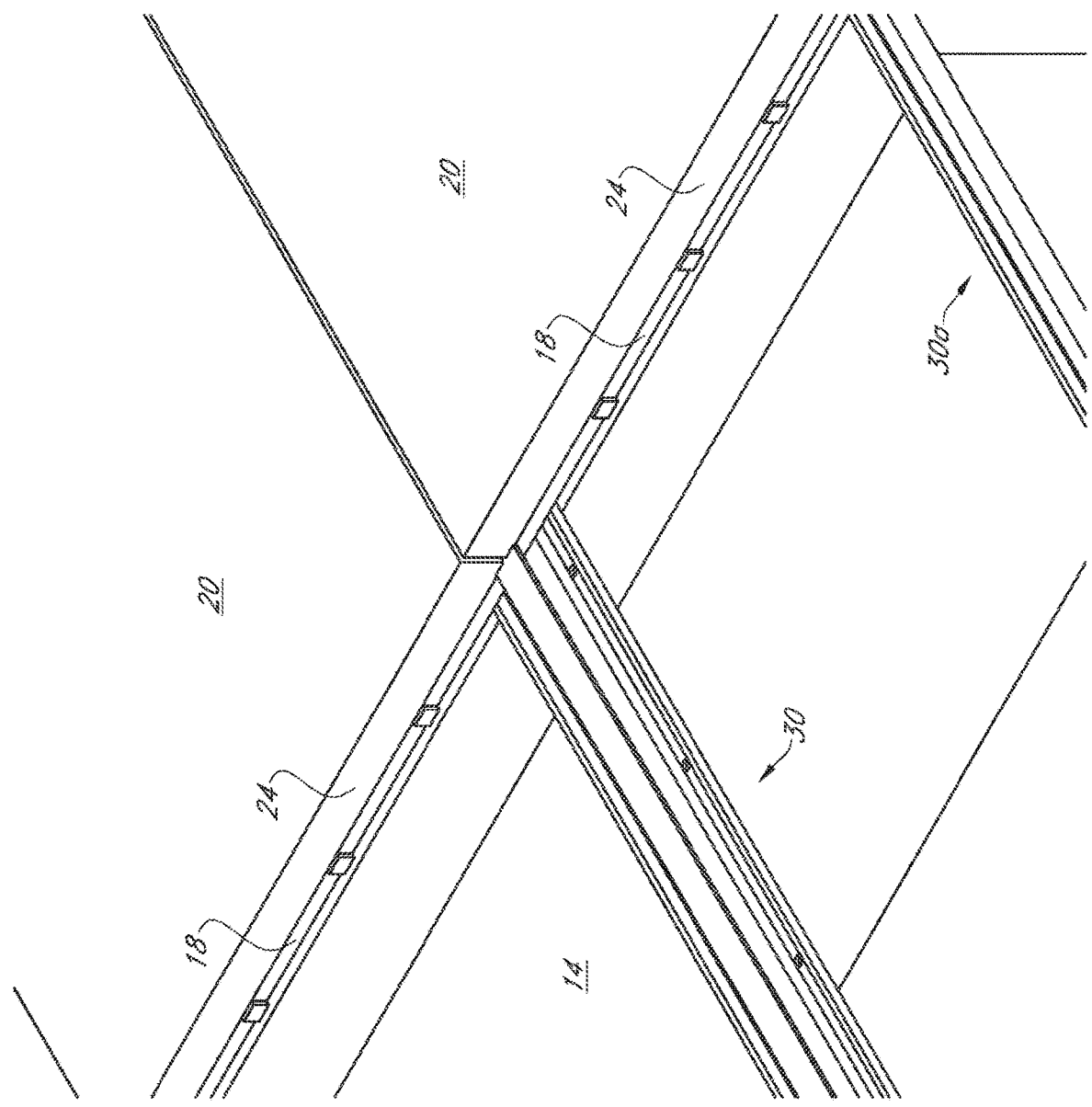
FIG. 6 is another detailed perspective view of a portion of the joists, support structures, and tiles shown in FIGS. 3 and 4.

A perspective view of the joist 14 and support structure 30 grid after a plurality of tiles 20 have been engaged with the support structures 30 is shown in FIG. 3. A top view is shown in FIG. 4, and FIGS. 5 and 6 provide two detailed perspective views. Those of ordinary skill in the art will recognize the arrangement in FIG. 3 as one arrangement of a deck 12 that may be constructed according to various aspects of the present disclosure. Although the tiles 20 pictured in FIG. 3 are configured as rectangles, the scope of the present disclosure is not so limited unless so indicated in the following claims. In another aspect not pictured herein, the shape of the tiles 20 is square. In still another aspect not pictured herein, the shape of the tiles 20 is a parallelogram, and in still another aspect the shape of the tiles 20 is a rhombus. As described in detail below, other aspects of the present disclosure may be configured to accommodate tiles 20 having one or more non-linear edge. Additionally, in certain aspects of a deck 12 constructed using the tile and support structure 10 disclosed herein, certain tiles 20 at the edges and/or corners of the deck 12 may be irregularly shaped, and may have more than four sides or fewer than four sides without limitation unless so indicated in the following claims, and which will depend at least upon the configuration of the deck 12.

Figure 7:
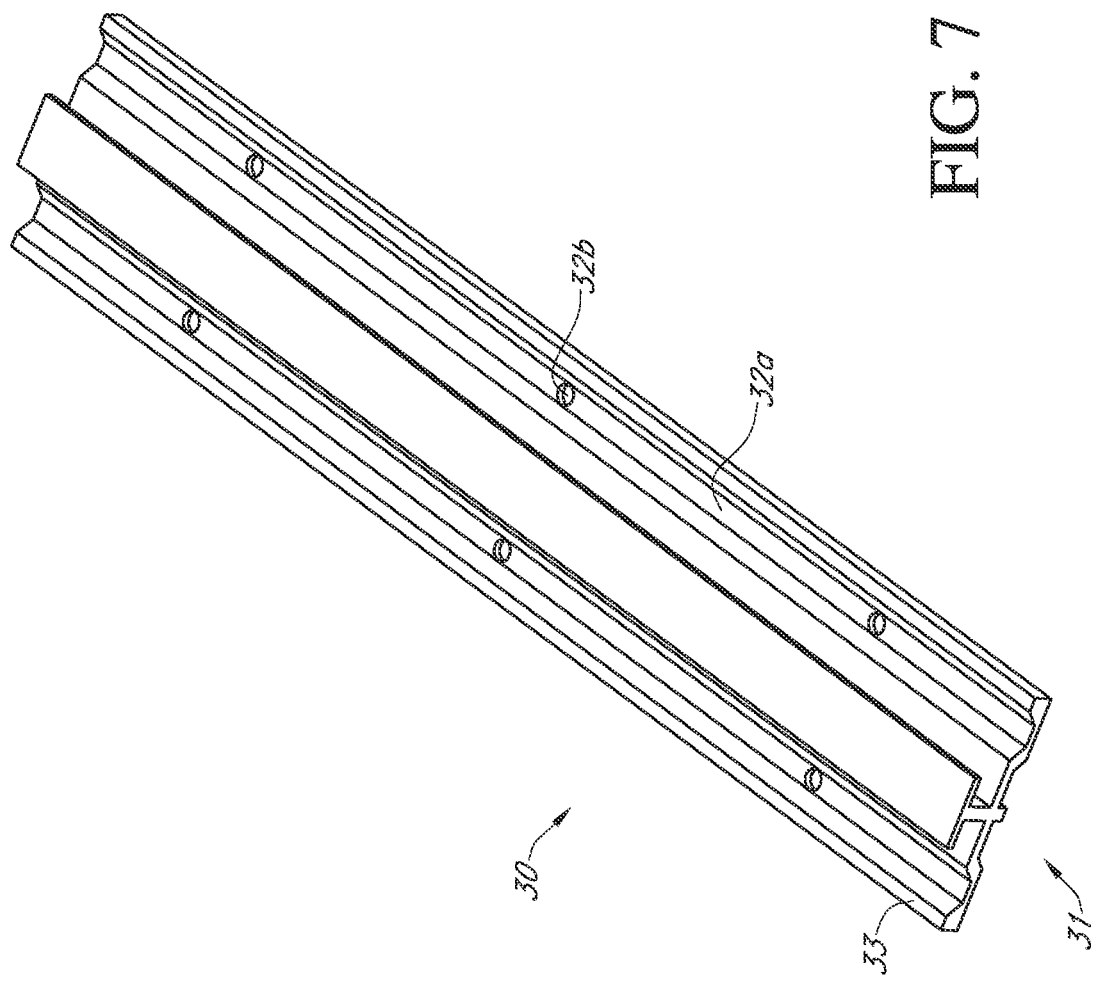
FIG. 7 is a perspective view of the illustrative support structure shown in FIGS. 2-6.
Figure 8:
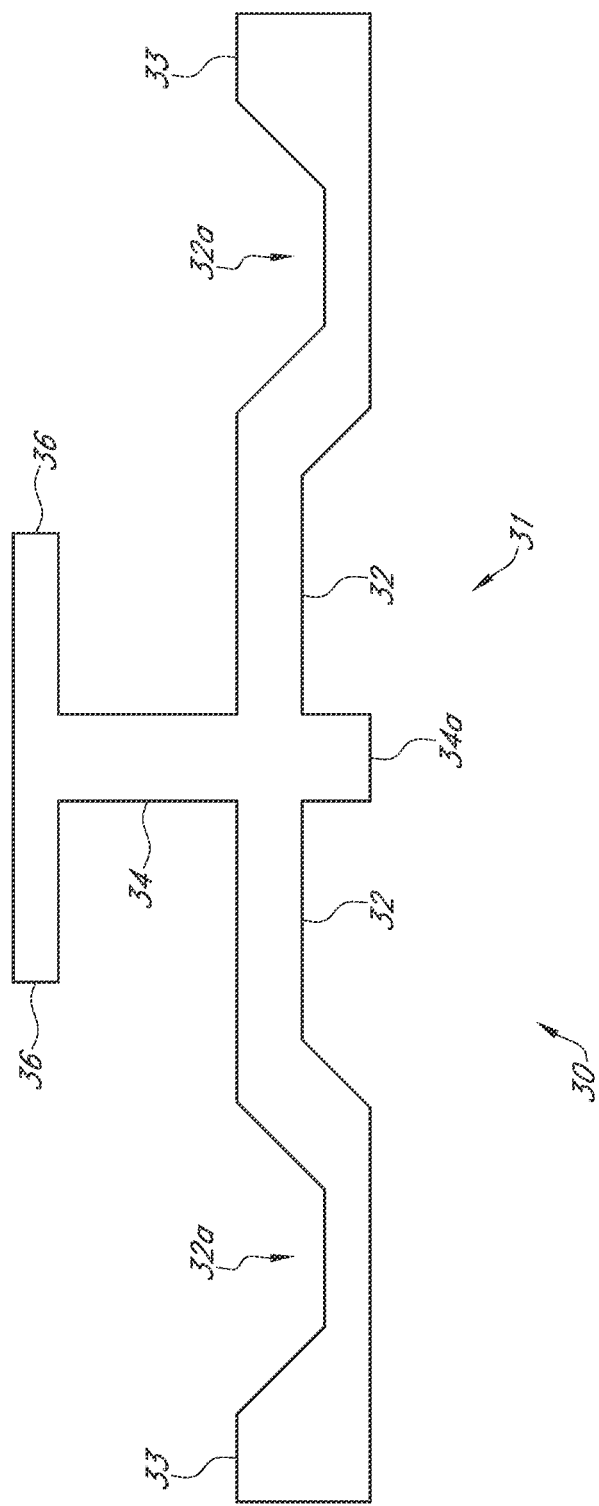
FIG. 8 is a cross-sectional view of the illustrative support structure shown in FIGS. 2-7.

A perspective view showing various illustrative aspects of a support structure 30 according to the present disclosure is shown in FIG. 7, and a cross-sectional view thereof is shown in FIG. 8. The support structure 30 may include a base 31 having a first and second flange 32 extending outward from a generally vertical centerline of the support structure 30. Each flange 32 may be formed with a trough 32a therein, and each trough 32a may be formed with a plurality of apertures 32b therein, as shown at least in FIG. 7. The distal edge of each trough 32a may be bound by a lip 33, wherein the top surface of each lip 33 may be coplanar with the top surface of each flange 32. Such a configuration may spread the force associated with a tile 20 engaged with a given support structure 30 over a larger area, as explained in further detail below.

In one illustrative aspect, the apertures 32b formed in a given trough 32a may be spaced from one another by a distance of four inches such that a support structure 30 may be engaged with joists 14 spaced twelve or sixteen inches from adjacent joists 14 without need to modify the support structure 30. In such a configuration, it is contemplated that multiple apertures 32b will not have a fastener 16 positioned therein, such that those apertures 32b may serve as an egress point for water and/or other liquid and/or precipitation in the trough 32a, and the trough 32a may serve as a fluid conduit (e.g., gutter) for water and/or other precipitation and/or liquids. However, the spacing of the apertures 32b in no way limits the scope of the present disclosure unless so indicated in the following claims. Additionally, the apertures 32b may be tapered such that the head of a fastener 14 configured as a screw may seat within the aperture 32b, and such that in certain aspects the head of a fastener 14 may be flush with the bottom of the trough 32a, and/or such that the head of a fastener 14 may be positioned below the upper surface of the flange 32. However, other aspects of the apertures 32b may be differently configured without limitation unless so indicated in the following claims.

A spine 34 may extend upward from the base 31 along the vertical centerline of the support structure 30. At the top distal end of the spine 34, two corresponding rails 36 may extend outward from the spine 34 in a generally horizontal dimension. A tip 34a that may be collinear with the spine 34 may extend downward from the spine 34 such that the distal end of the tip 34a is coplanar with the bottom surface of the base 31. Such a configuration may allow the tip 34a to abut a joist 14 and/or cross lathe during use. In certain aspects, it may be advantageous to construct the support structure 30 of a metal or metallic alloy. However, the support structure 30 may be constructed of any suitable material, including but not limited to plastic, polymers, natural materials, and/or combinations thereof without limitation unless so indicated in the following claims.

Figure 9:
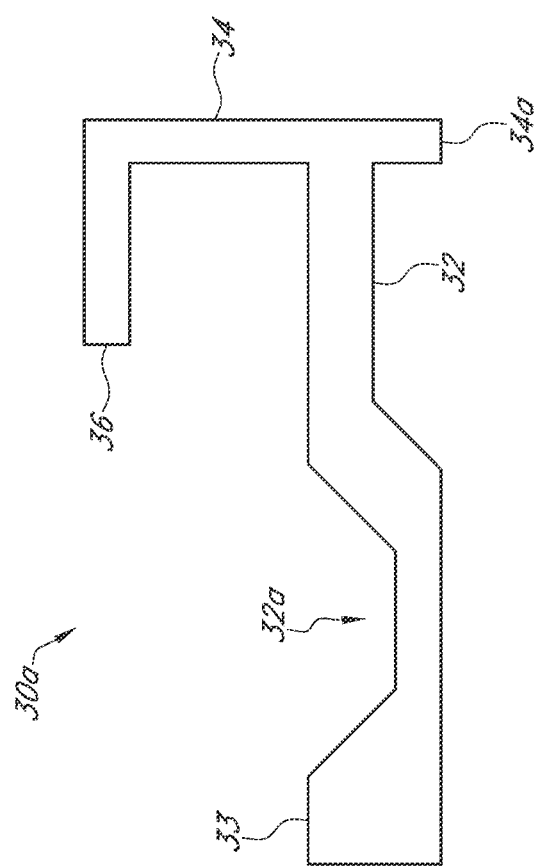
FIG. 9 is a cross-sectional view of an illustrative edge support structure.
Figure 11A:
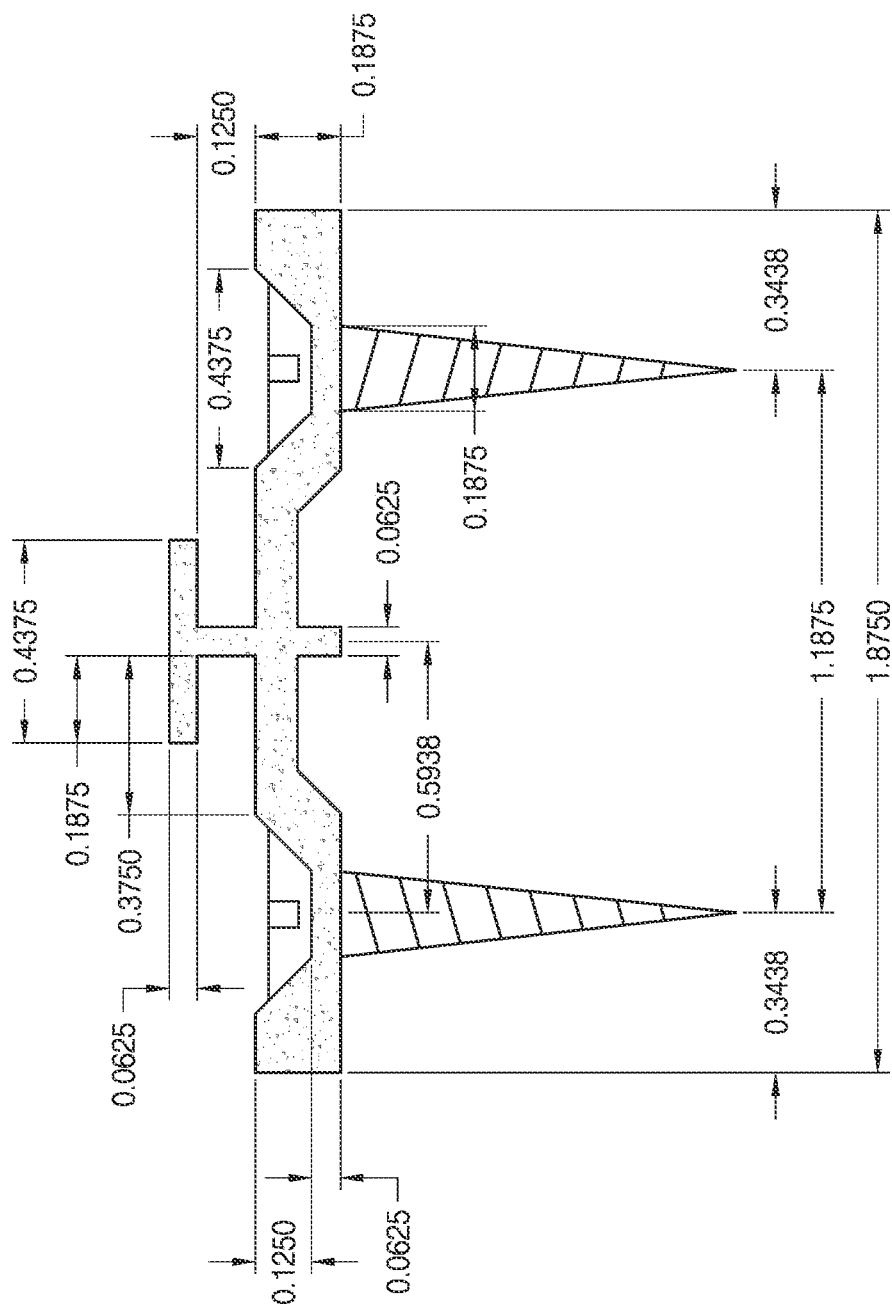
FIG. 11A is a cross-sectional view of another illustrative support structure showing dimensions of various elements thereof.
Figure 11B:
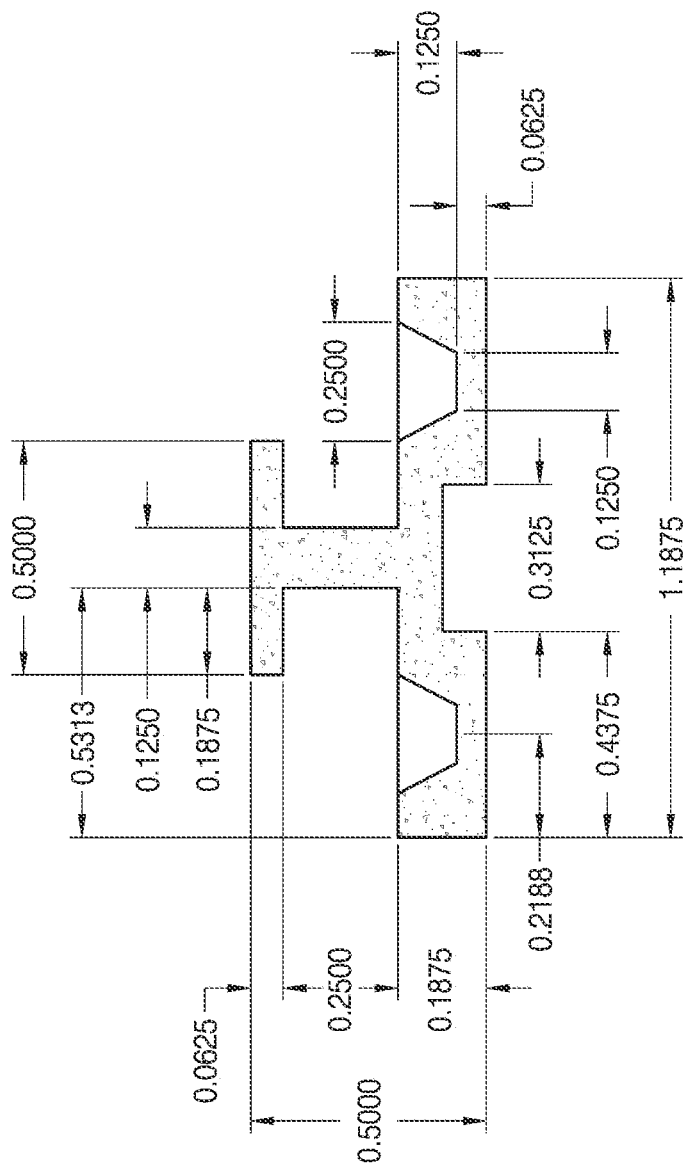
FIG. 11B is a cross-sectional view of another illustrative support structure showing dimensions of various elements thereof.
Figure 11C:
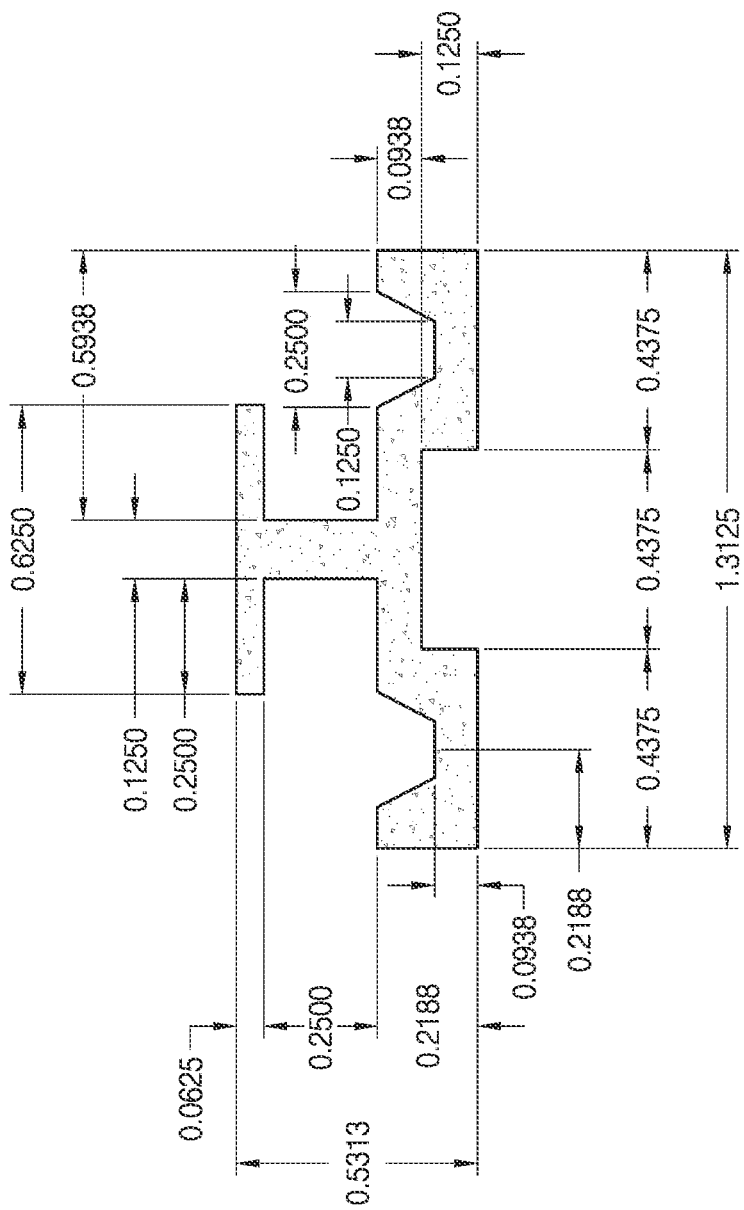
FIG. 11C is a cross-sectional view of another illustrative support structure showing dimensions of various elements thereof.
Figure 11D:
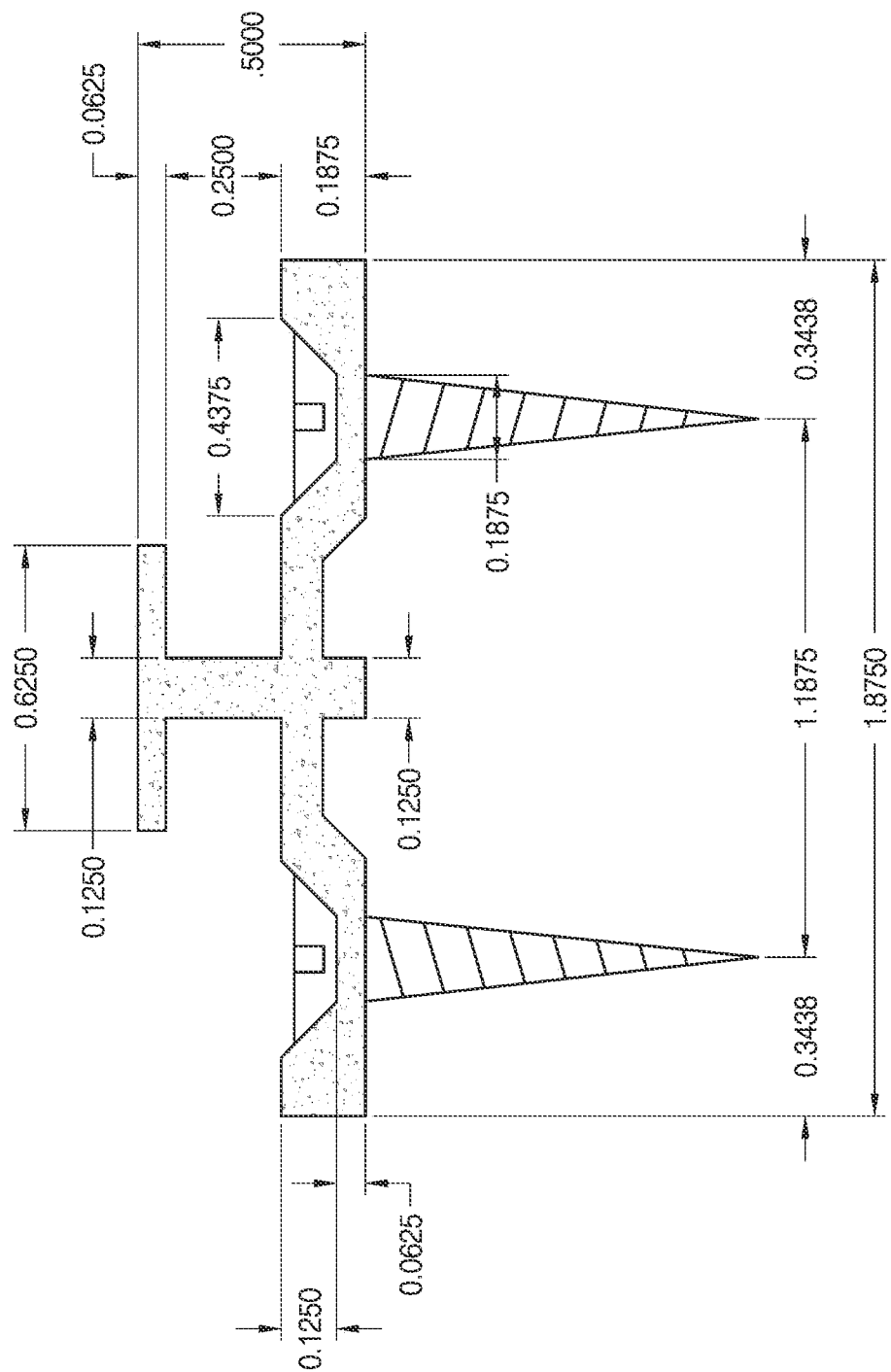
FIG. 11D is a cross-sectional view of another illustrative support structure showing dimensions of various elements thereof.
Figure 11E:
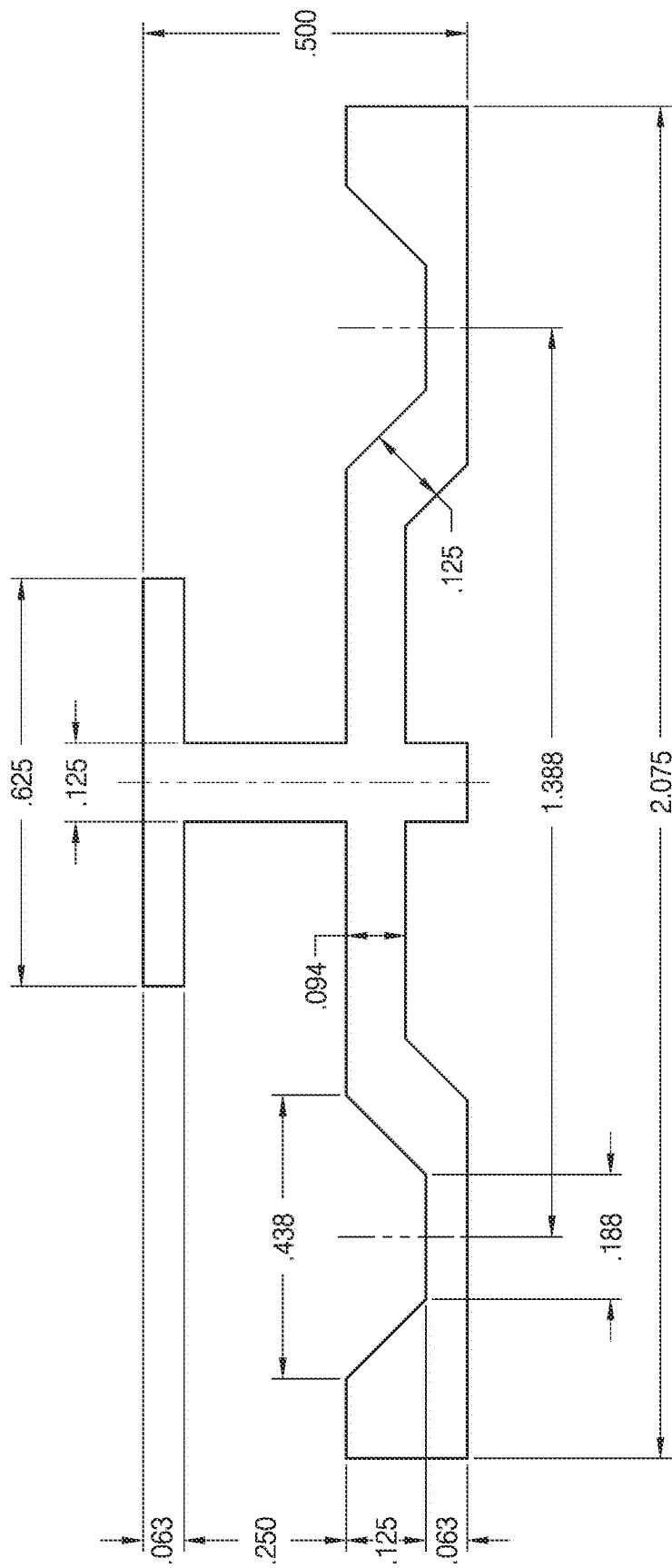
FIG. 11E is a cross-sectional view of another illustrative support structure showing dimensions of various elements thereof.

A cross-sectional view showing various illustrative aspects of an edge support structure 30a, which may be correlative to various illustrative aspects of a support structure 30 shown in FIGS. 7 and 8, is shown in FIG. 9. The edge support structure 30a may include a base 31 having a first flange 32 extending outward therefrom. The flange 32 may be formed with a trough 32a therein, and the trough 32a may be formed with a plurality of apertures 32b therein. The distal edge of the trough 32a may be bound by a lip 33, wherein the top surface of each lip 33 may be coplanar with the top surface of the flange 32. Such a configuration may spread the force associated with a tile 20 engaged with a given edge support structure 30a over a larger area, as explained in further detail below.

In an illustrative aspect, the apertures 32b formed in the trough 32a of the edge support structure 30a may be spaced from one another by a distance of four inches, such that an edge support structure 30a may be engaged with joists 14 spaced twelve or sixteen inches from adjacent joists 14 without need to modify the edge support structure 30a. However, the spacing of the apertures 32b in no way limits the scope of the present disclosure unless so indicated in the following claims. Additionally, the apertures 32b may be tapered such that the head of a fastener 14 configured as a screw may seat within the aperture 32b, and such that in certain aspects the head of a fastener 14 may be flush with the bottom of the trough 32a. However, other aspects of the apertures 32b may be differently configured without limitation unless so indicated in the following claims.

A spine 34 may extend upward from the base 31 in a generally vertical dimension. At the top distal end of the spine 34, a rail 36 may extend outward from the spine 34 in a generally horizontal dimension, wherein the rail 36 may be generally parallel with respect to the flange 32 and generally perpendicular with respect to the spine 34. A tip 34a that may be collinear with the spine 34 may extend downward from the spine 34 such that the distal end of the tip 34a is coplanar with the bottom surface of the base 31. Such a configuration may allow the tip 34a to abut a joist 14 and/or cross lathe during use.

The various relative dimensions of the components of the support structure 30 may be infinitely varied depending on the specific application of the support structure 30. Several illustrative aspects of different support structures 30 according to the present disclosure and dimensions of the components of the support structure 30 are shown in FIGS. 11A-11E. However, these aspects and dimensions are not meant to be limiting in any sense, but rather are provided to show how the various dimensions of the support structure 30 may be manipulated without departing from the spirit and scope of the present disclosure unless so indicated in the following claims.

Various illustrative aspects of a tile 20 that may be engaged with the illustrative embodiment of a support structure 30 are shown in FIG. 10. The tile 20 may be generally rectangular in shape (as shown in FIG. 3), such that two rectangular-shaped faces 22 are spaced from one another by the height of an edge 24 of the tile 20. In one aspect, the height of an edge 24 may be 20 millimeters, and in another aspect the height thereof may be 30 millimeters. However, as previously mentioned, the scope of the present disclosure is not limited by the specific shape, dimensions, and/or configuration of the tile 20 unless so indicated in the following claims. The bottom face 22 may be engaged with a substrate 18, which may be configured as a synthetic (e.g., fiberglass, plastic, etc.) sheet having a periphery equal to or approximately equal to that of the tile 20. In one aspect, the thickness of a substrate may be $^1\!/4$ of an inch, but the specific dimensions of the substrate 18, if used for that aspect of a tile 20, is in no way limiting to the scope of the present disclosure unless so indicated in the following claims. If a substrate 18 is used, it may be engaged with the tile 20 using any suitable structure and/or method suitable for the particular application of the tile 20, including but not limited to chemical adhesives, mechanical fasteners, and/or combinations thereof. The scope of the present disclosure is in no way limited by whether a substrate 18 is engaged with a tile 20 unless so indicated in the following claims.

Figure 12A:
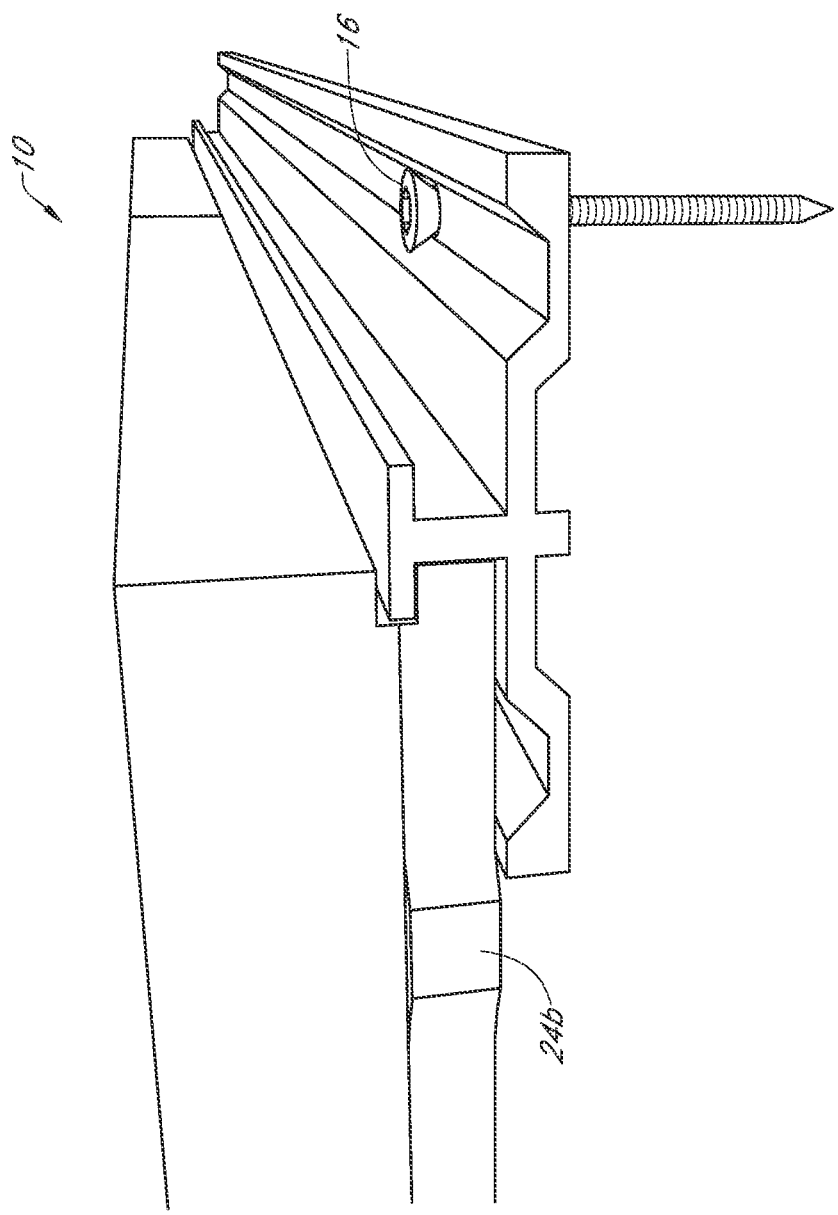
FIG. 12A is a detailed perspective view showing various aspects of a tile engaged with an illustrative support structure.

Opposite edges 24 of a tile 20 may be formed with a groove 24a therein, as shown in FIGS. 10, 12A, and 12B. The groove 24a may be formed in the edge 24 of the tile 20, in a portion of the edge 24 of the tile 20, in a portion of a surface of a substrate 18 (if present), and/or a combination of a portion of the tile 20 and a portion of the substrate 18. The groove 24a may be configured such that it cooperates with the rail 36 at the top distal end of the spine 34, and such that the bottom face 22 of the tile 20 (or bottom surface of the substrate 18, if present for that embodiment of a tile 20) rests upon the top surface of the flange 32 and lip 33, as clearly shown at least in FIGS. 12A and 12B. Accordingly, one tile 20 may be engaged on opposing edges 24 of the tile 20 with adjacent support structures 30. In this manner, the tile 20 may slide with respect to the support structures 30 along the lengths of the support structures 30. Such a configuration allows adjacent tiles 20 between corresponding support structures 30 to be slid into place from an open end of the support structures 30 until the final tile 20 is positioned. Simultaneously, this configuration may secure the relative position of the tile 20 with respect to the support structures 30 in all other dimensions (e.g., a vertical dimension and a horizontal dimension perpendicular with respect to the length of the support structures 30). It is contemplated that the dimensions of the groove 24a may be selected such that a common blade and/or tool may be used to form the required groove 24a in a given edge 24. It is also contemplated that in certain aspects of a tile and support structure 10, a predetermined amount of space may exist between the surfaces of a groove 24a and the surfaces of a rail 36, between the edge 24 and the spine 34, and between the bottom face 22 and flange 32 such that water and/or other liquids and/or other precipitation may flow via gravity between the groove 24a and the rail 36, between the edge 24 and spine 34, and/or between the bottom face 22 and flange 32.

Referring now specifically to FIG. 12B, the grooves 24a and the support structure 30 may be configured such that a clearance 25 exists between adjacent tiles 20 on opposing sides of a support structure 30. In an illustrative aspect, the width of the clearance 25 may be ⅛ of an inch. The various dimensions of the tile (e.g., edge 24, groove 24a, etc.) and support structure 30 (e.g., height and width of spine 34, length of rail 36, etc.) may be varied to change the width and depth of the clearance 25, and the optimal width and depth of the clearance 25 may vary from one application of the tile and support structure 10 to the next. Accordingly, the scope of the present disclosure is in no way limited by the specific dimensions and/or configuration of the clearance 25 unless so indicated in the following claims.

Figure 12C:
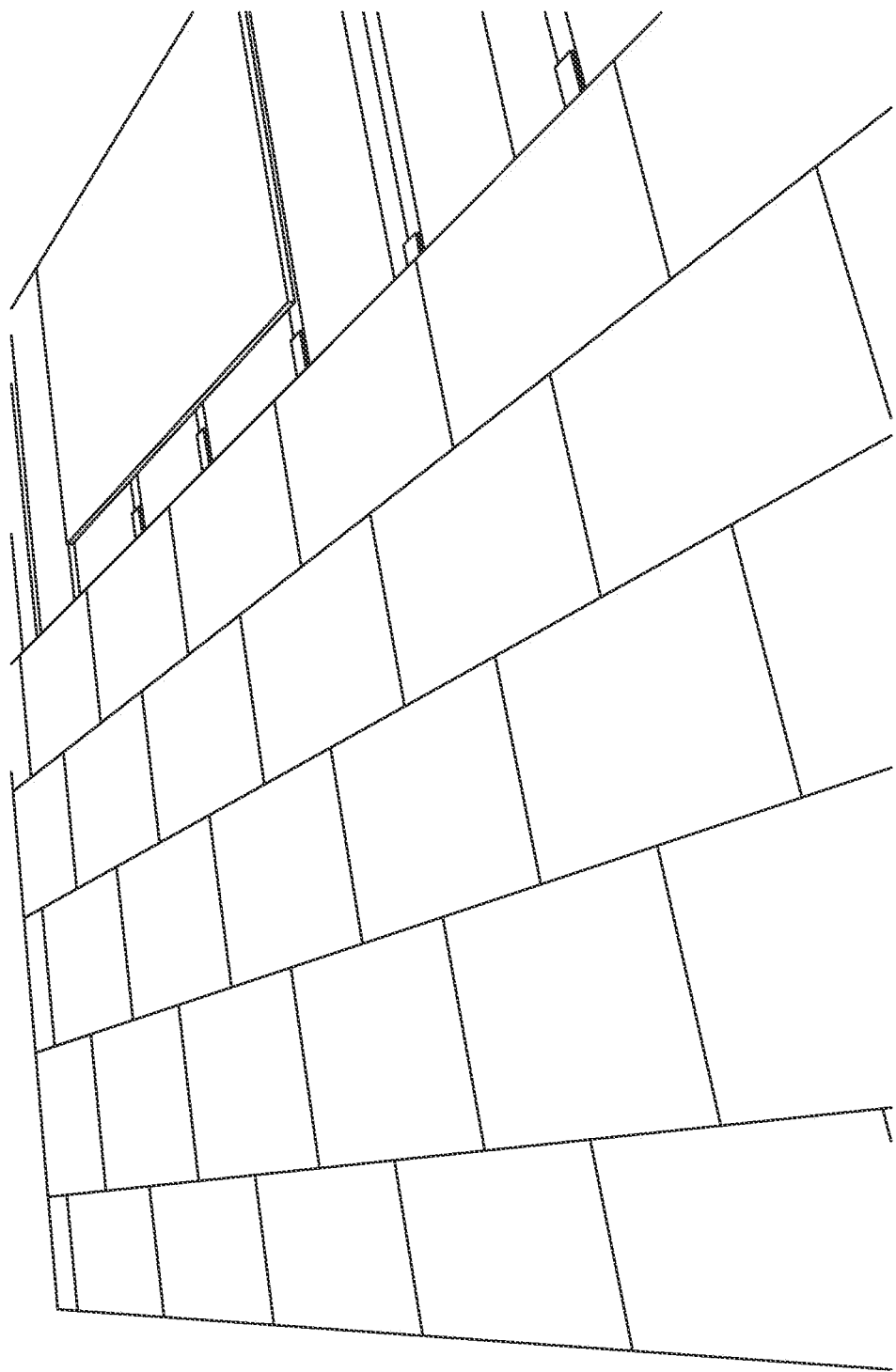
FIG. 12C is a perspective view of a portion of a deck constructed according to various aspects of the present disclosure.

Still referring to FIGS. 12A and 12B, the tile 20 may be formed with a protrusion 24b on an edge 24 thereof not configured with a groove 24a. The protrusions 24b may be configured such that when protrusions 24a of adjacent tiles 20 abut one another, the space between the edges 24 thereof is equal or approximately equal to the width of the clearance 25 between edges 24 of adjacent tiles 20 having grooves 24a formed therein. Various illustrative aspects of a portion of a deck 12 employing a tile and support structure 10 so configured is shown in FIG. 12C. However, in other aspects not pictured herein, the space between adjacent tiles 20 along edges 24 thereof having protrusions 24b may be different that the width of the clearance 25 without limitation unless so indicated in the following claims. It is contemplated that the clearance 25 and/or space between the edges 24 of adjacent tiles 20 having protrusions 24b formed therein may facilitate drainage of water and/or other liquids from the top face 22 of the tile 20 (and/or an area adjacent thereto) to an area below the tile 20, the path for which may proceed into the trough 32a and out through one or more apertures 32b. However, the specific spacing between any edge 24 of adjacent tiles 20 may vary according to the present disclosure without limitation unless so indicated in the following claims.

It is contemplated that for certain applications of the tile and support structure 10, it may be especially advantageous to construct the tile 20 from porcelain or stone, the substrate 18 (if present) from fiberglass, and the support structure 30 from aluminum. However, the tile and support structure 10 and various elements thereof may be constructed of any suitable material known to those skilled in the art without limitation unless so indicated in the following claims. Accordingly, the present methods and systems may work with any tile-based product, particularly tile made of clay. As disclosed herein, a tile 20 suitable for use as a deck tile may be comprised of fiber glass fiber and clay. For certain applications it may be desirable to configured the tile 20 such that not less than one-percent is fiberglass fiber by weight. Another tile 20 that may be suitable for certain applications according to the present disclosure may be comprised of fiber glass fiber and clay, with not less than twenty-five percent fiberglass fiber by weight. For certain applications, it may be advantageous for a tile 20 to have a width of approximately twelve inches, a length of approximately twenty-four inches, and a thickness of one to one and one half inches, without limitation unless so indicated in the following claims.

Illustrative Aspects of a Roofing Application

Figure 13:
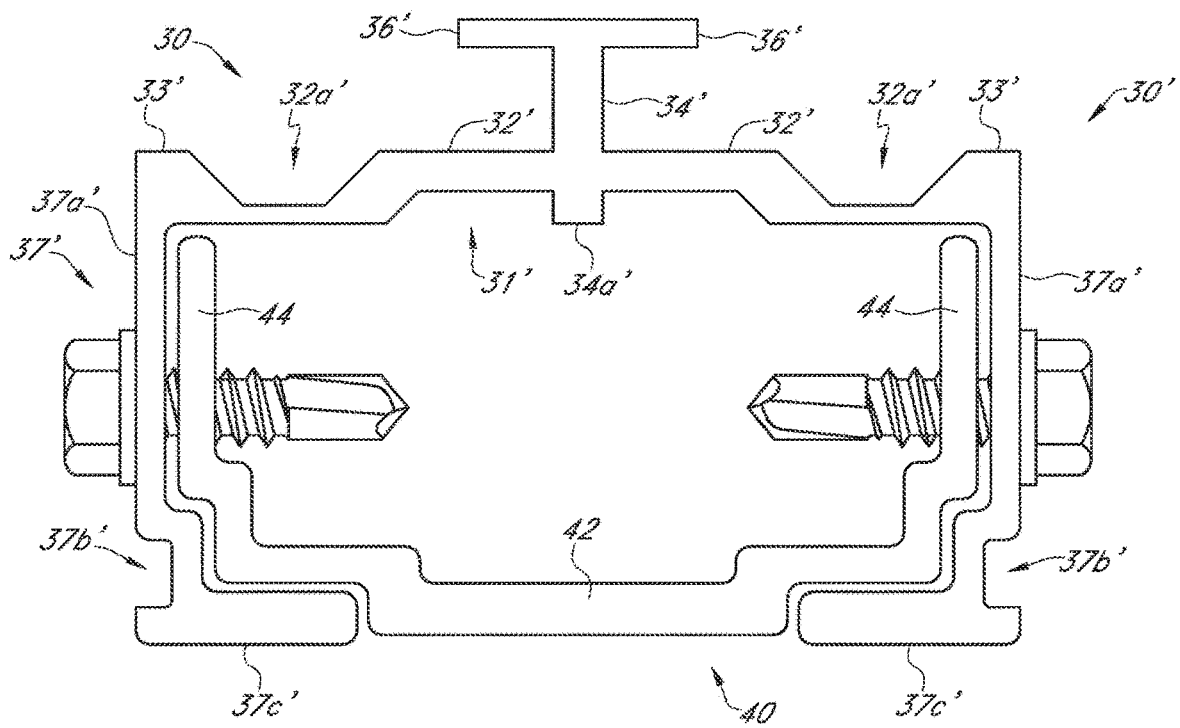
FIG. 13 is an end view showing various aspects of a roof support structure.

In another aspect of a tile and support structure 10 disclosed herein, the tile and support structure 10 may be configured for use in a roofing application. End views showing various aspects of a tile and support structure 10 configured for use in a roofing application are shown in FIGS. 13-16. The upper surface of a roof support structure 30' may be configured in a manner similar to that as previously described herein for a support structure 30. As shown in FIG. 13, which provides a cross-sectional view showing various aspects of a roof support structure 30', a roof support structure 30' may be comprised of a channel portion 37' to which a support structure 30 may be engaged. It is contemplated that the roof support structures 30' shown in FIGS. 13-15 may be configured as elongate members, such as rails. However, the scope of the present disclosure is not so limited unless so indicated in the following claims.

The support structure 30 and channel portion 37' may be separately formed and then later engaged with one another (e.g., via welding, mechanical fasteners, chemical adhesives, etc.) or integrally formed with one another during manufacturing without limitation unless so indicated in the following claims. Any suitable structure and/or method may be used to engage the support structure 30 with the channel portion 37' without limitation unless so indicated in the following claims. Any of the various aspects, features, configurations, etc. of a support structure 30 disclosed herein may be engaged with a channel portion 37' to form a roof support structure 30' without limitation unless so indicated in the following claims. Additionally, any of the various aspects, features, configurations, etc. of an edge support structure 30a disclosed herein may be engaged with a channel portion 37' and/or corresponding portion thereof to form an edge roof support structure 30a' without limitation unless so indicated in the following claims.

Referring still to FIG. 13, in an aspect of a roof support structure 30', the bottom surface of the base 31' may be configured in a manner that is similar to the support structures 30 previously disclosed herein, wherein two opposing flanges 32' may extend outward from a center of the base 31', and such that a tip 34a' may extend downward from the base 31'. That is, there may be open areas on either side of the tip 34a' on the bottom side of each flange 32. The tip 34a' may be collinear with the spine 34', and a trough 32a' may be formed in each flange 32'. A plurality of apertures 32b' may be formed each either trough 32a'. Each flange 32' may terminate at a lip 33', and to top surface of each flange 32' at the lip 33' and adjacent the spine 34' may be collinear as previously described for other aspects of a tile and support structure 10.

The channel portion 37' may include one or more side members 37a', which may extend downward from the either distal end of the base 31' (which distal end may be adjacent a lip 33') of the roof support structure 30'. The side members 37a' may terminate at a bottom member 37c', which bottom member 37c' may be configured such that it is generally perpendicular with respect to the side members 37a'. A notch 37b' may be formed in a side member 37a' between the bottom member 37c' and the base 31'. In an aspect of a roof support structure 30', the roof support structure 30' may be formed with two distinct bottom members 37c' at the terminal end of two distinct side members 37a', as shown at least in FIGS. 13, 14, & 15A, both of which are perpendicular with respect to the side members 37a' but parallel with respect to one another. In another aspect of a roof support structure 30', the roof support structure 30' may be formed with one continuous bottom member 37c' engaged with each side member 37a', as shown at least in FIG. 15B, which continuous bottom member 37c' may be perpendicular with respect to either side member 37b'. A cavity 39 may thus be formed bounded by the pair of flanges 32', the pair of side members 37a', and the bottom member 37c'. Accordingly, the specific configuration of the bottom member(s) 37c' in no way limits the scope of the present disclosure unless so indicated in the following claims.

Figure 14:
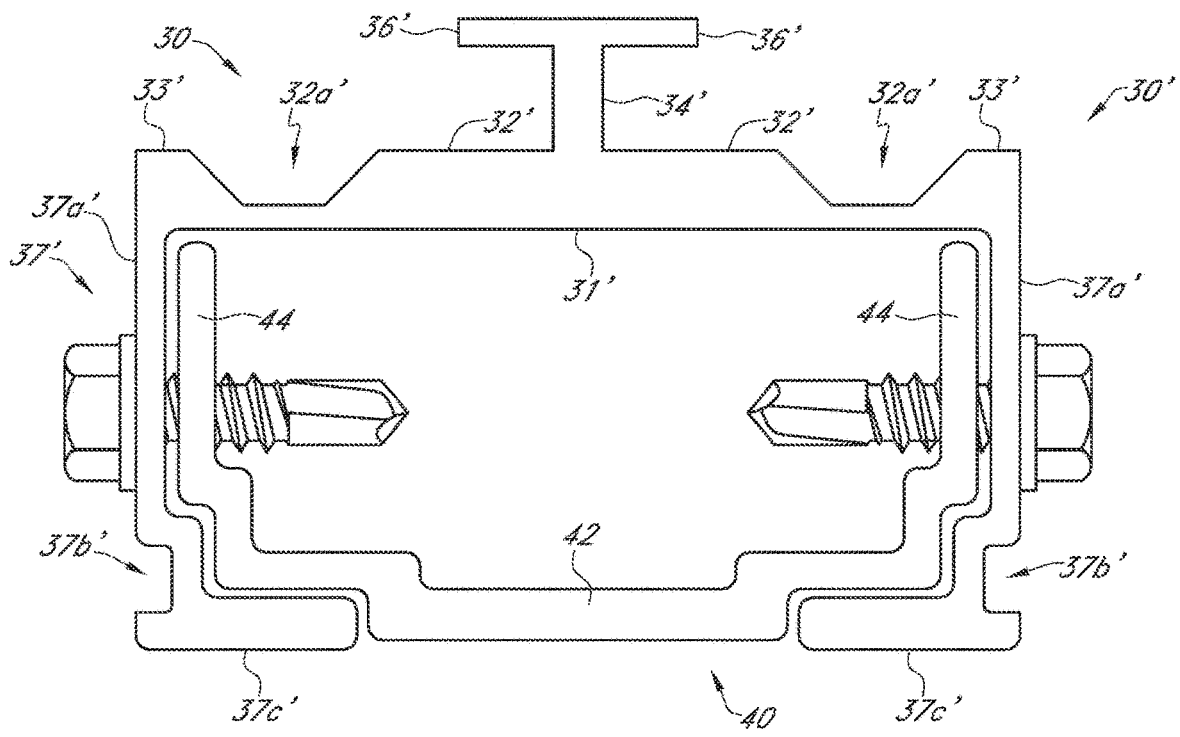
FIG. 14 is an end view showing other aspects of a roof support structure.
Figure 15A:
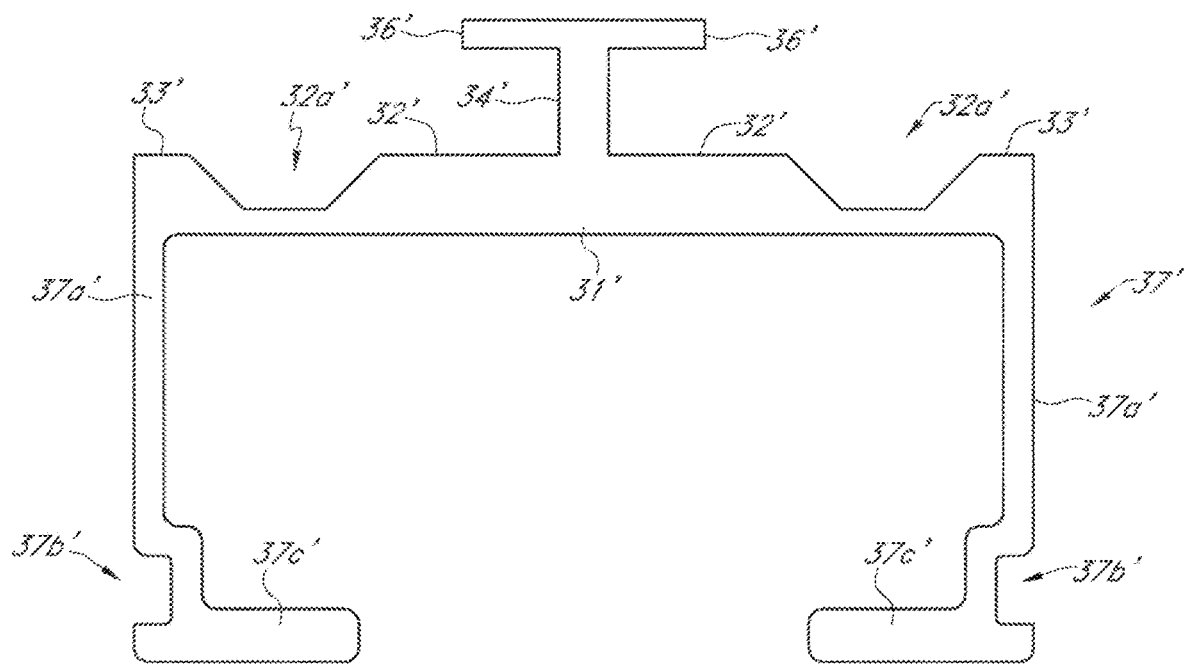
FIG. 15A is an end view showing other aspects of a roof support structure.
Figure 15B:
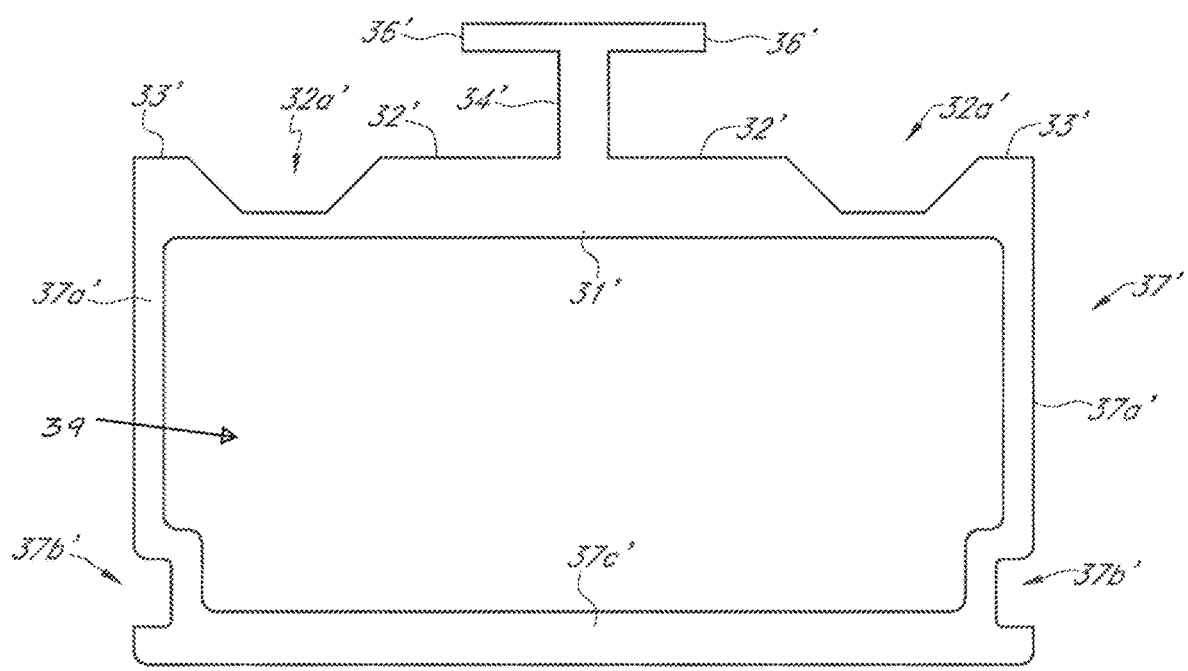
FIG. 15B is an end view showing other aspects of a roof support structure.

Referring now to FIG. 14, in an aspect of a roof support structure 30', the bottom surface of the base 31' may be configured such that it is planar. That is, the open areas on either side of the tip 34a' on the bottom side of each flange 32' (such as shown in FIG. 13) may be solid, which may be especially beneficial in aspects of a roof support structure 30' that is manufactured as an integral unit. In such a configuration, the roof support structure 30' may not include a tip 34a'. The channel portion 37' may include one or more side members 37a' extending downward from the distal ends of the base 31' (which distal end may be adjacent a lip 33'). The side members 37a' may terminate at a bottom member 37c', which bottom member 37c' may be configured such that it is generally perpendicular with respect to the side members 37a'. A notch 37b' may be formed in a side member 37a' between the bottom member 37c' and the base 31'. As previously described with respect to FIG. 13, the roof support structure 30' may be formed with two distinct bottom members 37c' at the terminal end of two distinct side members 37a', as shown at least in FIGS. 13, 14, & 15A, both of which are perpendicular with respect to the side members 37a' but parallel with respect to one another. In another aspect of a roof support structure 30', the roof support structure 30' may be formed with one continuous bottom member 37c' engaged with each side member 37a', as shown at least in FIG. 15B, which continuous bottom member 37c' may be perpendicular with respect to either side member 37b'. Accordingly, the specific configuration of the bottom member(s) 37c' in no way limits the scope of the present disclosure unless so indicated in the following claims.

Referring now to FIGS. 13 & 14, a roof support structure 30' may utilize an inner member 40, a portion of which may be positioned within and engaged with a channel portion 37' of the roof support structure 30'. The inner member 40 may include an inner member bottom 42 and one or more inner member sides 44 extending upward from the inner member bottom 42. The inner member 40 may be engaged with the roof support structure 30', which engagement be via any suitable structures and/or methods without limitation unless so indicated in the following claims.

It is contemplated that in roof support structure 30' configured to use an inner member 40, the inner member 40 may be engaged with one or more pedestals 50. Additionally, it is contemplated that for roof support structures 30' configured without an inner member 40, such as those shown in FIGS. 15A & 15B, may be engaged with one or more pedestals 50. For example, Eurotec, GmbH from Germany manufactures pedestals that may be configured with a "click adaptor" on a portion of the top surface of the pedestal, as shown on page 6 of Appendix A, which incorporated in and made a part of this disclosure. With a pedestal so configured, a roof support structure 30' (or correlative support structure 30) may be engaged with the pedestal 50 and click adapter, wherein a portion of that engagement may occur at the notch(es) 37b', and another portion of the engagement may consist of the bottom member(s) 37c' resting on the top surface of the pedestal 50. Generally, in one aspect a pedestal 50 may be engaged with suitable structures, structural components, surfaces and/or methods for forming an underlying support for a tile and support structure 10, which suitable structures, structural components, surfaces, and/or methods for forming an underlying support for a tile and support structure 10 include but are not limited to steel, other metals, metallic alloys, synthetic materials, cement, concrete, wood, ceramics, etc. unless so indicated in the following claims.

Figure 16A:
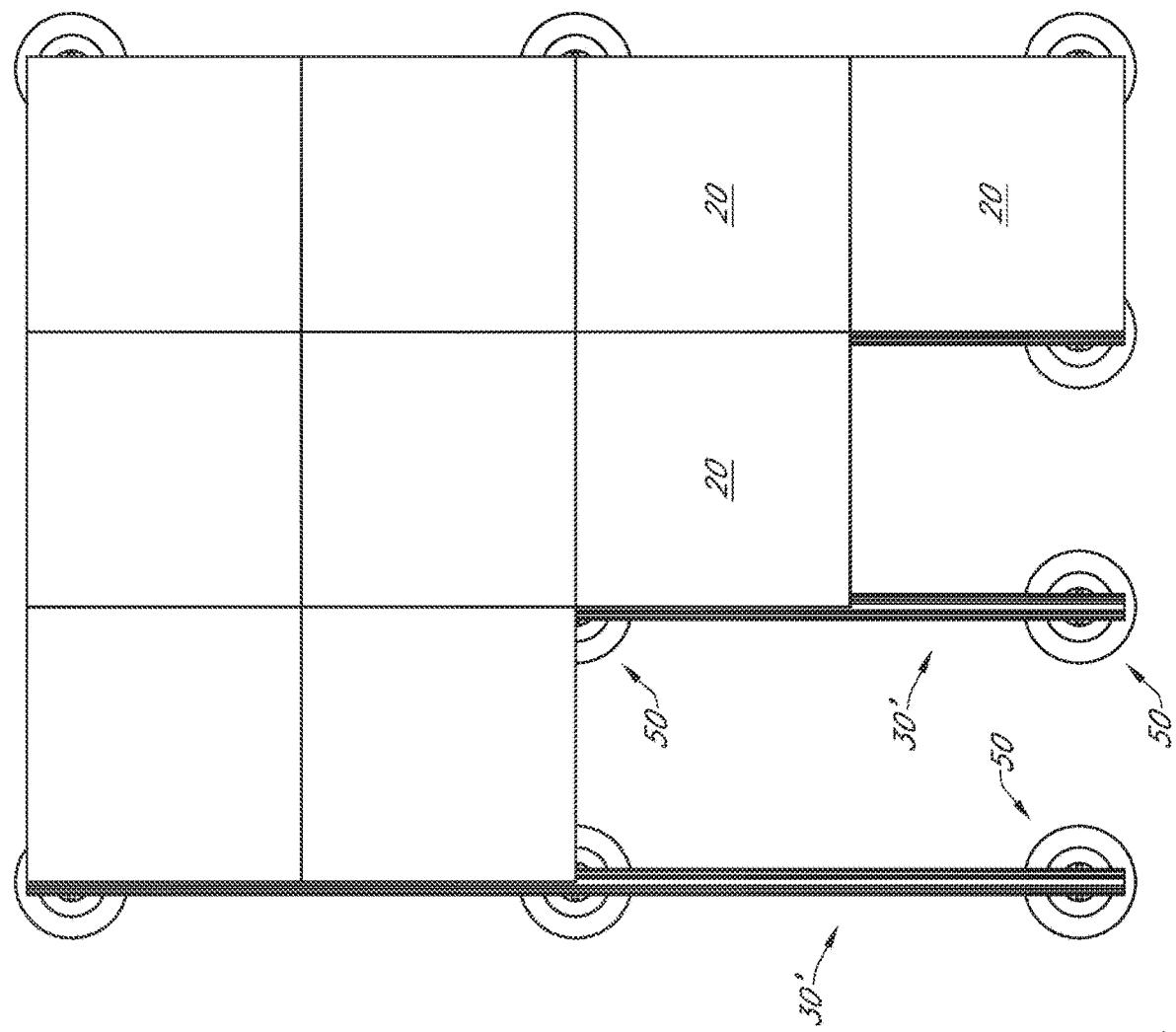
FIG. 16A is a top view of a tile and support structure that may be configured for use with pedestals.
Figure 16B:
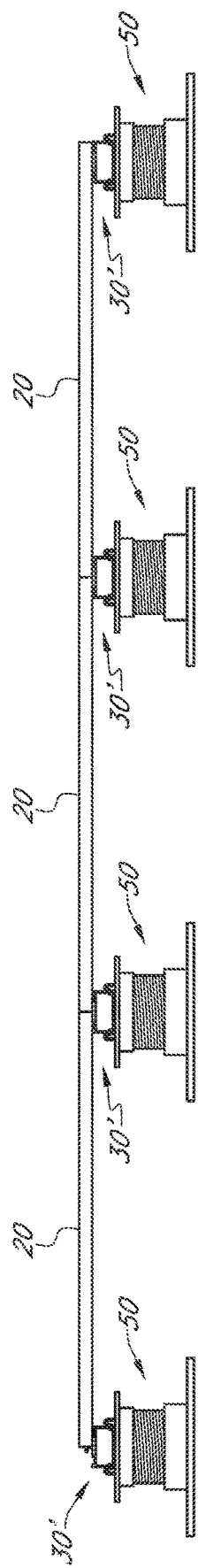
FIG. 16B is an end view of the tile and support structure shown in FIG. 16A.

Referring now to FIGS. 16A & 16B, an aspect of a roof support structure 30' may include one or more pedestals 50. It is contemplated that the pedestal base 52 may be engaged with a structure, such as a concrete surface, a wooden surface, or other structure, structural component, and/or surface on which a tile and support structure 10 may be positioned. However, any suitable structure and/or surface may be used, including but not limited to wooden surfaces, rock surfaces, ceramic surfaces, synthetic surfaces, etc. without limitation unless so indicated in the following claims. The roof support structure 30' may engage an upper portion of one or more pedestals 50 at the notches 37b' formed in either side member 37a' of the roof support structure 30' and at a top surface of the pedestal 50. After the pedestals 50 and roof support structures 30' are properly positioned and engaged with one another, one or more tiles 20 may be engaged with the roof support structures 30', various aspects of which engagement are described in further detail below. It is contemplated that the pedestals 50 may be adjustable for height and slope to accommodate variances in the structure, structural component, and/or surface to which the pedestals 50 are engaged, and/or to provide a slope to the tile 20 to adequately drain moisture from the tiles 20.

Illustrative Method of Use

Having described several preferred embodiments, an illustrative method of using the tile and support structure 10 will now be described. This method of use is not intended to limit the scope of the present disclosure in any way, but is instead provided for illustrative purposes only and may be applied and/or adapted to suit various aspects of the present systems and/or components thereof disclosed herein. Even though the foregoing illustrative method of use is primarily adapted for decks 12, the scope of the present disclosure is not so limited and a correlative method of using the roof support structure 30' with or without pedestals 50, and/or other systems and/or components within the spirit and scope of the present disclosure will occur to those having ordinary skill in the art in light of the present disclosure.

In one aspect, the tile and support structure 10 as disclosed herein may be used to build a deck 12, wherein the tread surface of the deck 12 may be comprised of the top faces 22 of the tiles 20. Generally, the supporting surface for a deck 12 may be a plurality of joists 14 arranged in a parallel fashion in a manner similar to that shown in FIG. 1. The use of joists 14 herein are for illustrative purposes only, and are in no way meant to be limiting. Accordingly, other suitable structures, structural components, surfaces and/or methods for forming a foundation and/or underlying support for a deck 12 may be used without limiting the scope of the present disclosure unless so indicated in the following claims.

An edge support structure 30a may be engaged with the joists 14 adjacent one end of the joists 14 (e.g., the end of the joists 14 engaged with the building or other structure adjacent the deck 12). Generally, "edge support structure 30a" and "support structure 30" may be used interchangeably throughout this description of an illustrative method of use. Accordingly, the scope of the present disclosure related to a method of using any system and/or component thereof disclosed herein is not limited by whether an edge support structure 30a or support structure 30 is used unless so indicated in the following claims. A support structure 30 may then be spaced from the edge support structure 30 by a predetermined amount and engaged with the joists 14 such that the position of the support structure 30 is fixed with respect thereto. As previously explained, a cross lathe may be positioned between the edge support structure 30a and the joist(s) 14 and/or between the support structure 30 and the joist(s) 14 if needed/desired.

The distance between the edge support structure 30a and the support structure 30 may be dependent at least upon the configuration of the tile 20 to be used with the deck 12, and more specifically at least upon the distance between edges 24 of the tile 20 having grooves 24a formed therein. Subsequent support structures 30 may be engaged with the joists 14 at predetermined distances from adjacent support structures 30 and/or edge support structures 30a. Depending at least upon the configuration of the tiles 20 to be used for the deck 12, the distance between adjacent support structures 30 may be generally uniform for all support structures 30 (e.g., for use with a deck 12 wherein most tiles 20 are generally of a similar shape), or some support structures 30 may be differently spaced with respect to adjacent support structures 30 (e.g., for use with a deck 12 wherein a certain number tiles 20 have different shapes). One end of the support structures 30 may be left accessible and another end thereof may be blocked and/or bound by another structure (which structure may include but is not limited to a wall of a building, a deck frame, joist 14 etc. unless so indicated in the following claims).

After the desired number of support structures 30 (and/or edge support structures 30a) have been engaged with the joists 14, a tile 20 may be positioned between adjacent support structures 30 (and/or between an edge support structure 30a and a support structure 30). The tile 20 may be slid along the length of the support structures 30 from an open end thereof to a blocked and/or bound end thereof. During this step, the rails 36 of the support structure 30 may be positioned within the groove 24a formed in one or more edges 24 of the tile 20. Another tile 20 may be slid along the length of the same support structures 30 until the protrusions 24b on the edges 24 of the tiles 20 engage one another. Subsequent tiles 20 may be positioned between other support structures 30 until a majority of the deck 12 is built.

In many instances it is contemplated that tiles 20 positioned on the periphery of the deck 12 may require cutting and/or resizing due to various factors, including but not limited to the shape of the periphery of the deck 12. Accordingly, after all or a majority of the standard sized and/or shaped tiles 20 have been properly positioned, specialized tiles 20 may be slid between adjacent support structures 30 and/or edge support structures 30a. After all desired tiles 20 have been properly positioned, the open ends of the support structures 30 and/or end support structures 30a may be blocked and/or bound by another structure (which structure may include but is not limited to a wall of a building, a deck frame, joist 14, specialized support structure 30 with suitable aesthetics, etc. unless so indicated in the following claims).

It is contemplated that for some aspects and/or applications it may be advantageous to use the tiles 20 to ensure that adjacent support structures 30 are properly spaced from one another. In such an embodiment, the support structures 30 may be engaged with a joist 14 only at one end of the support structures 30. As tiles 20 are positioned between the support structures 30, a user may ensure the proper position of the support structures 30 by placing a lateral force thereon such that the tiles 20 are effectively pinched between the support structures 30, at which point the support structures 30 may be engaged with the joist(s) 14 adjacent the most terminal tile 20. Those of ordinary skill in the art will appreciate that this may be done in a progressive manner. That is, as each row of tiles 20 is slid between the support structures 30, another fastener(s) 16 may be used to engage the support structure(s) 30 with the joist(s) 14.

Those of ordinary skill in the art will appreciate that a method similar to the immediately preceding method may be extrapolated therefrom for use with a roof support structure 30' such as those shown in FIGS. 13-16. In such a method, the pedestals 50 and roof support structures 30' may be engaged with a suitable structure, structural component, and/or surface. The tiles 20 may be slid along the length of the roof support structures 30' in a manner similar to that as previously described.

Alternatively, one or more pedestals 50 for supporting a first roof support structure 30' (which may constitute a roof edge support structure 30a' and/or border) may be positioned on a suitable structure, structural component, and/or surface. The height of the pedestals 50 may be adjusted as desired, and a roof edge support structure 30a' may be engaged with the pedestals 50. The user may now secure another pedestal 50 or row of pedestals 50 in a manner generally parallel to the first roof support structure 30' but spaced apart therefrom and adjust the height of those pedestals as desired. The user may engage a roof support structure 30' with the second pedestal 50 or row thereof. At this point one or more tiles 20 may be slide between the roof edge support structure 30a' and the roof support structure 30'. Alternatively, all the required pedestals 50 and roof support structures 30' and/or roof edge support structures 30a' may be properly positioned and secured prior to installation of any tiles 20.

Those of ordinary skill in the art will appreciate that at this point, the relative positions of the tiles 20, support structures 30, and joists 14 generally may fixed in three dimensions, but simultaneously incremental changes in those relative positions may be allowed via flexing, bending, and/or other allowed movement between one tile 20 and adjacent tiles 20, between a tile 20 and support structures 30 engaged with the tile 20, and/or between a support structure 30 and the joist(s) 14 (or other suitable structures, structural components, surfaces and/or methods for forming a foundation and/or underlying support for a deck 12) with which it is engaged. It is contemplated that at least the configuration of the tiles 20 may affect the amount of incremental changes in the above-referenced relative positions. It is contemplated that a configuration allowing some or all of the incremental changes in relative positions listed above may prevent cracking and/or other damage to the tiles 20, which may be manufacturing of a generally rigid, inflexible material.

Alternative Aspects of a Tile & Support Structure

Other aspects of a tile & support structure 10 employing a retaining element 60 are shown in FIGS. 17A-17D. As shown therein, a tile & support structure 10 may be configured for use with a retaining element 60, various illustrative aspects of which are shown in cross-section in FIGS. 17A-17D. Generally, it is contemplated that a portion of the retaining element 60 may be positioned in a groove 24a formed in an edge 24 of a tile 20 in a manner analogous to that in which the rail 36 may be positioned in a groove 24a as previously described herein for other aspects of a tile & support structure 10.

It is contemplated that a tile & support structure 10 employing a retaining element 60 may be adapted for use in a variety of applications using a variety of support structures 30 while simultaneously allowing relatively easy removal of a tile 20, as further described below. Additionally, an aspect of a tile & support structure 10 like those shown in FIGS. 17A-17D is that the tiles 20 may be configured in an orientation other than straight, such as curved, radiused, and/or an otherwise nonlinear fashion. This configuration may be a result of one or more edge 24 of a tile 20 being curved, radiused, an/or otherwise non-linear without limitation unless so indicated in the following claims. The tile & support structure 10 shown in FIG. 17C may be especially adapted for use in nonlinear tile 20 configurations, but other tile & support structures 10 may be configured for nonlinear tile 20 configurations without limitation unless so indicated in the following claims.

Referring now to FIG. 17A, which provides a cross-sectional view of a tile & support structure 10, wherein the support structure 30 may be configured as an extruded rail-like structure having a base 31 with a generally planar upward-facing surface. Generally, it is contemplated that one or more tiles 20 may rest upon the generally planar upward-facing surface of the base 31. The support structure 30 may be configured in a manner that is somewhat similar to a bottom portion or rail portion 37' of the roof support structures 30 shown in FIGS. 13-16, wherein the support structure 30 may include one or more side members 37a' having a notch 37b' formed in a side member 37a', and wherein the side members 37a' may extend downward from the base 31. Additionally, one or more bottom members 37c' may be engaged with the bottom edge of either side members 37a' in a manner analogous to that previously described with respect to FIGS. 15A & B without limitation unless so indicated in the following claims.

The support structure 30 may be formed with various walls, supports, channels, angles, and/or other features therein to provide the required rigidity and/or structural integrity for the specific application of the tile & support structure 10. A support structure 30 such as that shown in FIG. 17A may be engaged with one or more joists 14 in an elevated deck application, with a flat floor and/or sub-floor structure, a flat roof and/or sub-roof structure, and/or any other suitable structures, structural components, and/or surfaces without limitation unless so indicated in the following claims.

The support structure 30 may be formed with one or more anchors 38, which anchor(s) 38 may be configured to securely engage a portion of a fastener 16. The fastener 16 may engage the retaining element 60 such that the relative positions of the fastener 16 and retaining element 60 are fixed with respect to one another. Alternatively, the fastener 16 may engage the retaining element 60 such that the retaining element 60 may rotate with respect to the fastener 60. Still further, the fastener 16 may engage the retaining element 60 such that the retaining element 60 may move longitudinally along the axis of the fastener 16 (but not radially with respect to the longitudinal axis of the fastener 16), which movement may be allowed alone or in conjunction with rotation of the retaining element 60 with respect to the fastener 16. Accordingly, the scope of the present disclosure is not limited by the relative movement between the fastener and retaining element 60 unless so indicated in the following claims.

The retaining element 60, 60' may include a neck 62, 62', which may be integrally formed with retaining element 60, 60'. The neck 62, 62' may provide a limit to the distance into a support structure 30 or other suitable structure, structural component, and/or surface that a fastener 16 associated with the retaining element 60, 60' may penetrate. The optimal length of the neck 62, 62' may vary from one application of the tile & support structure 10 to the next without limitation unless so indicated in the following claims. However, it is contemplated that in some applications it may be advantageous to configure the length of the neck 62, 62' to be approximately equal to the thickness of the substrate 18 adjacent the groove 24a. It is contemplated that such a configuration may ease installation of a tile 20 by providing a type of automatic stop for the depth of a fastener 16 associated with a retaining element 60, 60', such that the exposed side of the retaining element 60, 60' may be relatively easily engaged with the groove 24a in another tile 20.

Referring now to FIGS. 17A-17C, a portion of the retaining element 60 may be positioned in the groove 24a formed in the edges 24 of two adjacent tiles 20. It is contemplated that the retaining element 60 may be formed as a circle, an oval shape, or any other suitable shape without limitation unless so indicated in the following claims. For the tiles 20 and support structures 30 positioned at the borders, the retaining elements 60 may be configured such that the retaining elements 60 are asymmetrical in shape. Various aspects of a retaining element 60' that may be used on a border are shown in FIG. 18. That retaining element 60' may be configured to engage only one groove 24a in one tile 20 on a single side of the retaining element 60' as opposed to a retaining element 60 configured to engage a groove 24a in each of two adjacent tiles 20 on either side of the retaining element 60.

As shown in FIGS. 17A-17C, the anchor 38 may be configured as a threaded aperture and the fastener 16 may be configured as a screw and/or bolt with threads corresponding to those formed in the anchor 38. In an aspect, the threaded portion of the fastener 16 may pass through an aperture in the retaining element 60 and engage the anchor 38, thereby selectively securing the relative positions of the fastener 16, support structure 30, the retaining element 60, and the tiles 20 with grooves 24a in which the retaining element 60 is positioned. Alternatively, the various components may be configured such that after the threaded portion of the fastener 16 has passed through an aperture in the retaining element 60 and engaged the anchor 38, the tile(s) 20 with grooves 24a in which the retaining element 60 is positioned may be immobilized save for a dimension that is collinear with the length of the groove 24a for a specific tile 20. That is, the retaining element 60 and underlying support structure 30 may be configured such that tiles 20 may slide with respect to the retaining element 60 and support structure 30 during installation of the tile(s) 20, but such that after installation the relative positions of the retaining element 60 and support structure 30 are generally fixed with respect to the position of the tile(s) 20 in three dimensions. One or more retaining elements 60 may be configured such that in conjunction with an underlying structure (such as a support structure 30 or other suitable structures, structural components, surfaces) the retaining elements 60 prevents and/or mitigates uplift of one or more tiles 20 due to wind, prevents and/or mitigates unauthorized removal of a tile 20, and/or prevents and/or mitigates unwanted movement of the tile 20. It is contemplated that one or more retaining elements 60 may provide various benefits without the need for adhesive while simultaneously providing adequate securement of one or more tiles 20.

The width of the retaining element 60 and the width of the fastener 16 may be selected such that a clearance 25 exists between the edges 24 of adjacent tiles 20, wherein the clearance 25 is wide enough to allow access for selective removal of the fastener 16 by extending a tool (such as a screwdriver in one aspect) into the clearance 25 and engaging the tool with the fastener 16 to disengage the fastener 16 from the support structure 30. Alternatively, the tool may be extended into the clearance 25 and engage the fastener 16 to tighten the fastener 16 and/or engage the fastener 16 with the support structure 30. Accordingly, in an aspect a tile & support structure 10 utilizing retaining elements 60 as disclosed herein to secure the position of one or more tiles 20 with respect to a support structure 30, a user may selectively remove one or more tiles 20 singularly without removing unwanted tiles 20 and without cutting, breaking and/or otherwise altering the support structure 30 and/or tiles 20. It is contemplated that the ability to selectively remove one tile 20 at a time may be especially advantageous if one or more tiles 20 restrict access to certain items, such as ventilation ducts, electrical wiring, plumbing, etc.

Referring now to FIG. 17B, which shows a support structure 30 as it may be engaged with a joist 14, the tile & support structure 10 may be employed in a raised-deck application. It is contemplated that the tile & support structure 10 shown in FIG. 17A may provide the various benefits of other tile & support structures 10 disclosed herein, but which may be specifically adapted for use in a raised-deck application. The support structure 30 may be formed with one or more apertures 32b therein to provide a channel though which a fastener 16 may pass, which fastener 16 may be used to secure the support structure 30 to one or more joists 14 (or other suitable structure, structural component, and/or surface without limitation unless so indicated in the following claims).

Referring now to FIGS. 17A and 17B, it is contemplated that a plurality of tiles 20 may be installed using a retaining element 30 in a manner similar to that of installing tongue-and-groove coverings (e.g., flooring, ceilings, etc.). However, the scope of the present disclosure is not limited by the specific method of installation unless so indicated in the following claims. Still referring to FIGS. 17A and 17B, it is contemplated that for installation, a user may first secure a support structure 30 on a border, and then secure a second support structure 30 parallel to but spaced apart from the border support structure 30. The user may then install a row of tiles 20 with retaining elements 60' configured for border tiles 20 on the outer edge 24 of the tiles 20, wherein a fastener 16 associated with those retaining elements 60' may engage anchors 38 formed in the border support structure 30, and wherein a portion of the retaining element(s) 60' may be positioned in a groove 24a formed in the outer edge 24 of the border tile 20. The tile(s) 20 on either end of the row may be prevented from moving in at least two dimensions (e.g., the two horizontal dimensions) by a wall, baseboard, or other structure adjacent the row of tiles 20.

The user may then install retaining elements 60 on the inner edge 24 of the border tiles 20, wherein a fastener 16 associated with those retaining elements 60 may engage anchors 38 formed in the second support structure 30 that is adjacent to but spaced from the border support structure 30, and wherein a portion of the retaining element(s) 60 may be positioned in a groove 24a formed in the inner edge 24 of the border tile 20 (which inner edge 24 may rest on the second support structure 30). The optimum number of retaining elements 60, 60' engaged with a given tile 20 will vary from one application of the tile & support structure 10 to the next, and may be dependent at least upon the size of a tile 20, the number of tiles 20, and/or the elevation of the tile 20 from ground level. In an aspect, four retaining elements 60, 60' positioned approximately adjacent four corners of a tile 20 may be used to adequately fix the relative position of the tile 20. However, other numbers and/or relative positions of retaining elements 60, 60' may be used without limitation unless so indicated in the following claims, and the optimal number and/or relative positions may depend at least on the size and/or shape of the tile(s) 20.

At this point, the user may secure a third support structure 30 adjacent the second support structure 30 in an orientation that is parallel to but spaced from the second support structure 30. It is contemplated that for some applications, the distance between adjacent support structures 30 may be equal, while in other applications the distance between adjacent support structures 30 may vary at least depending on the uniformity of the size and/or shape of tiles 20 used therewith. Additionally, for certain applications it is contemplated that one or more of the support structures 30 may be radiused, curved, and/or otherwise non-linear. Accordingly, the scope of the present disclosure is in no way limited by the specific distance between adjacent support structures 30 or whether such support structures 30 are linear or non-linear unless so indicated in the following claims.

The user may place a first edge 24 of another tile 20 on the second support structure 30 such that a portion of the exposed retaining element(s) 60 slides into the groove 24a on the first edge 24 of the tile. A second edge 24 of the tile 20 that is parallel to but opposite of the first edge 24 may be placed on the third support structure 30 and one or more retaining elements 60 may be positioned in a groove 24a on the second edge 24, and the position of those retaining elements 60 relative to the tile 20 and third support structure 30 may be secured via engaging a fastener 16 with those retaining elements 60 and the third support structure 30. This process may continue until the desired number of tiles 20 are positioned on the support structures 30, at which time one or more retaining elements 60' may be engaged with a subsequent border support structure(s) 30 to secure the relative position of one or more subsequent border tiles 20. Because the support structures 30 may be configured as elongate, straight extrusions, it is contemplated that installation may be relatively expeditious.

Referring now to FIG. 17C, which shows various aspects of a tile & support structure 10 that may be configured for use with one or more laths 19 (which laths 19 include but are not limited to those constructed of wood unless so indicated in the following claims). It is contemplated that the method of installing a tile and support structure 10 such as that shown in FIG. 17C may be analogous to the method for the tile and support structure 10 shown in FIGS. 17A and 17B, wherein laths 19 are used in place of support structures 30. Accordingly, fasteners 16 associated with a retaining element 60, 60' may directly engage the lath 19, and the lath 19 may have predrilled holes for accepting fasteners 16, or the lathe 19 may be used without predrilled holes.

The optimal configuration (length, threads, diameter, etc.) of the fastener 16 associated with the retaining element 60, 60' may vary from one application of the tile & support structure 10 to the next, and may depend at least upon the configuration of the support structure 30 and/or other suitable structure, structural component, and/or surface to which the fastener 16 is secured during use. In another aspect, and without limitation unless so indicated in the following claims, the fastener 16 may be configured to engage a roof support structure 30', such as those shown in FIGS. 13-16B. In a specific illustrative example, a fastener 16 configured to engage a lath 19 may be configured with threads that are coarser and/or having a longer threaded portion than those on a fastener 16 configured to engage an anchor 38 in a support structure 30. Accordingly, the specific configuration of the fastener 16 in no way limits the scope of the present disclosure unless so indicated in the following claims.

The retaining elements 60, 60' may be constructed of any suitable material, including but not limited to metals, plastics, polymers, natural materials, and/or combinations thereof without limitation unless so indicated in the following claims. Additionally, it is contemplated that the thickness of a retaining element 60, 60' may optimally be slightly less than the thickness of the groove 24a in the edge 24 of a tile 20 for which the retaining element 60, 60' is designed, and that the shape may be any suitable shape (e.g., square, oblong, circular, rectangular, etc.). Accordingly, the retaining elements 60, 60' may be formed with any different thicknesses and/or shapes without limitation unless so indicated in the following claims.

Alternative Aspects of a Support System and Pedestal

Referring now to FIGS. 19A-23B, an aspect of a support structure 30 may include a pedestal 50. Such a support structure 30 may be configured as a roof support structure 30', but may also be configured for use with a deck, elevated patio, and/or any other surface without limitation unless so indicated in the following claims. It is contemplated that in an aspect, all or a portion of the support structure 30 may be engaged with a pedestal upper surface 54, which may be positioned opposite a pedestal base 52. As with other aspects of pedestals 50 previously described herein, it is contemplated that the pedestal base 52 may be engaged with an underlying supporting structure and/or surface, including but not limited to concrete unless so indicated in the following claims. Accordingly, any or other suitable structure, structural component, and/or surface may be used, including but not limited to wooden surfaces, synthetic surfaces, metallic surfaces, etc. without limitation unless so indicated in the following claims.

In an aspect, it is contemplated that a pedestal 50 may be adjustable for height via an adjustment portion 53 (which may be positioned between the pedestal base 52 and pedestal upper surface 54) and/or slope to accommodate variances in the structure, structural component, and/or surface to which the pedestals 50 are engaged and/or to provide a slope to the tile 20 engaged with the pedestal 50 so as to adequately drain moisture from the tiles 20. Further, it is contemplated that in an aspect all or a portion of what would constitute the support structure 30 may be integrally formed with a portion of the pedestal 50, such as the pedestal upper surface 54, as further described in more detail below. However, the scope of the present disclosure is not so limited unless so indicated in the following claims. For purposes of clarity, the term "pedestal 50" as used when referring to FIGS. 19A-23B may be used in a manner that is inclusive of the support structure 30.

As shown, a pedestal 50 may be configured with one or more spines 34 extending from a pedestal upper surface 54. In an aspect shown at least in FIGS. 19A-22A, one or more spines 34 may extend upward from the pedestal upper surface 54 along and/or adjacent to a diameter of the pedestal upper surface. In an aspect of a pedestal 50 shown at least in FIGS. 19A-22B, this diameter may be collinear with a diameter of the pedestal base 52 and/or adjustment portion 53. That is, in one aspect a common line may pass through the geometric center point of the pedestal upper surface 54, the geometric center point of the adjustment portion 53, and/or the geometric center point of the pedestal base 52. In an aspect, as many as four spines 34 may extend from a single pedestal upper surface 54, various aspects of which are shown in FIG. 22B, or as few as one spine 34 may extend from a single pedestal upper surface 54, various aspects of which are shown in FIGS. 19A, 19B, and 21.

Figure 22B:
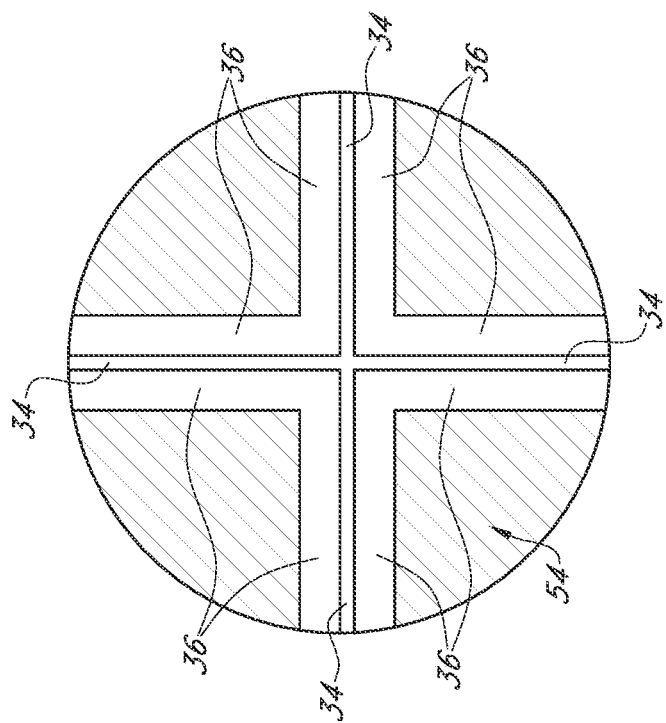
Figure 22A:
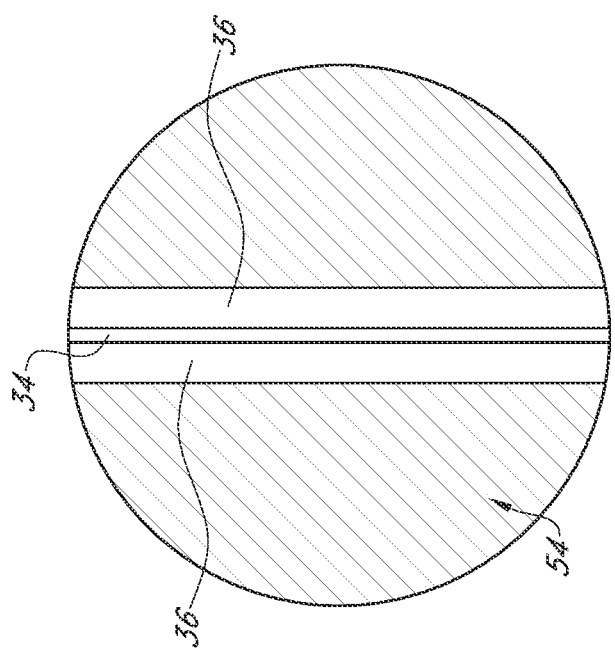
FIG. 22A provides a top view showing additional aspects of a support system that may be engaged with a pedestal.

The spines 34 may be configured such that the four spines 34 comprise two pairs of collinear spines 34 (which configuration is shown at least in FIG. 22B), wherein the two pairs may be perpendicular with respect to one another and positioned along diameters of the pedestal upper surface 54 intersecting one another at a right angle. The spines 34 may extend all the way to the center point of the pedestal upper surface 54 as shown in FIGS. 22A and 22B, or the spines 34 may extend only part way between the periphery of the pedestal upper surface 54 and the center point of the pedestal upper surface 54 (as shown in FIGS. 19A-20B). Accordingly, the distance along the pedestal upper surface 54 that a given spine 34 extends in no way limits the scope of the present disclosure unless so indicated in the following claims.

Figure 19A:
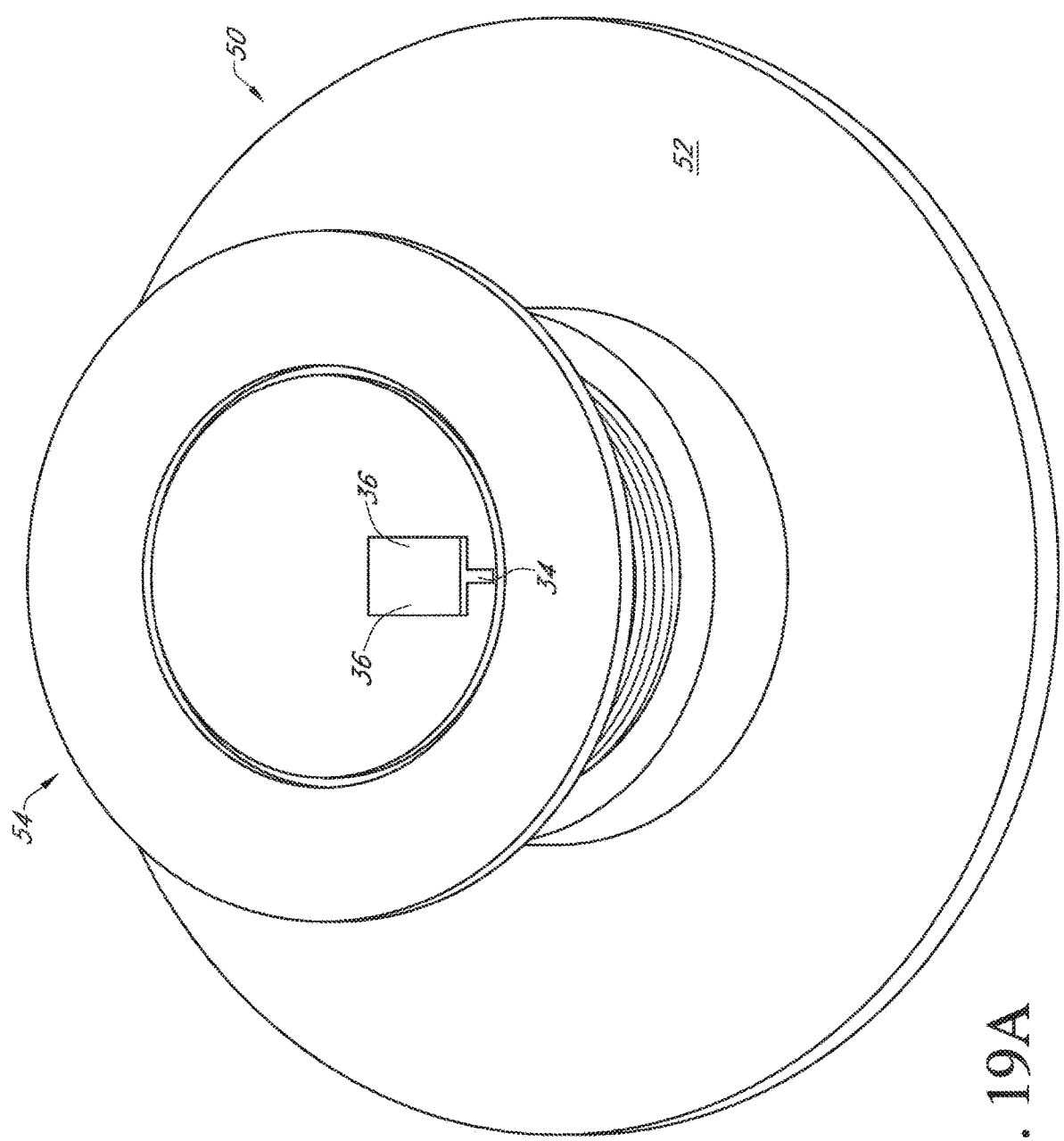
FIG. 19A provides an elevated perspective view showing aspects of a support system that may be engaged with a pedestal.
Figure 19B:
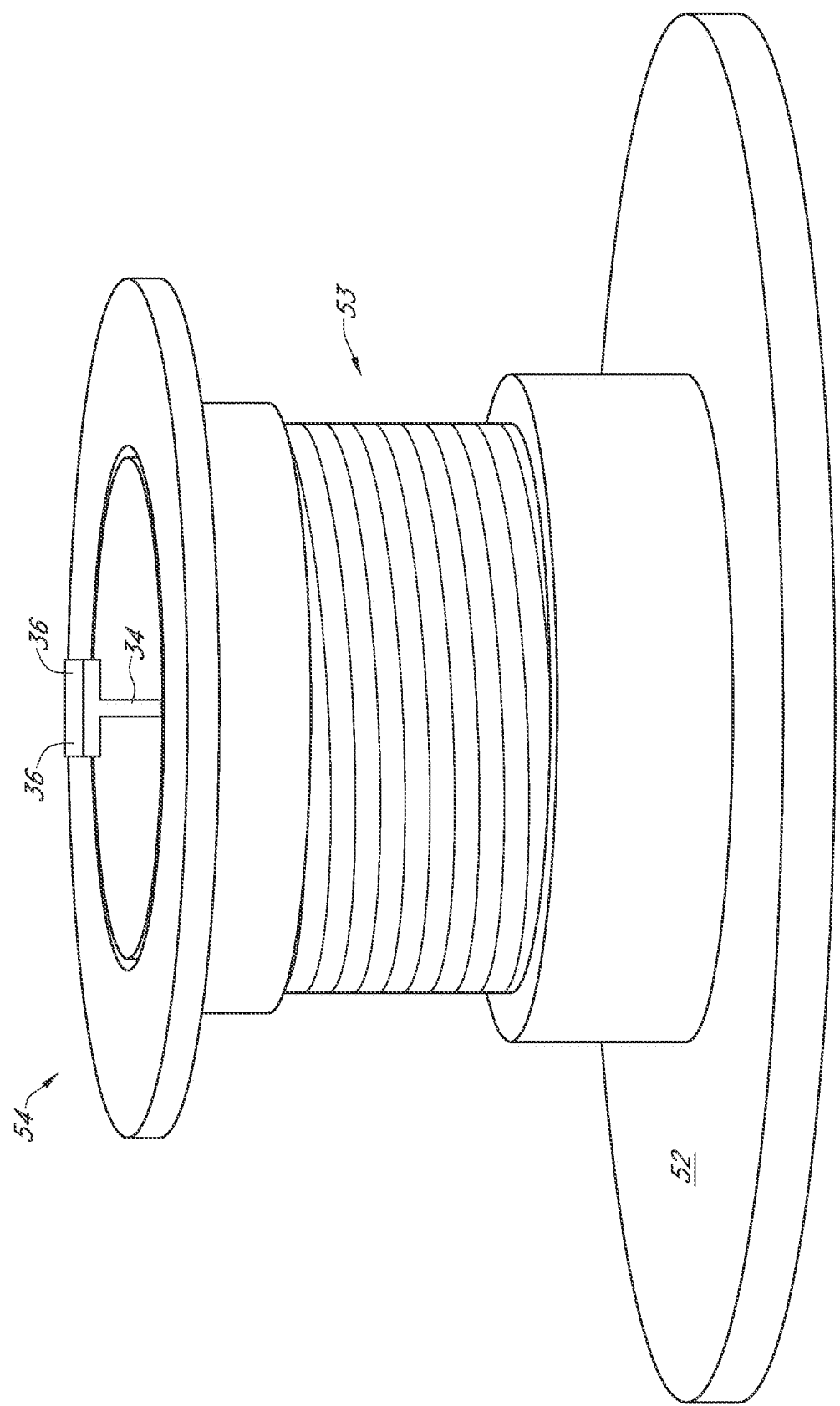
FIG. 19B provides a side view of the support system and pedestal shown in FIG. 19A.
Figure 20A:
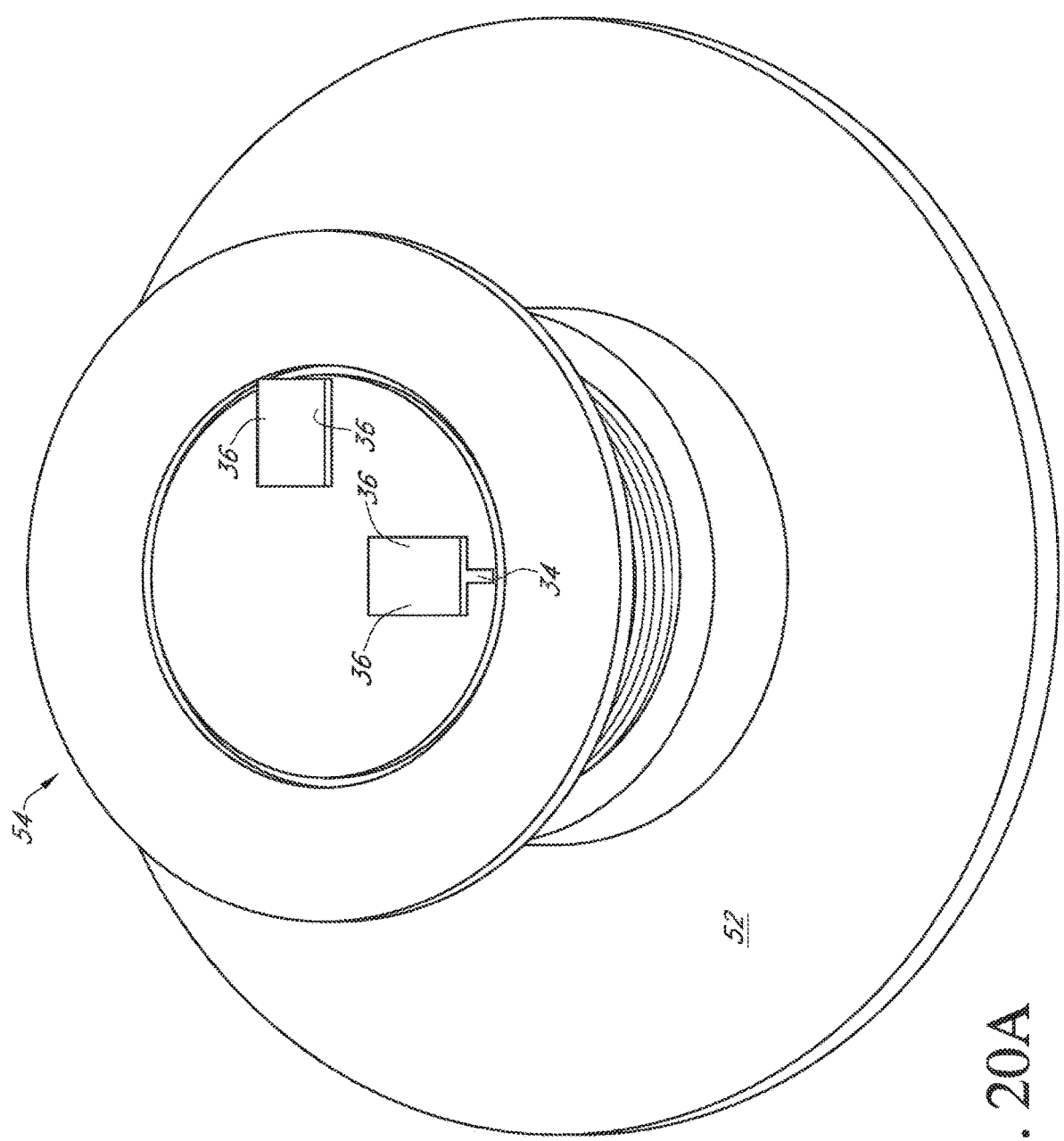
FIG. 20A provides an elevated perspective view showing further aspects of a support system that may be engaged with a pedestal.
Figure 20B:
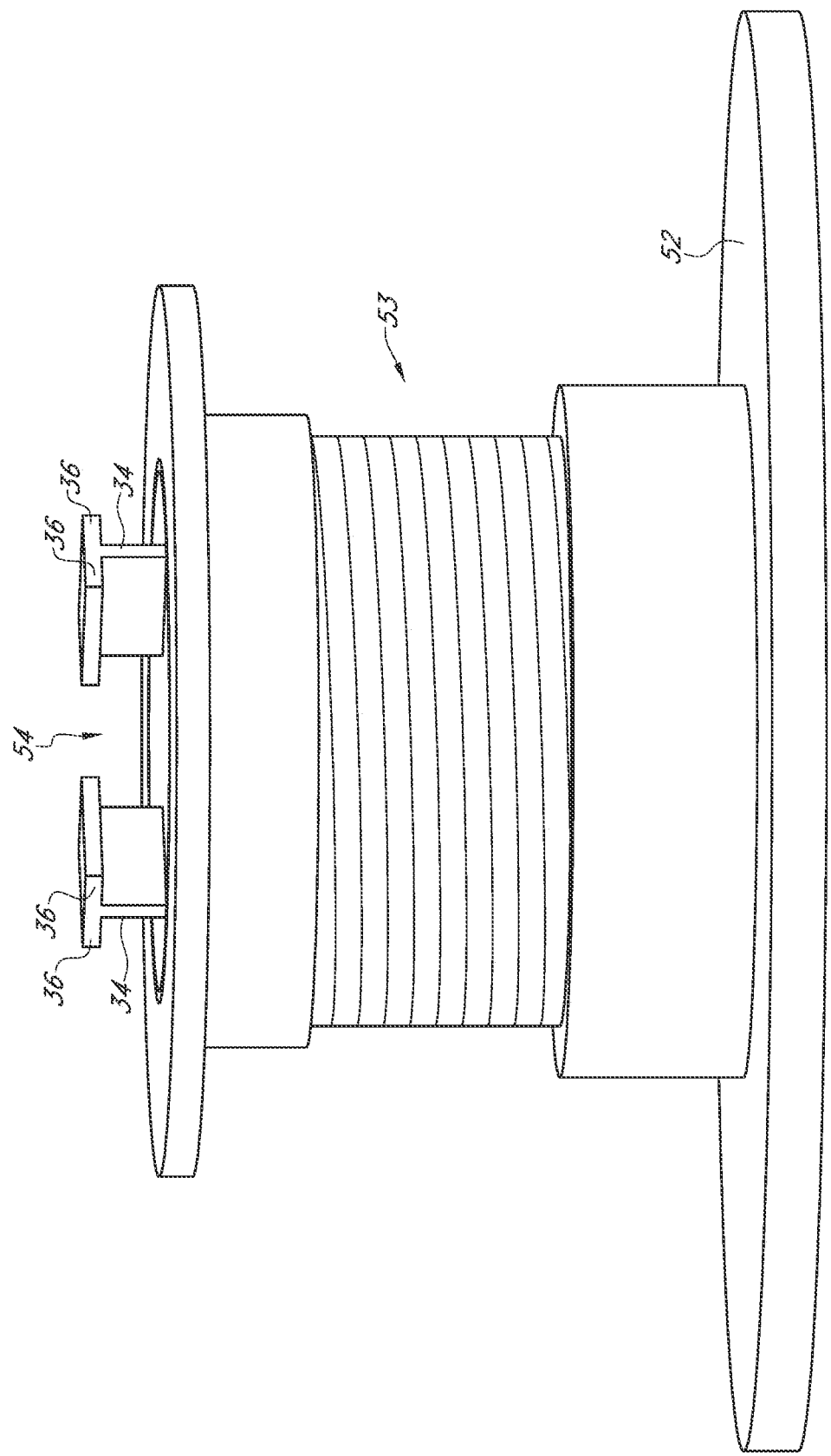
FIG. 20B provides a side view of the support system and pedestal shown in FIG. 20A.
Figure 21:
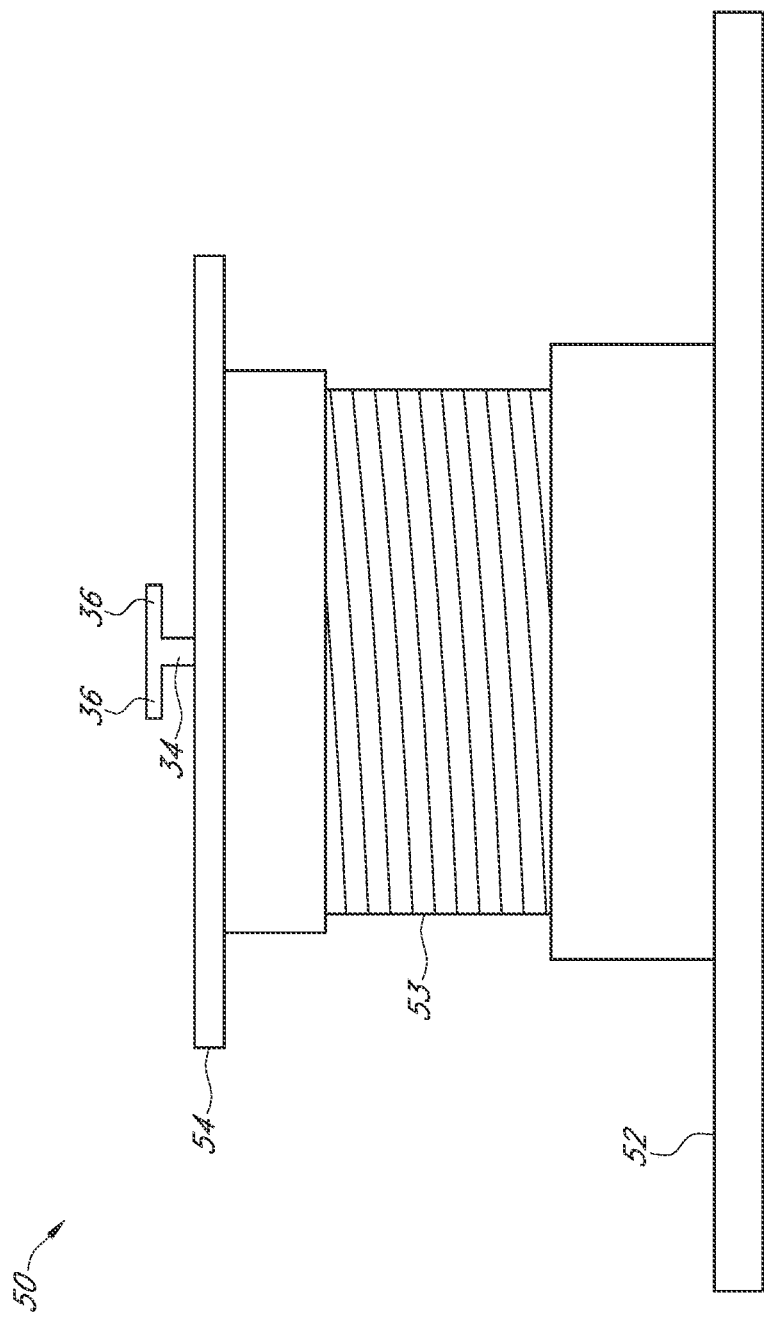
FIG. 21 provides a side view of another aspect of a support system that may be engaged with a pedestal.

In another aspect shown at least in FIGS. 19A, 19B, and 21, one spine 34 may extend from a pedestal upper surface 54 along a first diameter thereof. In still another aspect shown at least in FIGS. 20A and 20B, two spines 34 may extend from the pedestal upper surface 54, wherein a first spine 34 may be positioned on a first diameter of the pedestal upper surface 54 and a second spine 34 may be positioned on a second diameter of the pedestal upper surface 54, wherein the first and second diameters may be perpendicular with respect to one another. In still a further aspect, two spines 34 may extend upward from the pedestal upper surface 54 along a first diameter thereof, wherein a first spine 34 may be positioned on an opposite side of the center point of the pedestal upper surface 54 with respect to a second spine 34. Accordingly, the specific number, orientation, and/or configuration of spines 34 extending from a pedestal upper surface 54 in no way limits the scope of the present disclosure unless so indicated in the following claims.

At the top distal end of the spine 34, two corresponding rails 36 may extend outward from the spine 34 in a generally horizontal dimension. In this aspect, the spine 34 and rails 36 may correspond directly to the spine 34 and/or rail(s) 36 previously described regarding aspects of a support structure 30 in FIGS. 4-12C and/or to the spine 34' and rail(s) 36' previously described regarding aspects of a roof support structure 30' in FIGS. 13-16B. However the spine 34 and/or rail(s) 36 may be differently configured without limitation unless so indicated in the following claims.

In certain applications, it may be advantageous to construct the pedestal 50, spine 34, and/or rail(s) 36 of a plastic, polymer, or other synthetic material, or of a metal or metallic alloy. However, those elements may be constructed of any suitable material, including but not limited to plastic, polymers, natural materials, metals and their alloys and/or combinations thereof without limitation unless so indicated in the following claims. Additionally, in certain applications it may be advantageous to construct the pedestal 50 (and/or a portion thereof, such as the pedestal upper surface 54) integrally with the spine 34 and/or rail(s) 36, or it may be advantageous to construct certain portions separately and later join them together.

It is contemplated that in one aspect, the pedestal upper surface 54 may be removably engaged with another portion of the pedestal 50, such as a top part of the adjustment portion 53. For example, Eurotec, GmbH in Germany manufactures adjustable pedestals having an upper part, a threaded ring, an extension ring, and a baseplate as shown on page 5 of Appendix A. As mentioned above regarding a "click adapter," different adapters may be selectively engaged with the upper part of the pedestal to provide a modular system, as shown in page 6 of Appendix A. In an aspect, the spine(s) 34 and/or rail(s) 36 may be formed on another adaptor for selective engagement with the upper part to make a pedestal 50 with a support structure 30 therein, which may share aspects with the pedestals 50 and support structures 30 shown in FIGS. 19A-23B. It is contemplated that the pedestal upper surface 54 (when using a pedestal such as that shown in Appendix A) may comprise a portion of the upper part (as shown on page 5 of Appendix A) and a portion of an adaptor formed with one or more spines 34 and one or more rails 36. Accordingly, the scope of the present disclosure is not limited by whether the pedestal 50 having one or more spines 34 and one or more rails 36 is comprised of a separate pedestal portion and a selectively removable adaptor portion (on which adaptor portion the spine(s) 34 and rail(s) 36 are formed), or if the spine(s) 34 and rail(s) 36 are integrally formed with the pedestal 50 itself, thereby foregoing the requirement of a separate adapter portion unless so indicated in the following claims. Accordingly, the scope of the present disclosure is not limited by whether the various portions of a pedestal 50, spine(s) 34, and/or rail(s) 36 engaged therewith are integrally formed with one another or separately formed and later engaged with one another unless so indicated in the following claims.

As previously described in detail above, opposite edges 24 of a tile 20 may be formed with a groove 24a therein, as shown in FIGS. 10, 12A, and 12B. The groove 24a may be formed in the edge 24 of the tile 20, in a portion of the edge 24 of the tile 20, in a portion of a surface of a substrate 18 (if present), and/or a combination of a portion of the tile 20 and a portion of the substrate 18 without limitation unless so indicated in the following claims. The groove 24a may be configured such that it cooperates with the rail 36 at the top distal end of the spine 34, and such that the bottom face 22 of the tile 20 (or bottom surface of the substrate 18, if present for that embodiment of a tile 20) rests upon the pedestal upper surface 54. Again, the pedestal upper surface 54 may be comprised of a portion of the adaptor and a portion of the upper part of the pedestal if a pedestal and corresponding adaptor such as that shown in pages 5 and 6 of Appendix A is employed. The configuration (e.g., size, dimensions, shape) of the pedestal upper surface 54, spine 34, and/or rails 36 may vary from one application of the tile and support structure 10 to the next, and may vary depending at least upon the size, shape, and weight of the tile(s) 20 engaged with the pedestal upper surface 54. In one aspect, it may be advantageous to configure the pedestal upper surface generally in a circular shape having a diameter of between 4 and 16 inches in diameter. However, the scope of the present disclosure is not so limited unless indicated in the following claims. This configuration may be especially useful in preventing wind uplift for tiled surfaces (e.g., deck, patio, roof surfaces, etc.) without the need for elongate support structures 30 such as those previously described and shown in FIGS. 2-7. Instead, pedestals 50 configured with one or more spines 34 and one or more rails 36 may be strategically positioned to support a plurality of tiles 20 as described in further detail below (which strategic positioning may be adjacent one or more corners of a tile 20 without limitation unless so indicated in the following claims).

In an aspect, the pedestal 50 shown in FIGS. 19A and 19B and the pedestal 50 shown in FIG. 21 may be used to support two tiles 20, wherein one rail 36 corresponds to each tile 20. In an aspect, each rail 36 may be positioned adjacent a corner of the tile 20 during use. However, in other aspects the rail 36 may be positioned on an interior portion of the tile 20 as described below. Accordingly, the optimal position along the edge 24 of a tile 20 at which a rail 36 engages the tile 20 may vary from one application of the present disclosure to the next, and is therefore in no way limiting to the scope of the present disclosure unless so indicated in the following claims. As previously described, it is contemplated that a rail 36 may optimally engage a tile 20 at a groove 24*a* formed in an edge 24 of the tile 20.

In an aspect of the pedestal 50 shown in FIG. 22A, the pedestal 50 may be used to support two tiles 20 positioned on either side of the spine 34. Alternatively, the pedestal 50 shown in FIG. 22A may be used to support four tiles 20, wherein corners of adjacent tiles 20 may be offset from one another, or wherein corners of adjacent tiles 20 may be positioned adjacent one another at or around the center point of the pedestal upper surface 54. In such a configuration, at least one edge 24 of a tile 20 may not require a groove 24*a* formed therein, as that edge 24 of a tile 20 may directly abut an edge 24 of an adjacent tile 20. It is contemplated that each rail 36 may be positioned at any point along the length of the tile 20, wherein a tile 20 may be positioned on either side of the spine 34. In an aspect, the spine 34 may extend along the entire width and/or length of the pedestal upper surface 54 (as depicted in at least FIG. 22A), or the spine 34 may extend along only a portion of the pedestal upper surface 54 (as depicted at least in FIGS. 19A-20B) without limitation unless so indicated in the following claims.

Referring now specifically to FIG. 22B, which provides a top view of a pedestal 50 having two pairs of collinear spines 34, wherein the two pairs may be perpendicular with respect to one another and positioned along diameters of the pedestal upper surface 54, the pedestal 50 may be configured to simultaneously engage up to four tiles 20. It is contemplated that the pedestal 50 depicted in FIG. 22B may optimally engage each tile 20 at or adjacent to the corner thereof. Grooves 24*a* formed in perpendicular edges 24 that intersect one another on a single tile 20 may by engaged with rails 36 extending toward the respective edges 24 from spines 34 that are oriented perpendicular with respect to one another (and parallel with respect edges 24 of the tile 20). The opposite rails 36 engaged with those spines 34 may engage grooves 24*a* formed in a second and a third tile 20, respectively, and other grooves 24*a* in the second and third tiles 20 may be engaged with other rails 36 extending from additional spines 34, respectively. Accordingly, in light of the present disclosure it will be apparent to those skilled in the art that the pedestal shown in FIG. 22B may simultaneously engage up to eight grooves 24*a* formed in eight respective edges 24 of four respective tiles 20 via eight respective rails 36 configured as pairs extending from four respective spines 34. However, the scope of the present disclosure is not so limited unless so indicated in the following claims.

Figure 23A:
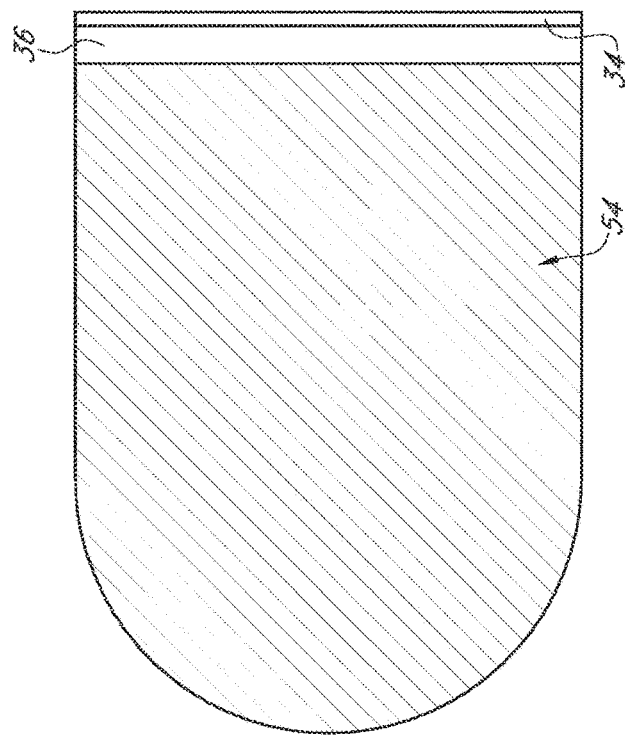
Figure 23B:
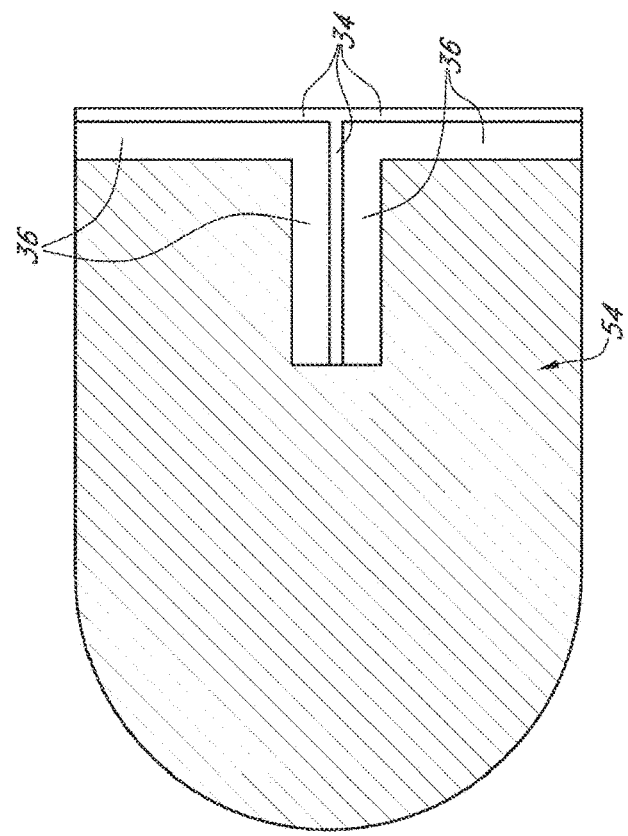

In an aspect of the pedestals 50 shown in FIGS. 23A and 23B, the pedestal base 52 may be offset from the spine 34, adjustment portion 53, and/or pedestal base 52. It is contemplated that pedestals 50 and/or spines 34 so configured may be especially useful at an edge or border of a tiled surface, such as adjacent a wall or edge of a roof. Again, a rail 36 extending outward from the spine 34 may engage a groove 24*a* formed in respective edges 24 of tiles 20. However, the scope of the present disclosure is not limited by the relative position of one pedestal 50 with respect to another and/or the number of tiles 20 engaged with a given pedestal 50 unless so indicated in the following claims.

Referring specifically to FIG. 23A, the pedestal 50 may be used to engage up to two tiles 20 at adjacent corners of those tiles 20. As with various other pedestals 50 disclosed herein, it is contemplated that a corner of a tile 20 may be positioned adjacent the intersection of two perpendicular spines 34. The pedestal 50 may be configured such that a first spine 34 along a straight edge of the pedestal upper surface 54 includes one rail 36 extending outward therefrom toward the center of the pedestal upper surface 54 and a second spine perpendicular to the first spine 34 includes two rails 36 extending outward thereform. The rail 36 on the first spine 34 may engage grooves 24*a* on collinear edges 24 of the two adjacent tiles 20. Each rail 36 of the second spine 34 may engage parallel grooves 24*a* formed in parallel edges 24 of those tiles 20 (which parallel edges 24 may be perpendicular to the ollinear edges 24). However, other configurations of spines 34, rails 36, and/or tiles 20 may be used without departing from the scope of the present disclosure unless so indicated in the following claims.

Referring specifically to FIG. 23B, the pedestal 50 may be used to engage up to two tiles 20 at adjacent corners of those tiles 20 via a single rail 36 extending from a single spine 34 in a direction toward the center point of the pedestal upper surface 54, wherein corners of adjacent tiles 20 may be adjacent. In such a configuration, at least one edge 24 of a tile 20 may not require a groove 24*a* formed therein, as that edge 24 of a tile 20 may directly abut an edge 24 of an adjacent tile 20 (e.g., the edges 24 oriented perpendicular with respect to the spine 34). Alternatively, the pedestal 50 may be used to engage a single tile 20 along a given groove 24*a* formed in an edge 24 thereof, such that all or a portion of the rail 36 is positioned in a single groove 24*a* of a single tile 20. The rail 36 may be positioned at any point along the length of the tile(s) 20, and the spine 34 may constitute a border or periphery of the tiled surface in a manner similar to that previously described with respect to the pedestal 50 shown in FIG. 23A.

In an aspect, the spine 34 may be positioned along a straight edge of the pedestal upper surface 54. However, in another aspect, the spine 34 and/or rail(s) 36 may be curved, contoured, and/or non-linear so as to follow a curved, contoured, and/or non-linear edge 24 of a particular tile 20. Accordingly, the specific orientation and/or configuration of a tile 20 or tiles 20, pedestal 50, pedestal base 52, pedestal upper surface 54, spine 34, and/or rail(s) 36 for any illustrative aspects of a pedestal 50, spine 34, and/or rail(s) 36 in no way limits the scope of the present disclosure unless so indicated in the following claims.

Generally, a tiled surface (e.g., roof, deck, patio, etc.) may be constructed using pedestals 50 such as those shown in FIGS. 19A-23B using a method similar to those previously described herein for the support structures 30, roof support structures 30', and/or support structures 30 in conjunction with a retaining element 60. Alternatively, in an aspect of a pedestal 50 having an adapter portion configured with one or more spines 34 and one or more rails 36, the pedestal bases 52 may be secured and arranged in a desired manner first Next, rails 36 of corresponding adapters may be engaged with grooves 24a of a tile 20 such that the relative positions of the adapters correspond to relative positions of the pedestal bases 52, and such that the adapter(s) and corresponding tile 20 may be lowered simultaneously until the adaptor(s) engages the pedestal(s) 50 (which engagement may be primarily at the pedestal upper surface 54 and/or adjacent portion) and the tile 20 is supported by the pedestal(s) 50. However, the feasibility of such a method of constructing a tiled surface may depend on the specific configuration of the spines 34 and/or rails 36 on the adapter, and specifically may depend at least on the number of tiles 20 that the adapter is configured to engage, the position on the edge 24 that the tile 20 engages the groove 24a, and/or the shape of the tile 20 without limitation unless so indicated in the following claims.

The pedestals 50, spine(s) 34, and/or rail(s) 36 may be configured such that the position of a tile 20 relative to the position of a pedestal 50 and/or the position of another tile 20 may be fixed in one dimension, two dimensions, or three dimensions without limitation unless so indicated in the following claims. In an aspect, one or more spines 34 and/or rails 36 may cooperate with one or more adjacent tiles 20 to fix the relative position of a tile 20 with respect to one or more pedestals 50 and/or other tiles 20 without limitation unless so indicated in the following claims. Additionally, the pedestals 50 shown in FIGS. 19A-23B (and/or pedestals 50 providing similar features, functionality, and/or benefits thereto) may be used with one another, with a support structure 30, and/or with a roof support structure 30' similar to, or with aspects that are correlative to, that shown in FIGS. 2-9, 11A-12C, and/or 14-16B, and/or a retaining element 60, 60' similar to that shown in FIGS. 17A-18 without limitation unless so indicated in the following claims.

Reinforced Tiles

For certain applications (e.g., raised patios or walkways, rooftops, etc.) it may be desirable to elevate a tile (e.g., a ceramic or porcelain tile) for an underlying support structure. Most often tiles are elevated from such a structure using a plurality of pedestals. Generally, tiles that are elevated from an underlying support structure may be required to exhibit additional strength as compared to non-elevated tiles. Previously, tile manufacturers would allow a standard tile to be installed in an application wherein the tile was elevated up to four inches above the underlying support structure. The tile manufacturer would provide disclaimers for any height greater than four inches and recommend a backed tile for such applications. More recently, tile manufacturers are including this disclaimer and associated recommendation for tiles that are elevated as little as 0.75 inches or more from a solid surface, since such tiles may be required to exhibit a minimum strength and/or shatter resistance so that they do not break under load, shatter due to impact, break due to wind uplift, and/or otherwise fail to perform as designed and/or cause any type of safety risk.

In elevated applications the tiles are required to exhibit a minimum strength so that they do not break when under load. Various pedestals and installation instructions for such pedestals and raised tiles are shown in Appendix C, which is attached hereto and made a part hereof. Among other disadvantages, prior art tiles, including those having a galvanized metal backer, may be more costly, have a shorter lifespan (particularly in ocean breeze or wet climates), and may make additional, unwanted noise when installed using various types of rooftop pedestals and/or metal fasteners. Specifically for tiles including a galvanized metal backer, such products typically only include a five-year warranty, weigh from 9 to 19 pounds per tray (depending on thickness), can lead to significant discoloration and staining issues, and are often configured as peel-and-stick backers such that the installed is responsible for adhering the galvanized material to the tile.

A peel-and-stick backer assembled on site may exhibit additional disadvantages, such as a requirement that the work area and materials remain clean and dry (which may be extremely difficult on a construction site where tiles are cut with wet tile saws generating dust and constant water flow). Additionally, tiles with galvanized backers are typically only available in 24-inch×24-inch and 24-inch×28-inch nominal sizes, whereas most tile manufacturers make tiles in other sizes, such as 12-inches×48-inches, 36-inches×36-inches, 12-inches×24-inches, 8-inches×48-inches, etc. By contrast, the reinforced tile 120 disclosed herein may be configured in any size and/or shape such that it may be used in virtually any application, including but not limited to decking, roofing, raised decks, stairs, etc. without limitation unless otherwise indicated in the following claims. The reinforced tile 120 disclosed herein may also be configured with a custom shape, as a wood-look plank tile, as a modular tile, etc. without limitation unless otherwise indicated in the following claims.

Many porcelain tile suppliers include various disclaimers when marketing/selling their products, wherein the disclaimers may state that if the porcelain tile is raised off the ground that it should be reinforced to avoid shatter and/or fall-through injury or damage liability. Previously these disclaimers indicated that reinforcement should be used if the tile was four inches or more above a solid surface, but as indicated above, that threshold has been lowered to 0.75 inches or more above a solid surface. It is contemplated that the stricter guidelines for reinforcement is a result of improper use of landscaping pavers being used with pedestals, decks, and/or other raised surfaces, which may create shatter concerns, wind up-lift problems, shorter lifespan of product, and/or liability issues among other problems without limitation unless otherwise indicated in the following claims.

Applicant has found through testing that adhering a substrate 120a to one side of a tile to create a reinforced tile 120 greatly increased the breaking strength and/or shatter resistance of the reinforced tile 120 compared to the prior art tile. Generally, the substrate 120a may be adhered to the back or bottom side of the tile to create a reinforced tile 120, but the scope of the present disclosure is not so limited unless otherwise indicated in the following claims. As used in this portion of the disclosure, the term "tile" may be used to refer to the portion of the reinforced 120 that does not include the substrate 120a, which portion may be constructed of any suitable material including but not limited to porcelain, stone, cement, concrete, and/or combinations thereof without limitation unless otherwise indicated in the following claims.

Generally, Applicant has found that adhering a substrate to one side of a tile to create a reinforced tile 120 may allow the reinforced tile 120 to meet deck dead and/or live loading codes, eliminate shatter and/or fall-through risk, and/or provide other benefits without limitation unless otherwise indicated in the following claims. Such risks are present in the prior art when prior art tiles are used in an elevated application (e.g., with pedestals, elevated decks, etc.) without limitation unless otherwise indicated in the following claims. Generally, it is contemplated that the substrate 120*a* may be configured as a pultruded fiberglass plate and may be configured as having a generally uniform thickness and material properties at various portions thereof. It is further contemplated that a substrate 120*a* so configured may provide predictable, consistent material properties for the reinforced tile 120, but the scope of the present disclosure is not so limited unless otherwise indicated in the following claims. Through testing Applicant has found that the breakage values, strength, and/or shatter resistance of reinforced tiles 120 constructed according to the present disclosure are much higher than those of tiles of the prior art, including but not limited to those that use fiberglass mesh or galvanized metal backers.

In an illustrative embodiment, the tile that may be used to create a reinforced tile 120 may be a standard ceramic, porcelain, or otherwise rigid tile. The materials of construction, size, and shape of the tile may vary depending on the specific application of the reinforced tile 120 and is therefor in no way limiting to the scope of the present disclosure unless otherwise indicated in the following claims. In one illustrative embodiment the tile by be 12 inches wide, 12 inches long, and 2 cm thick. In another illustrative embodiment the tile may be 10 inches wide, 10 inches long, and 14 mm thick. Again, the scope of the present disclosure is in no way limited by the dimensions of the tile and/or substrate 120*a* used to create the reinforced tile 120 unless otherwise indicated in the following claims.

In an illustrative embodiment, the substrate 120*a* that is adhered to the tile may be a fiberglass reinforced product or similar solid composite in varying thickness applied to the surface of the tile with a chemical adhesive (e.g., epoxy, glue, or another long-lasting adhesive). Through testing it has been found that a reinforced tile 120 exhibits dramatic increases in strength and/or shatter resistance compared to the substrate 120*a* alone or the tile alone. In other embodiments of the reinforced tile 120 the substrate 120 may be configured as a material other than fiberglass, as described in further detail below and without limitation unless otherwise indicated in the following claims.

Results of a first test and the details of the testing procedure are shown in Appendix D, which is attached hereto and made a part of this disclosure. A porcelain tile that was 24 inches wide, 24 inches long, and 20 mm thick was cut to be 12 inches wide and 12 inches long. A ¼-inch thick substrate 120*a* comprised of Extren 500 series was cut to 12 inches by 12 inches and adhered to one side of the porcelain tile. A technical data sheet for this substrate 120*a*, which is a pultruded fiberglass product sold by Strongwelll Corp., is shown in Appendix G, which is incorporated by reference herein and made a part of this disclosure. Ten reinforced tiles 120 were tested according to ASTM C648 "Standard Test Method for Breaking Strength of Ceramic Tile" and exhibited an average breaking strength of 3226 lbf, with the lowest being 2702 lbf and the highest being 3654 lbf. The breaking strength of the tile alone is approximately 2500 lbf.

Results of a second test and the details of the testing procedure are shown in Appendix E, which is attached hereto and made a part of this disclosure. A porcelain tile that was 24 inches wide, 24 inches long, and 20 mm thick was cut to be 12 inches wide and 12 inches long. A ⅛-inch thick substrate 120*a* comprised of Extren 500 series was cut to 12 inches by 12 inches and adhered to one side of the porcelain tile. A technical data sheet for this substrate 120*a* is shown in Appendix G, which is incorporated by reference herein and made a part of this disclosure. Ten reinforced tiles 120 were tested according to ASTM C648-04 (2014) "Standard Test Method for Breaking Strength of Ceramic Tile" and exhibited an average breaking strength of 4183 lbf, with the lowest being 1314 lbf and the highest being 6352 lbf. The breaking strength of the tile alone is approximately 2500 lbf.

Through testing, it has been found that the reinforced tile 120 using the ⅛-inch-thick substrate 120*a* may be desirable to that using the ¼-inch-thick substrate 120*a*. Generally, the reinforced tile 120 using the ⅛-inch-thick substrate 120*a* is lighter and less expensive than that using the ¼-inch-thick substrate 120*a*. Additionally, the reinforced tile 120 using the ⅛-inch-thick substrate 120*a* provides a lower profile than that using the ¼-inch-thick substrate 120*a*.

These reinforced tiles 120 were also testing according to ASTM C674-13 "Standard Test Methods for Flexural Properties of Ceramic Whiteware Materials," which test procedures and results of the ten reinforced tiles 120 are also shown in Appendix E. Additionally, these reinforced tiles 120 were tested according to ISO 10545-5 "Determination of Impact Resistance by Measurement of Coefficient of Restitution," which test procedures and results of the ten reinforced tiles 120 are also shown in Appendix E.

Results of a third test and the details of the testing procedure are shown in Appendix F, which is attached hereto and made a part of this disclosure. A porcelain tile that was 24 inches wide, 24 inches long, and 20 mm thick was cut to be 12 inches wide and 12 inches long. A woven FRP product that is marketed as Lamicor Grade GP-9306 (sold by Liberty Pultrusion), a technical data sheet for which is attached hereto and made a part hereof as Appendix B, having a thickness of ⅛ was cut to 12 inches by 12 inches and adhered to one side of the porcelain tile. Ten of these reinforced tiles 120 were tested according to ASTM C648-04 (2014) "Standard Test Method for Breaking Strength of Ceramic Tile" and exhibited an average breaking strength of 5707 lbf, with the lowest being 4513 lbf and the highest being 6570 lbf. The breaking strength of the tile alone is approximately 2500 lbf.

These reinforced tiles 120 were also testing according to ASTM C674-13 "Standard Test Methods for Flexural Properties of Ceramic Whiteware Materials," which test procedures and results of the ten reinforced tiles 120 are also shown in Appendix F.

Results of a fourth test and the details of the testing procedure are shown in Appendix H, which is attached hereto and made a part of this disclosure. A porcelain tile that was approximately 60 cm wide, approximately 60 cm long, and approximately 2 cm thick was adhered to a piece of fiberglass that was approximately 24 inches wide, approximately 24 inches long, and approximately ⅛ inch thick. A woven FRP product that is marketed as Lamicor Grade GP-9306 (sold by Liberty Pultrusion), a technical data sheet for which is attached hereto and made a part hereof as Appendix B was used as the substrate 120*a*. The porcelain tile with fiberglass substrate 120*a* was then sent to a hydraulic press and placed under pressure for complete adhesion and allowed to dry. A CNC machine was used to remove excess substrate 120*a*, form a groove 24*a* on two parallel edges 24, and form one or more protrusions 24*b* on the parallel edges 24 without grooves 24*a*. This reinforced tile 120 was cut to be approximately 12 inches wide and approximately 12 inches long. Five of these reinforced tiles 120 were tested according to ASTM C674-13 (2018) "Standard Test Methods for Flexural Properties of Ceramic Whiteware Materials," which test procedures are described in Appendix H. The five reinformed tiles 120 tested exhibited an average Modulus of Rupture in pounds per square inch (psi) of 7959.

The reinforced tiles 120 may be differently configured depending on the specific application. As shown in FIGS. 24A-24C, the edge of the substrate 120*a* may be proud, recessed, or flush with respect to the edge of the tile without limitation unless otherwise indicated in the following claims. Additionally, the thickness of tile and substrate 120*a* can each vary depending at least upon the combined strength and/or shatter resistance necessary for application and are therefore in no way limit the scope of the present disclosure unless otherwise indicated in the following claims.

Although the best results for breaking strength and/or shatter resistance of the reinforced tile 120 were achieved using the woven FRP product shown in Appendix B, and testing has showed that these reinforced tiles 120 exhibit desirable performance for modulus of rupture (which could also be referred to flexural strength per ASTM C674-13), frost cycle, and thermal shock, other substrates 120*a* and/or composites may be used to create a reinforced tile 120 without limitation unless otherwise indicated in the following claims. The substrate 120*a* used for the reinforced tile 120 having test results shown in Appendix F may be formed as a plate that is woven (as opposed to a substrate 120*a* having all strands parallel or approximately parallel), which woven configuration may lead to a relative strength and/or shatter resistance improvement in the substrate 120*a* plate and the resulting reinforced tile 120. It is contemplated that if a FRP substrate 120*a* is used, it may lead to increased strength and/or shatter resistance in the resulting reinforced tile 120 if the substrate 120*a* is woven or an irregular mat, such that individual strands and/or components are positioned in various orientations without limitation unless otherwise indicated in the following claims.

Generally, the substrate 120*a* may be adhered to the tile to create a reinforced tile 120 using any suitable structure and/or apparatus without limitation unless so indicated in the following claims. It is contemplated that for some applications it may be desirable to employ an adhesive that remains at least partially flexible rather than becoming brittle upon curing. Such properties may be required to pass certain freeze-thaw tests.

In one embodiment a two-part epoxy chemical adhesive may be used to bind the substrate 120*a* to the tile. The two-part epoxy may be comprised of a resin and hardener, which may be proportioned and mixed by hand, mechanically, or an automated process. A desired amount the resulting mixture may then be applied to the substrate 120*a* and/or tile by hand (e.g., spread with a trowel or putty knife), mechanically (e.g., with a pneumatic spray device), of via an automated process. It is contemplated that an automated process may be used to automatically dispense a desired amount of mixed adhesive and automatically apportion that adhesive over the surface area of the substrate 120*a* or tile without limitation unless otherwise indicated in the following claims.

After adhesive is placed on the substrate 120*a* or tile, the substrate 120*a* may be joined with the tile. Mechanical force (e.g., presses, rollers, etc.) may be used to ensure evenness of the adhesive, proper bonding, and a relatively even thickness of the resulting reinforced tile 120. The adhesive may be allowed to dry prior to transport and/or use. It is contemplated that such a process at any and/or all points of construction may be temperature and/or pressure controlled for quality control without limitation unless otherwise indicated in the following claims. The reinforced tiles 120 may be subjected to a machining or finishing process (which may be done via a CNC machine) to ensure proper dimensions and/or shape and enhance quality control.

Figure 25A:
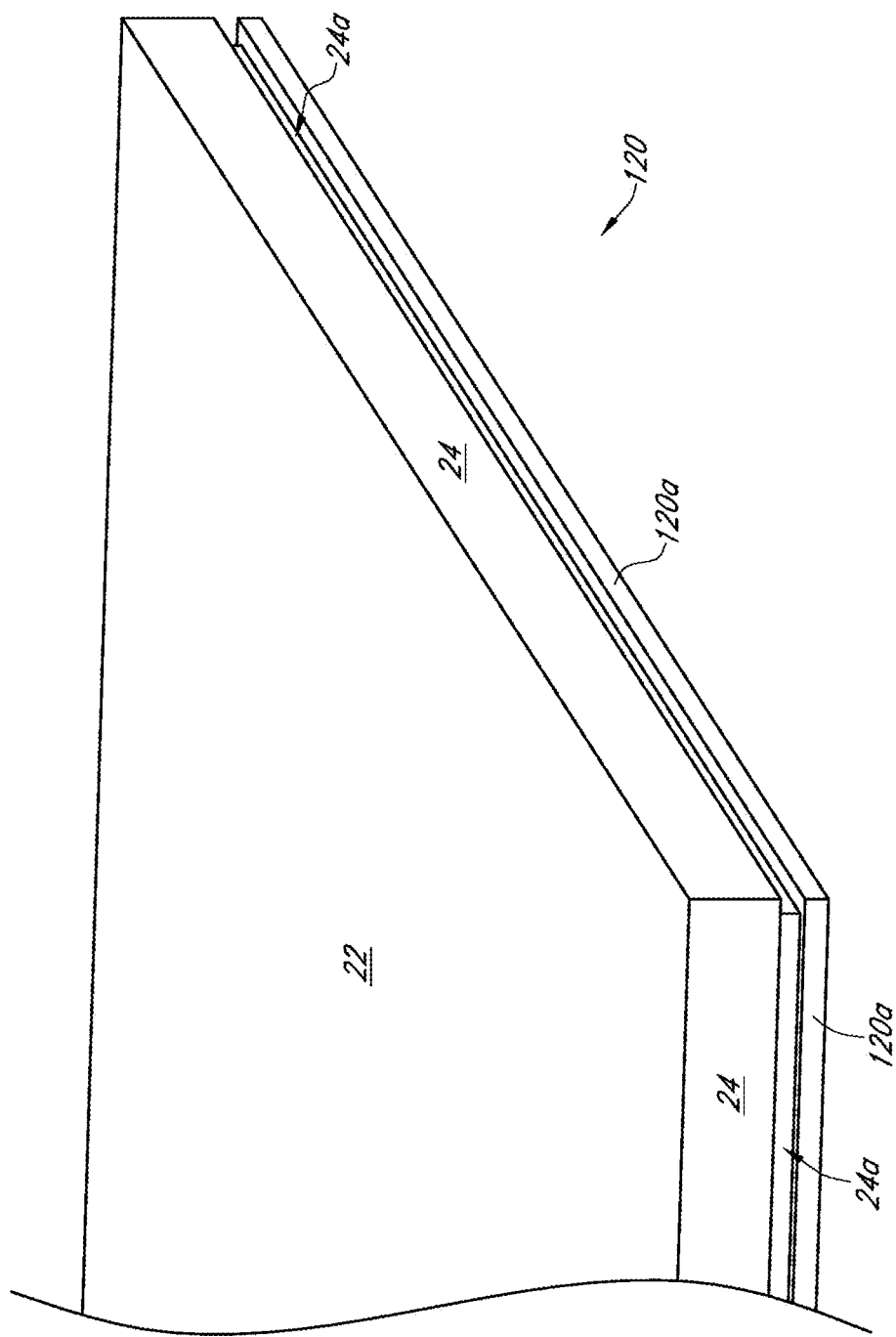
FIG. 25A provides a perspective view of an illustrative embodiment of a reinforced tile having a groove formed therein.
Figure 25B:
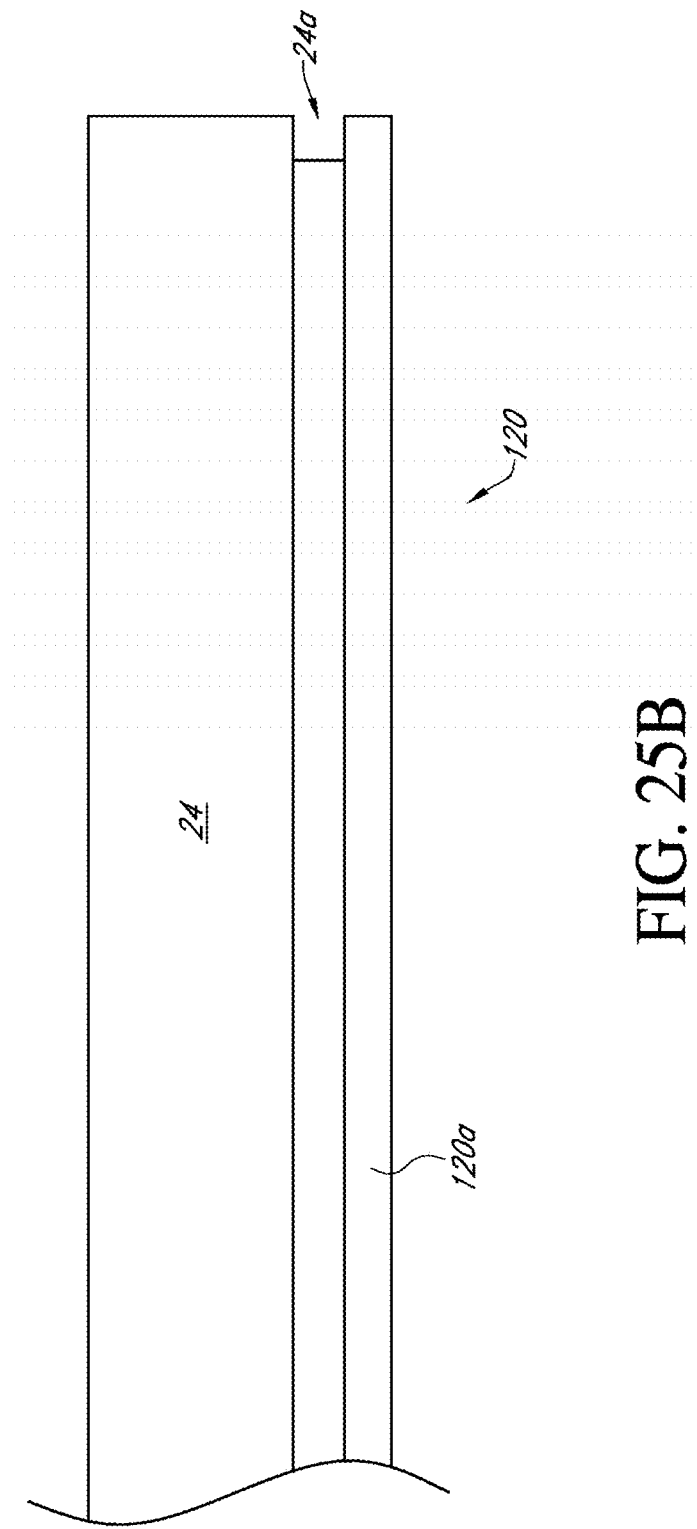
FIG. 25B provides a side view of an illustrative embodiment of a reinforced tile having a groove formed therein.
Figure 26A:
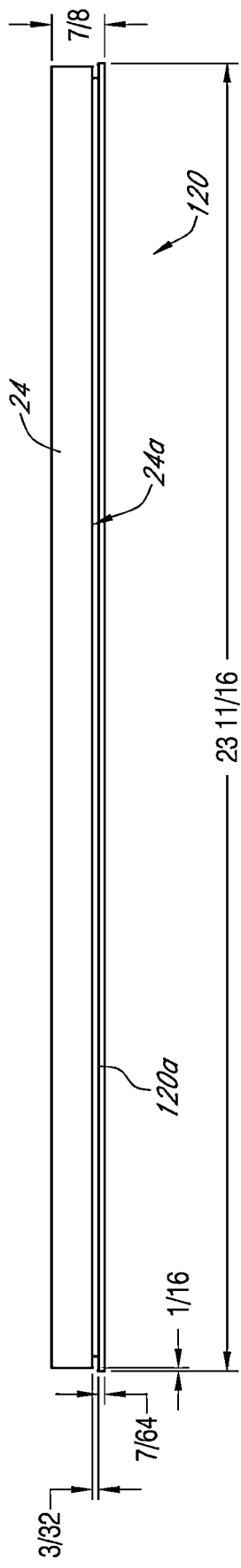
FIG. 26A provides an end view of another illustrative embodiment of a reinforced tile having a groove formed therein.
Figure 26B:
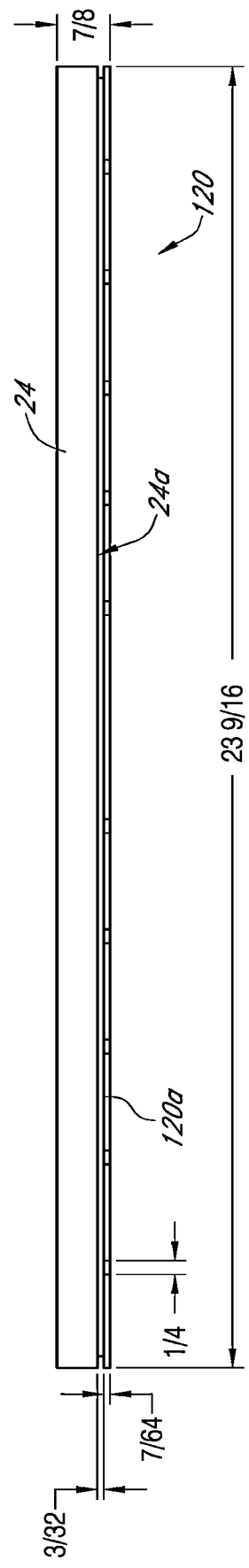
FIG. 26B provides another end view of the illustrative embodiment of a reinforced tile shown in FIG. 26A.

One illustrative embodiment of a reinforced tile 120 shown in FIGS. 25A & 25B, wherein FIG. 25A provides a perspective view and FIG. 25B provides a side view, may include at least one groove 24*a* formed therein on an edge 24 thereof. A second illustrative embodiment of a reinforced tile 120 having grooves 24*a* formed therein is shown in FIGS. 26A & 26B, wherein FIG. 26A is a side view of a first edge 24 and FIG. 26B is a side view of a second edge 24 that is perpendicular to the first edge 24. Representative dimensions of various features are shown in FIGS. 26A & 26B, but those dimensions are for illustrative purposes only and are in no way limiting to the scope of the reinforced tile 120 unless otherwise indicated in the following claims.

As shown in FIGS. 26A & 26B, for a reinforced tile 120 that is approximately 24 inches wide by approximately 24 inches long by approximately ⅞ inches thick, the groove 24*a* may be 3/32 inches tall and the substrate 120*a* may be 7/64 inches thick (wherein the thickness of the substrate 120*a* is in the same dimension as the height of the groove 24*a*). The groove 24*a* may extend inward from the edge 24 by approximately 13/64 inches (which may be referred to as the depth of the groove 24*a*). Accordingly, the height of the groove 24*a* may be between 5% and 25% of the thickness of the tile and between 50% and 95% of the thickness of the substrate 120*a* without limitation unless otherwise indicated in the following claims. The height of the groove 24*a* may be between 20% and 80% of the depth thereof, and depth of the groove 24*a* may be between 75% and 250% of the thickness of the substrate 120*a*. Again, these dimensions are for illustrative purposes only and are in no way limiting to the scope of the reinforced tile 120 unless otherwise indicated in the following claims.

Either embodiment of the reinforced tile 120 may be configured with a groove 24*a* along each of two parallel edges 24 as previously described in detail above regarding a tile 20, or along any edge 24. Opposite parallel edges 24 may be formed with one or more protrusions 24*b*, also described in detail above regarding a tile 20. Edges 24 having protrusions 24*b* thereon may also be formed with a groove 24*a* without limitation unless otherwise indicated in the following claims. Generally, the groove(s) 24*a* and/or protrusions 24*b* may be configured, shaped, and/or dimensioned in any manner as previously described herein, or may be differently configured, shaped, and/or dimensioned without limitation unless otherwise indicated in the following claims. It is contemplated that the optimal configuration of the reinforced tile 120 and/or grooves 24*a* therein may depend at least upon the application for the reinforced tile 120.

In the illustrative embodiments of a reinforced tile 120, the groove 24*a* may be machined in a reinforced tile 120 approximately along the interface between the tile 20 and substrate 120*a* such very little if any of the substrate 120*a* is removed to create the groove 24*a*, and the groove 24*a* instead is formed by removing only a portion of the tile 20 and/or a nominal portion of the adhesive between the tile 20 and the substrate 120*a* as shown in FIGS. 28A-29B. The substrate 120*a* may allow for the groove 24*a* to be machined in an edge 24 of the reinforced tile 120 without reducing the dimensions of the substrate 120*a*, thereby creating a mechanism that is strong enough to not blow away, delaminate, crack, crumble, make noise, and/or provide various other benefits over the prior art because the entire thickness of the substrate 120a is positioned adjacent the rail 36 of the support structure 30 (or other corresponding component depending on the application of the reinforced tile 120) without limitation unless otherwise indicated in the following claims. Machining this type of groove 24a into a tile alone or prior art tiles with backing options (e.g., galvanized metals) would not provide a continuous groove, requisite strength, and/or complete adhesive coverage required to meet various wind uplift strength standards.

Reinforced tiles 120 constructed in a manner as those previously described with regards to Appendix H having grooves 24a formed in at least two edges 24 thereof (such as those shown in FIGS. 25A-26B) were subjected to wind uplift testing by PRI Construction Materials Technologies, LLC based out of Tampa, Florida. These tests were completed as described in the *ANSVFM* Approvals 4474 (2004) Appendix B: *Simulated Wind Uplift Pull Test Procedure*. The testing methodology and results are shown in Appendix I, which is attached hereto and made a part of this disclosure. As shown and described in Appendix I, the method of failure of a reinforced tile 120 when tested in such a manner may be the substrate 120a separating from the tile at the interface of the tile and substrate 120a without limitation unless otherwise indicated in the following claims. The max passing load in pounds force for the illustrative reinforced tile 120 tested in Appendix I was 1680.

A pedestal 50 and support structure 30, 30' engaged with the pedestal 50 were subjected to evaluate the pedestal 50 and support structure 30, 30' engaged therewith in accordance with ANSVSPRI ES-1 *Wind Design Standard for Edge Systems Used in Low Slope Roofing Systems*, SPRI Test RE-2 *Pull-Off Test for Edge flashings* (2003) and *ANSVSPRVFM* 4435/ES-1 *Wind Design Standard for Edge Systems Used with Low Slope Roofing Systems*, RE-2 *Pull-Off Test for Edge flashings* (2011). The testing methods and results are shown in Appendix J, which is attached hereto and made a part of this disclosure.

Another pedestal 50 and support structure 30, 30' engaged with the pedestal 50 were subjected to evaluate the pedestal 50 and support structure 30, 30' engaged therewith in accordance with ANSVSPRI ES-1 *Wind Design Standard for Edge Systems Used in Low Slope Roofing Systems*, SPRI Test RE-2 *Pull-Off Test for Edge flashings* (2003) and *AN SV SPRVPM* 4435/ES-1 *Wind Design Standard for Edge Systems Used with Low Slope Roofing Systems*, RE-2 *Pull-Off Test for Edge flashings* (2011). The testing methods and results are shown in Appendix K, which is attached hereto and made a part of this disclosure.

Reinforced tiles 120 such as those shown in FIGS. 25A-26B in conjunction with a plurality of pedestals 50 and support structures 30, 30' engaged with the pedestals 50 were used to construct an illustrative decking/roofing surface as disclosed in detail in Appendix L, which is attached hereto and made a part of this disclosure. The illustrative decking/roofing surface as subjected to an environment sufficient to determine the simulated wind uplift resistance for the illustrative decking/roofing surface in accordance with UL 1897-04 Uplift Tests for Roof Covering Systems. The testing methods and results are shown in detail in Appendix L. The results of this testing, as shown in Appendix L, show that the illustrative decking/roofing surface achieved a Class 90 rating per UL 1897-04 testing procedure, and withstood a nominal static uplift pressure of at least 90 pounds per square foot, a range of oscillating pressure of at least 66 to 90 pounds per square foot, and a maximum static uplift pressure of at least 105 pounds per square foot. However, the scope of the present disclosure is not so limited, and other embodiments of the reinforced tile 120, support structures 30, 30', and/or pedestals 50 may have different results according to the Classes found at https://legacy-uploads.ul.com/wp-content/uploads/2014/04/ul-_Roofing WindResistancel.pdf without limitation unless otherwise indicated in the following claims.

Another illustrative embodiment of a reinforced tile 120 wherein the substrate 120a may be comprised of a fiber reinforced concrete (PRC) material is shown in FIGS. 27A & 27B. The optimal PRC material may vary from one application of the reinforced tile 120, and the specific PRC material is therefore in no way limiting to the scope thereof unless otherwise indicated in the following claims. Through testing Applicant has found that a product marketed under the name "fibreC" by German company Rieder Paserbeton-Elemente GmbH and/or Rieder Smart Elements GmbH, the technical manual for which PRC material is available at https://www.rieder.cc/wp-content/uploads/2017/07/fibreC-Technical-Manual.pdf, may be suitable for certain applications of the reinforced tile 120 without limitation unless otherwise indicated in the following claims.

In one embodiment, the fiberC material is about 90% sand and cement with the remainder being fiberglass, pigments, and concrete additives, and the product is made from cement-bonded fine concrete reinforced with alkali-resistant fiberglass. Generally, such material may be non-flammable and exhibit temperature stability up to 350 C. The material may be generally weather-resistant, durable, able withstand relatively heavy loads, exhibit high mechanical stability, and are dimensionally stable.

Generally, this illustrative embodiment of a reinforced tile 120 may provide at least the benefits and advantages of those previously described herein without limitation unless otherwise indicated in the following claims. As shown, the illustrative embodiment of a reinforced tile 120 having a substrate 120a comprised of an PRC material may be engaged with a support system 30, 30' in a manner similar or identical to that previously described for other embodiments of a reinforced tile 120 without limitation unless otherwise indicated in the following claims. The substrate 120a comprised of an PRC material may be adhered to and/or engaged with the tile using any suitable method and/or structure, including but not limited to chemical adhesives (e.g., glues, two-part epoxies, etc.), mechanical fasteners, and/or combinations thereof without limitation unless otherwise indicated in the following claims.

In the illustrative embodiment of a reinforced tile 120 shown in FIGS. 27A & 27B may have a groove 24a formed in the substrate 120a rather than the tile portion of the reinforced tile 120. It is contemplated that the groove 24a formed in the substrate 120a may be similar or identical to a groove 24a previously described in detail that is formed in the tile without limitation unless otherwise indicated in the following claims. Additionally, a reinforced tile 120 with a substrate 120a comprised of an PRC material may be formed with one or more protrusions 24b on one or more edges of the substrate 120a and/or tile as previously described above without limitation unless otherwise indicated in the following claims.

In the illustrative embodiment shown in FIGS. 27A & 27B, the substrate 120a may have an area and a shape approximately the same as those of the tile, and the thickness of the substrate 120a may be approximately 0.25 to 0.75 inches for a tile having a thickness of from approximately 0.65 to 0.90 inches without limitation unless otherwise indicated in the following claims. Accordingly, the percentage of the thickness of the overall reinforced tile 120 that is attributable to the substrate 120a for the illustrative embodiment of the reinforced tile 120 shown in FIGS. 27A & 27B may be greater than that of other reinforced tiles 120 without limitation unless otherwise indicated in the following claims. For example, the percentage of the thickness of the overall reinforced tile 120 that is attributable to the substrate 120a for the illustrative embodiment of the reinforced tile 120 shown in FIGS. 27A & 27B may be approximately between 20% and 65%, and more specifically may be approximately between 30% and 45% without limitation unless otherwise indicated in the following claims.

Reinforced tiles exhibit numerous advantages over the prior art, which advantages include but are not limited to increased breaking strength, which in turn may lead to numerous other advantages including but not limited to: (1) elimination/mitigation of shatter liability; (2) elimination/mitigation of liability of glass-like edges when tiles shatter; (3) prior art broken tiles can shatter and create shards that cause cuts and injuries, whereas reinforced tiles 120, even if broken, are still contained and bonded to a substrate 120a plate, which may prevent sharp edges and separation of fragments; (4) provision of a longer warranty and more durable product; (5) allowing raised use on pedestals without voiding tile manufacturers warranties; (6) allowing safe use on pedestals for the growing roof-deck market; (7) may be applied to various tile manufacturer's products for use with various tile products in a variety of thicknesses and sizes; (8) allowing for heavier objects and loads to be placed on tiles without shatter (e.g., furniture, planters, hot-tubs, outdoor kitchens, people, etc.); (9) when prior art tiles shatter, sharp edges therefrom penetrate waterproof membrane beneath, causes expensive and extensive roof repairs; and, (10) may be used instead of unsightly concrete pavers that have two- to three-year warranties, weigh three to five times as much, are subject to stain and mold, and require maintenance From the preceding detailed description, it will be apparent to those of ordinary skill in the art that the present disclosure provides many benefits over the prior art. Some of those benefits include, but are not limited to: (1) the ability to provide a deck 12, patio, roof, or other surface having tiles 20 and/or reinforced tiles 120 without the need for grout and/or other sealer; (2) the ability to provide a deck 12, patio, roof, or other surface that is virtually maintenance free; (3) the ability to provide a deck 12, patio, roof, or other surface that mitigates and/or eliminates puddling even when the surface is level and/or nearly level; (4) the ability to provide a more robust deck 12, patio, roof, or other surface that is not affected by typical freeze/thaw cycles; (5) the ability to allow a certain amount of relative movement between tiles 20 and/or reinforced tiles 120, tiles 20 and/or reinforced tiles 120 and support structures 30, tiles 20 and/or reinforced tiles 120 and joists 14, and/or tiles 20 and/or reinforced tiles 120 and other structures without damaging the tiles 20 and/or reinforced tiles 120; and, (6) the ability to suspend a tile surface using properly configured pedestals 50 and thereby securing each tile 20 and/or reinforced tiles 120 in one, two, and/or three dimensions (which may properly secure each tile 20 and/or reinforced tiles 120 and prevent and/or mitigate wind uplift).

Tile and Support Structure for Vertical Mounting

Figure 27:
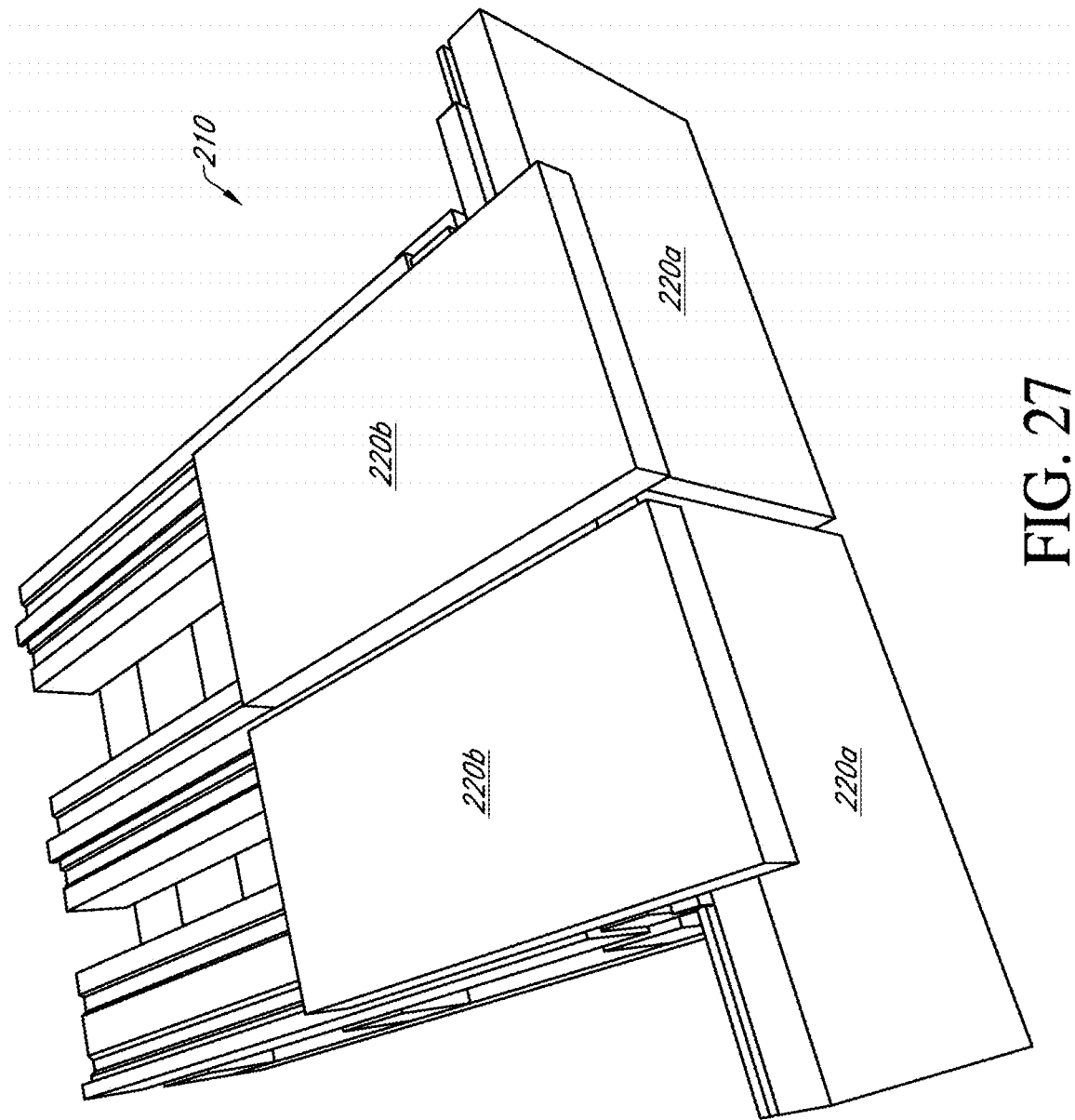
FIG. 27 is a perspective view of a tile and support structure that may be used in a vertical configuration.
Figure 28:
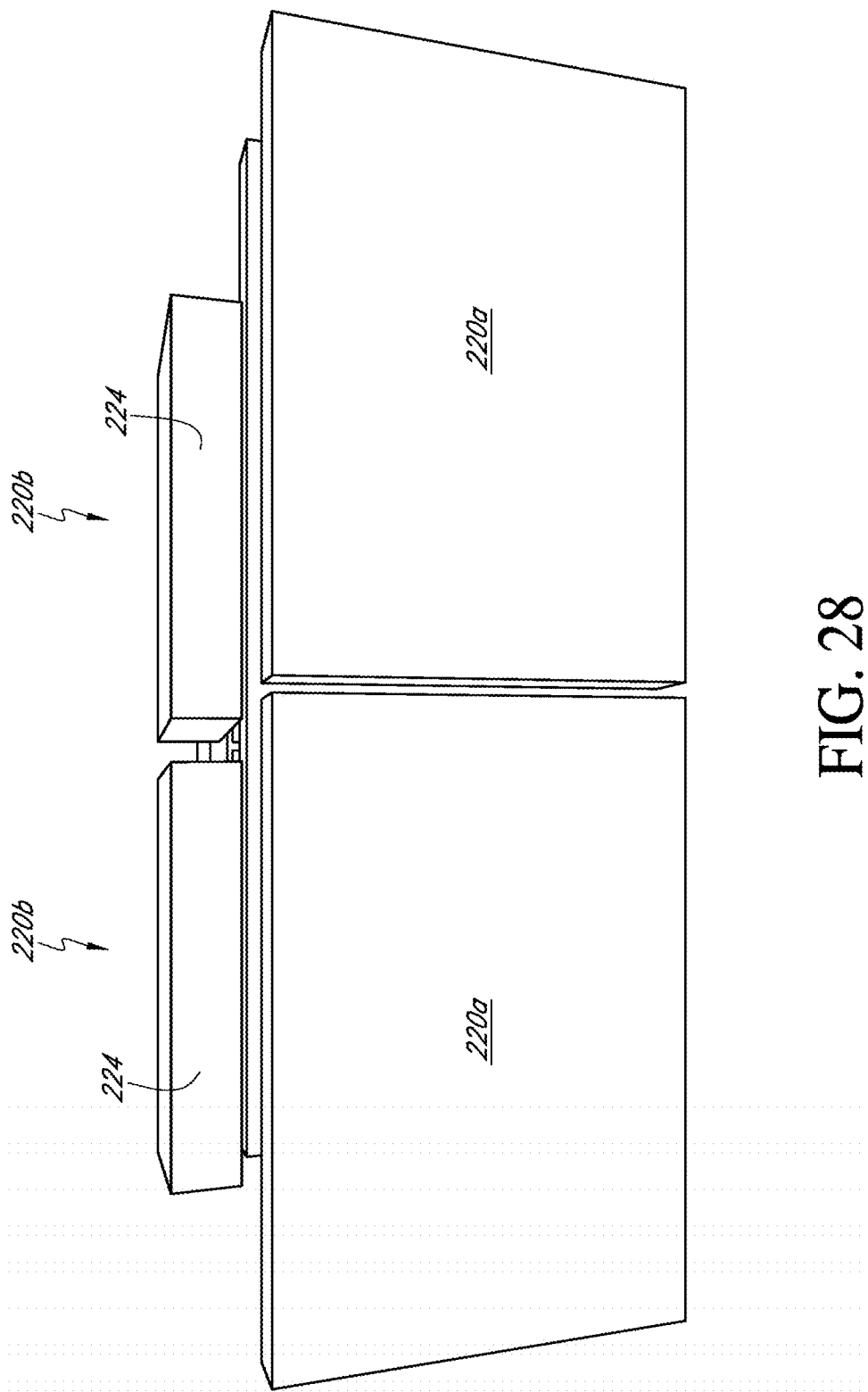
FIG. 28 is a front view of the tile and support structure shown in FIG. 27.

Referring now to FIGS. 27-33, therein is shown various views of a tile and support structure 210 that may be used to mount a riser tile 220a in a vertical configuration, such as the riser of a step, as a border around a portion of a deck, fa<,ade, ventilated fa<,ade, interior or exterior wall covering, or other surface without limitation unless otherwise indicated in the following claims. A perspective view of an illustrative embodiment of a tile and support structure 210 is shown in FIG. 27 and an end view thereof is shown in FIG. 28, wherein two riser tiles 220a may be positioned below two horizontal end tiles 220b. Such a configuration may be used for a step, for a plurality of steps, for a border, or for any application in which it may be desirable to mount one or more tiles 220a in a vertical configuration (i.e., wherein the face 222 of at least one tile 220a is substantially parallel to the vertical dimension) without limitation unless otherwise indicated in the following claims.

Figure 29:
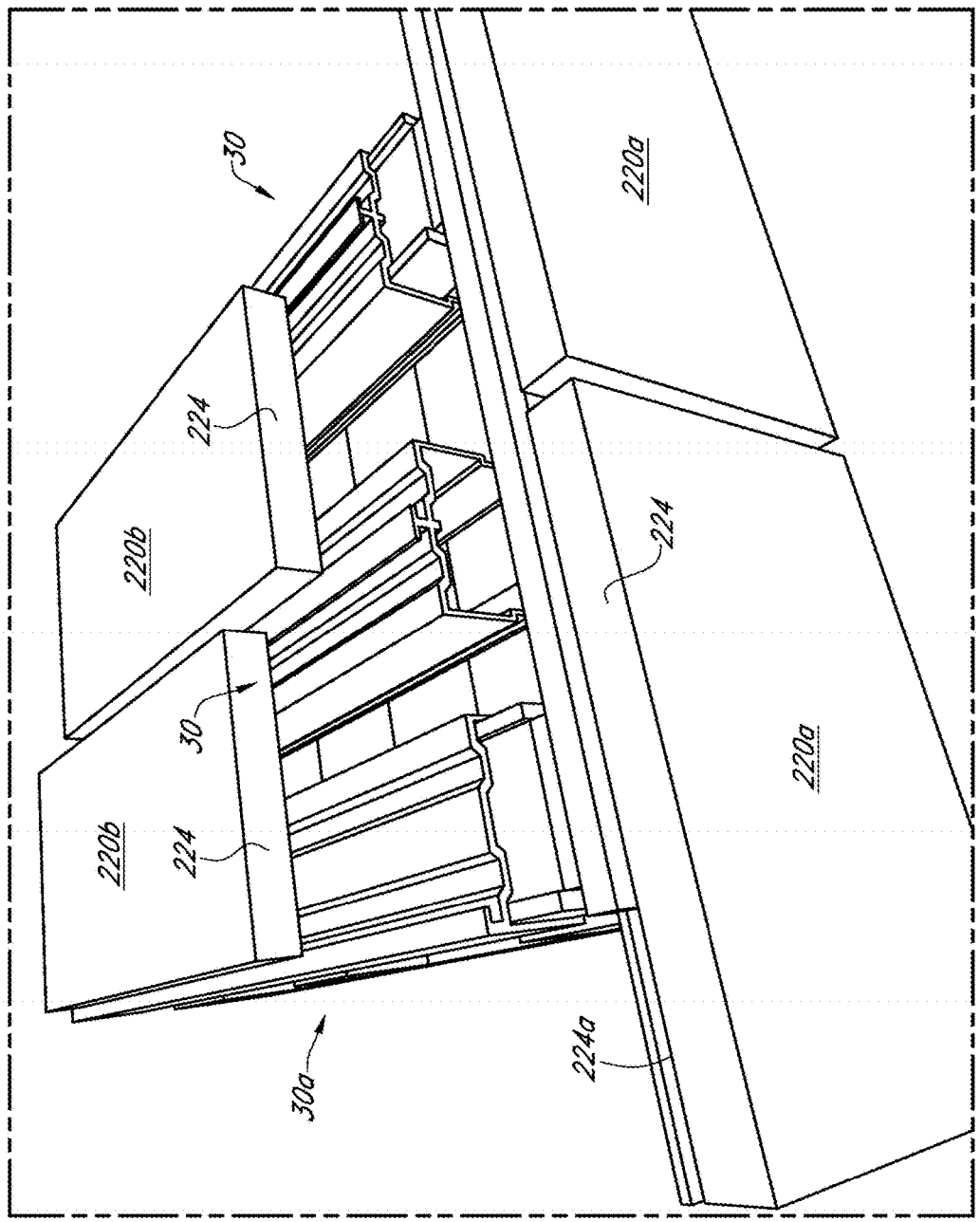
FIG. 29 is a perspective view of the tile and support structure from FIGS. 27 & 28 wherein the horizontal tiles have been slid away from the riser tiles.

Referring now to FIG. 29, which provides a perspective view of the tile and support structure 210 from FIGS. 27 & 28 with the horizontal end tiles 220b slide away from the riser tiles 220a, the support structure 30 engaged with the horizontal end tiles 220b may be configured substantially as those previously described herein and shown in FIGS. 3-15B. However, any suitable support structure 30 may be engaged with the horizontal end tiles 220b without limitation unless otherwise indicated in the following claims.

Figure 30A:
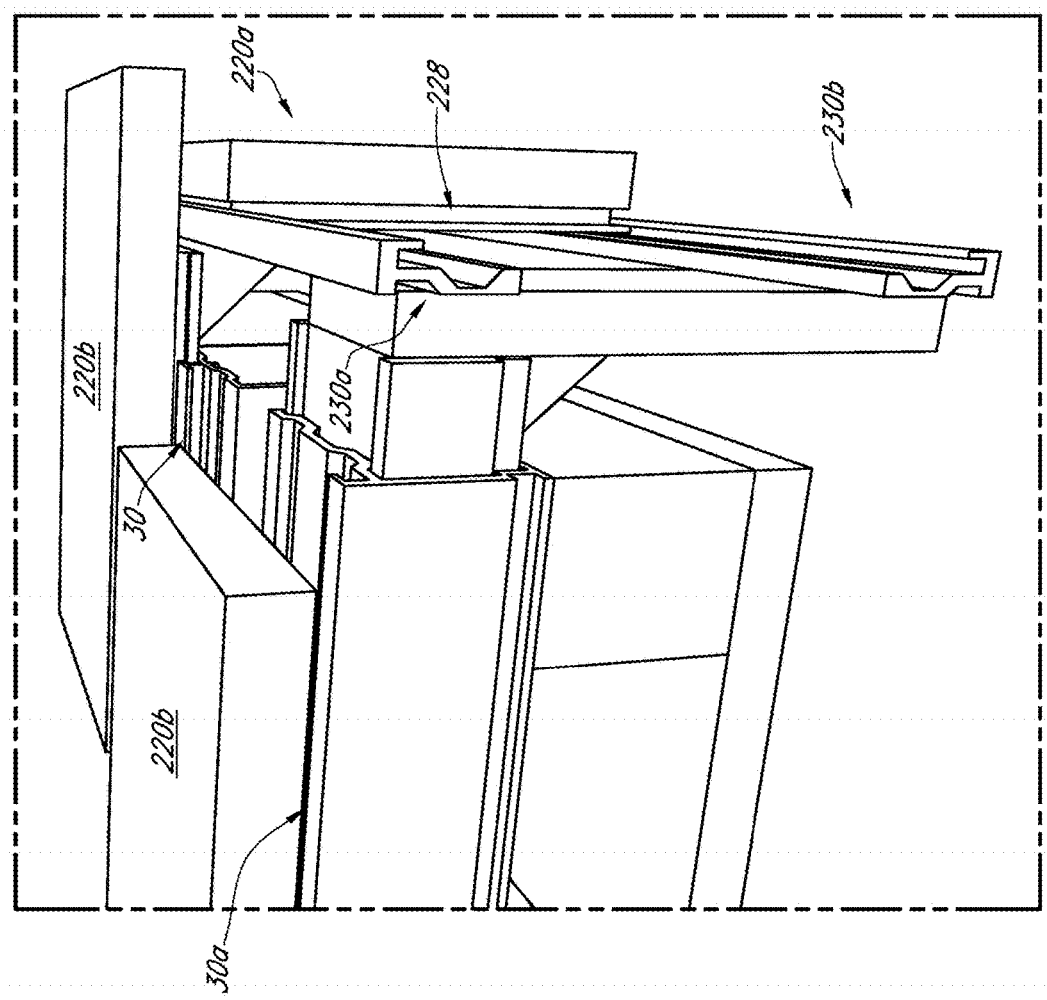
FIG. 30A is a side perspective view of the tile and support structure with one of the riser tiles removed.
Figure 30B:
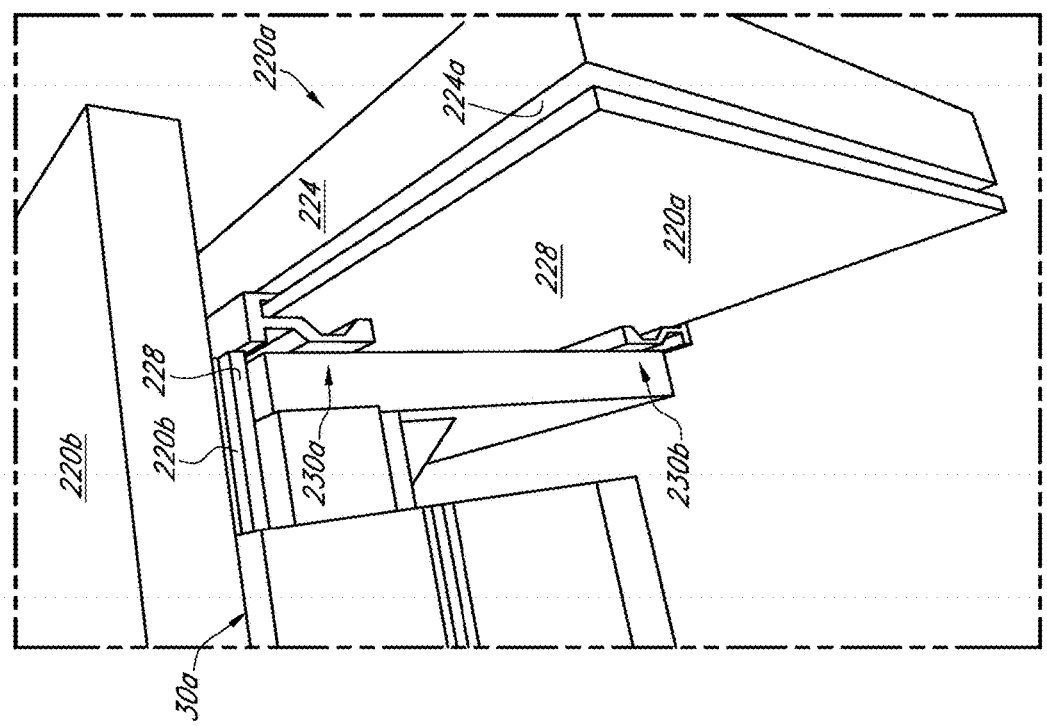
FIG. 30B is a side perspective view of the tile and support structure with one of the riser tiles slid outward beyond the support structure.
Figure 30C:
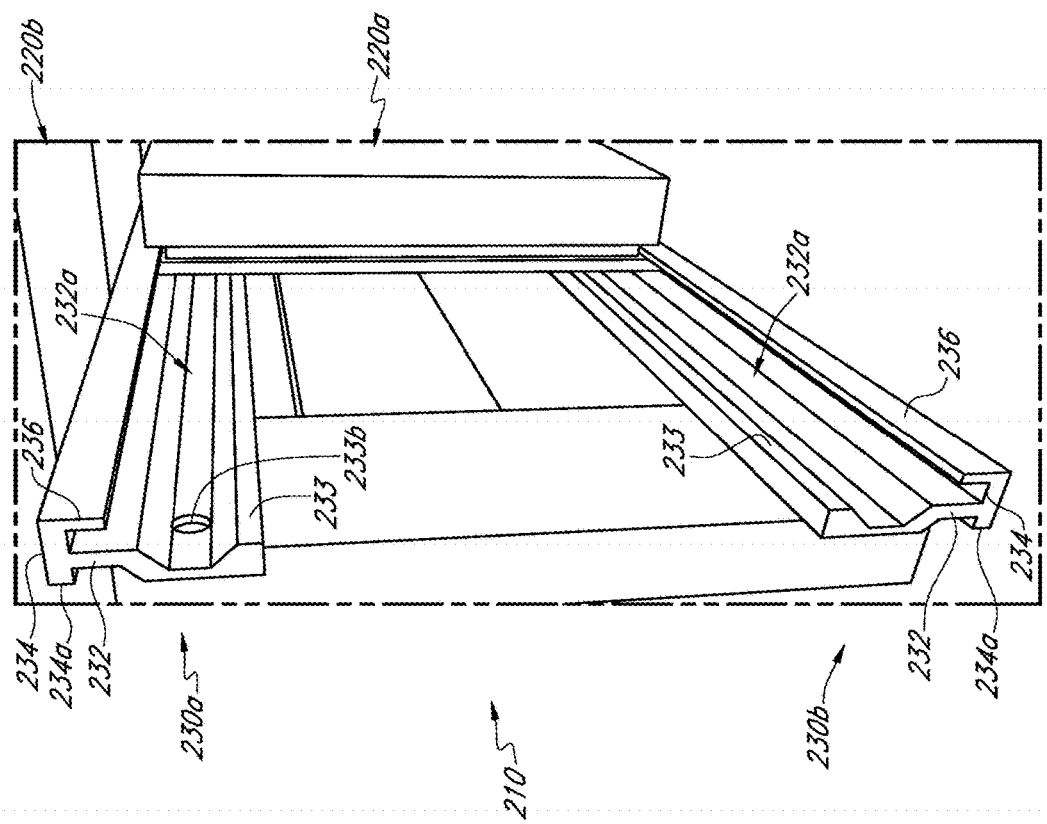
FIG. 30C is a detailed side perspective view of the tile and support structure with one of the riser tiles removed from the support structure.

Referring now to FIGS. 30A-30C, which provide various side perspective views of the tile and support structure 210, one or more riser tiles 220a may be engaged with an upper riser support structure 230a and a lower riser support structure 230b. In an illustrative embodiment of an upper and lower riser support structure 230a, 230b, they may be mirror images of one another. Generally, a riser tile 220a may be rectangular in shape having a face 222, four edges 224, and a groove 224a formed in at least one edge 224. In an illustrative embodiment, the riser tile 220a may be formed with two grooves 224a on parallel edges 224 for engagement with the rail 236 of an upper riser support structure 230a and a lower riser support structure 230b, respectively, and as discussed in further detail below. Accordingly, in an illustrative embodiment the upper and lower riser support structure 230a, 230b may be configured substantially similar to an edge support structure 30a as previously described above and as shown in FIG. 9. All or a portion of the surface of the riser tile 220a opposite the face 222 may be comprised of a substrate 228, wherein all or a portion of the groove 224a may be formed in the substrate 228. Any edge 224 of a riser tile 220a may be formed with one or more protrusions 224b thereon to provide proper spacing between adjacent riser tiles 220a.

Each riser support structure 230a, 230b may be formed with a base 231 having a flange 232 extending outward therefrom. The flange 232 may be formed with a trough 232a therein, and the trough 232a may be formed with a plurality of apertures 232b therein. The distal edge of the trough 232a may be bound by a lip 233, wherein the top surface of the lip 233 may be coplanar with the top surface of the flange 232. Such a configuration may spread the force associated with a tile 220a engaged with a given riser support structure 230a, 230b over a larger area, as explained in detail regarding other embodiments of a support structure having a similar feature. However, the riser support structures 230a, 230b may be differently configured in other embodiments thereof without limitation unless otherwise indicated in the following claims.

Figure 33:
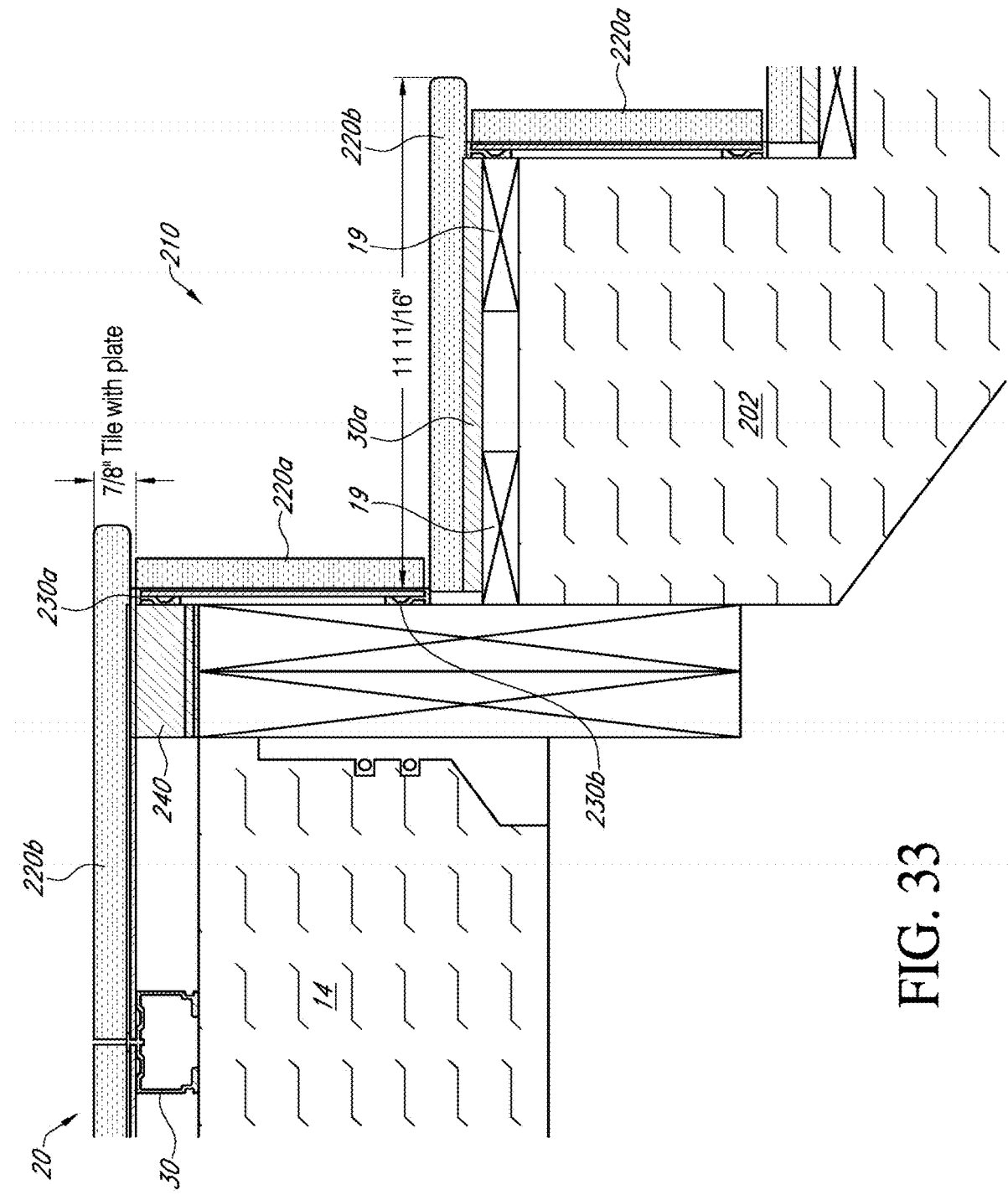
FIG. 33 is an engineering drawing of a plurality of stairs utilizing a tile and support structure that may be used in a vertical configuration.
Figure 34A:
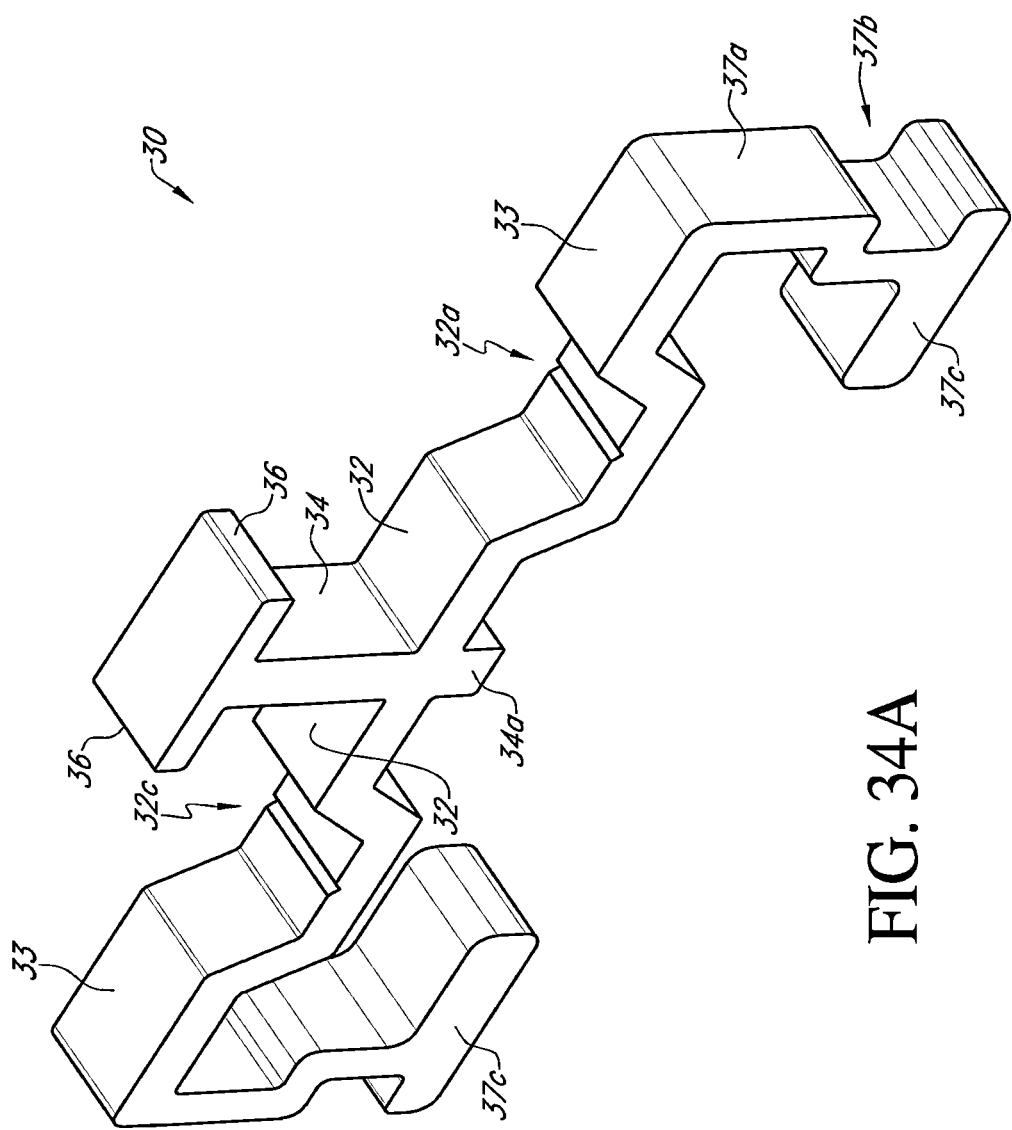
FIG. 34A is a perspective view of another illustrative embodiment of a support structure.
Figure 34B:
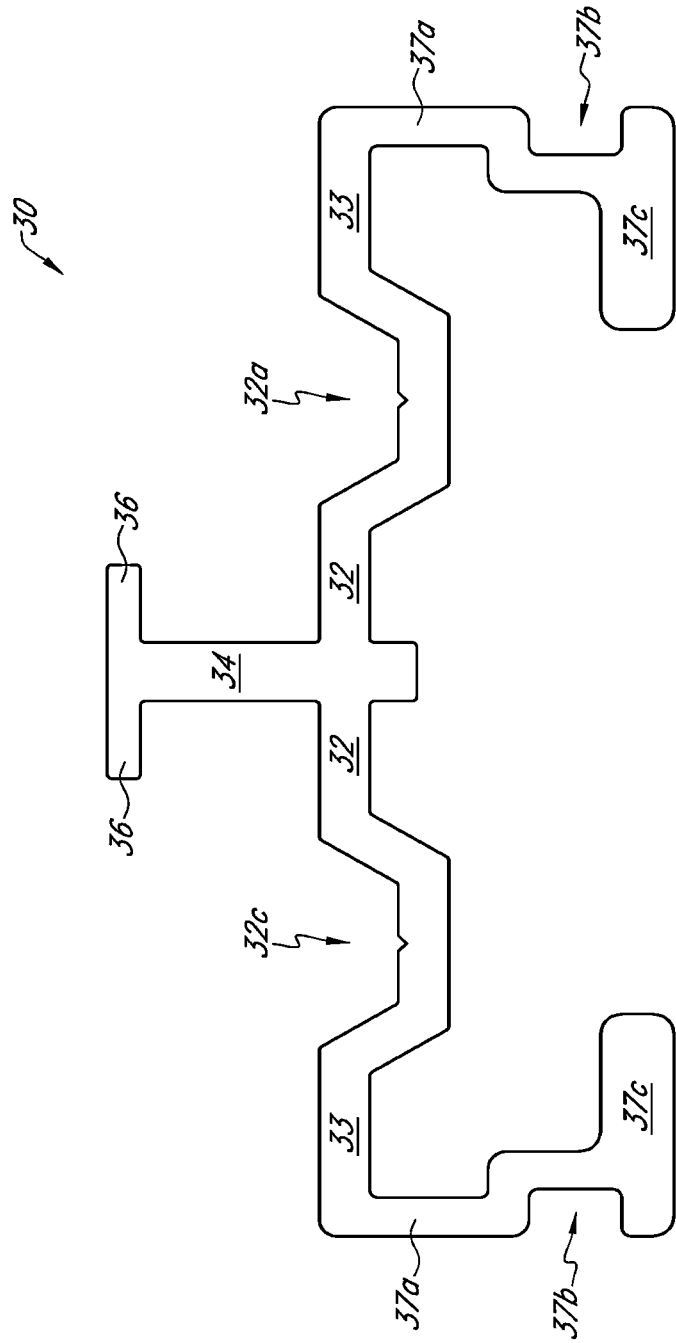
FIG. 34B is a cross-sectional view of the illustrative embodiment of a support structure shown in FIG. 34A with illustrative dimensions of various features shown.

In an illustrative aspect, the apertures 232b formed in the trough 232a of each riser support structure 230a, 230b may be spaced from one another by a distance of four inches, such that a riser support structure 230a, 230b may be engaged with joists 14 or stair stringers 202 (which stair stringers 202 are shown in FIG. 33) spaced twelve or sixteen inches from adjacent joists 14 without need to modify the riser support structure 230a, 230b. However, the spacing of the apertures 232b in no way limits the scope of the present disclosure unless so indicated in the following claims. In other applications it may be advantageous to first engage a lath 19 to the stair stringers 202, and then engage a protective tape to the lath 19 at any point thereof that will contact a support structure 30, 30a, 230a, 230b. The lath 19 may be constructed of wood, treated wood, and/or any other suitable material without limitation unless otherwise indicated in the following claims and may be 0.25 inches thick for certain applications. However, other dimensions may be better suited for certain applications and the scope of the present disclosure is in no way limited by the dimensions of the lath 19, tape, and/or materials of construction thereof unless otherwise indicated in the following claims. Additionally, the apertures 232b may be tapered such that the head of a fastener 14 configured as a screw may seat within the aperture 232b, and such that in certain aspects the head of a fastener 14 may be flush with the bottom of the trough 232a. However, other aspects of the apertures 232b may be differently configured without limitation unless so indicated in the following claims.

A spine 234 may extend upward from the base 231 in a generally vertical dimension. At the top distal end of the spine 234, a rail 236 may extend outward from the spine 234 in a generally vertical dimension, wherein the rail 236 may be generally parallel with respect to the flange 232 and generally perpendicular with respect to the spine 234. A tip 234a that may be collinear with the spine 234 may extend outward from the spine 234 such that the distal end of the tip 234a is coplanar with the bottom surface of the base2 31. Such a configuration may allow the tip 234a to abut a joist 14, stair stringer 202, border member, and/or structural component during use.

The various relative dimensions of the components of the tile and support structure 210 (and, consequently the upper and lower riser support structures 230a, 230b) may be infinitely varied depending on the specific application of the tile and support structure 210. Several illustrative aspects of different support structures 30 according to the present disclosure and dimensions of the components of the support structure 30 are shown in FIGS. 1IA-1IE, and those relative dimensions may be used for certain applications of the tile and support structure 210. However, these aspects and dimensions are not meant to be limiting in any sense, but rather are provided to show how the various dimensions of the tile and support structure 210 may be manipulated without departing from the spirit and scope of the present disclosure unless so indicated in the following claims.

Figure 31B:
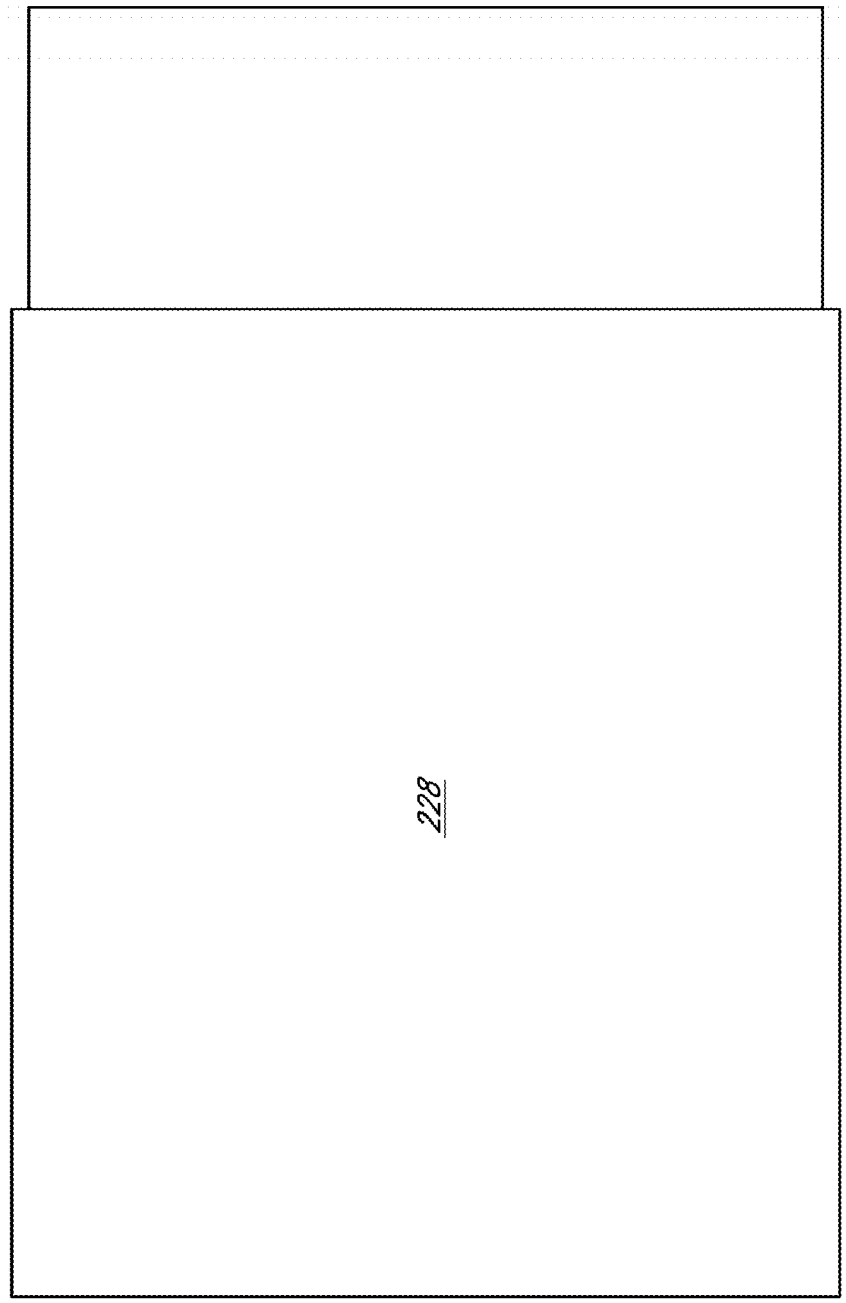
FIG. 31B is a bottom view of the horizontal end tile shown in FIG. 31A.
Figure 37:
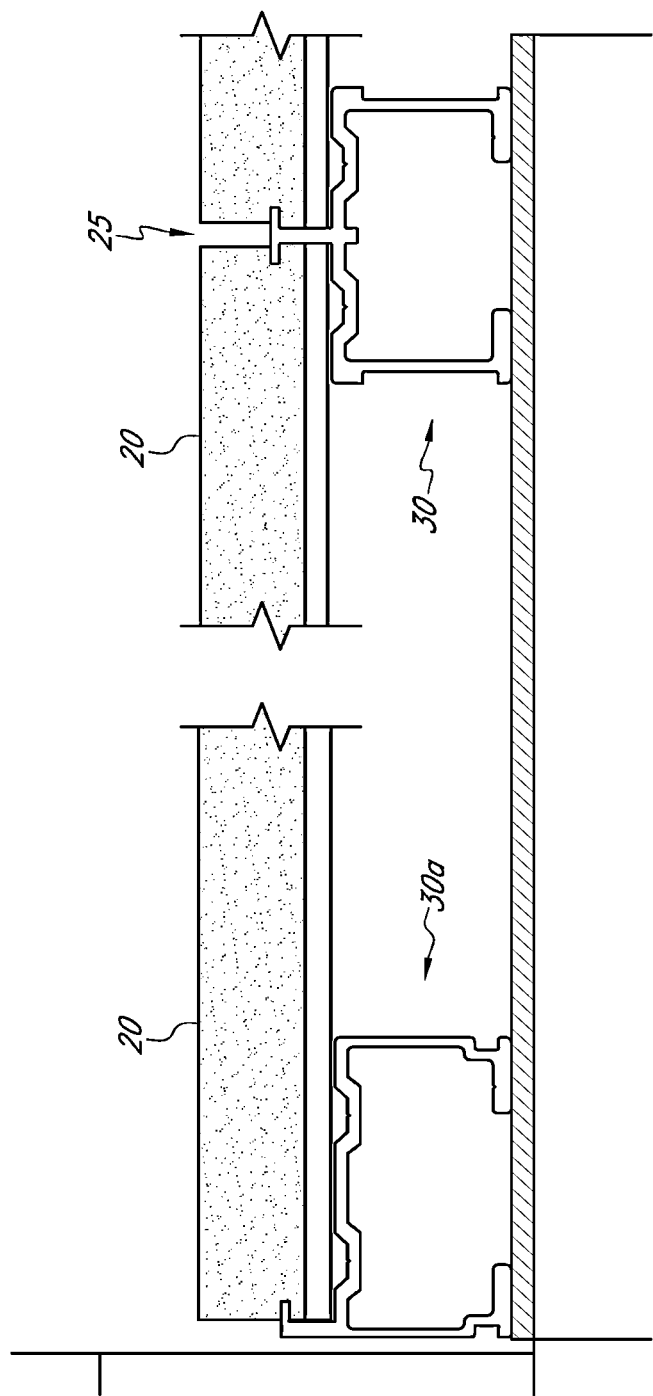
FIG. 37 is a cross-sectional view of the illustrative embodiment of an edge support structure shown in FIGS. 35A & 35B and the illustrative embodiment of a support structure shown in FIGS. 36A & 36B engaged with a framing support and a plurality of tiles.
Figure 38A:
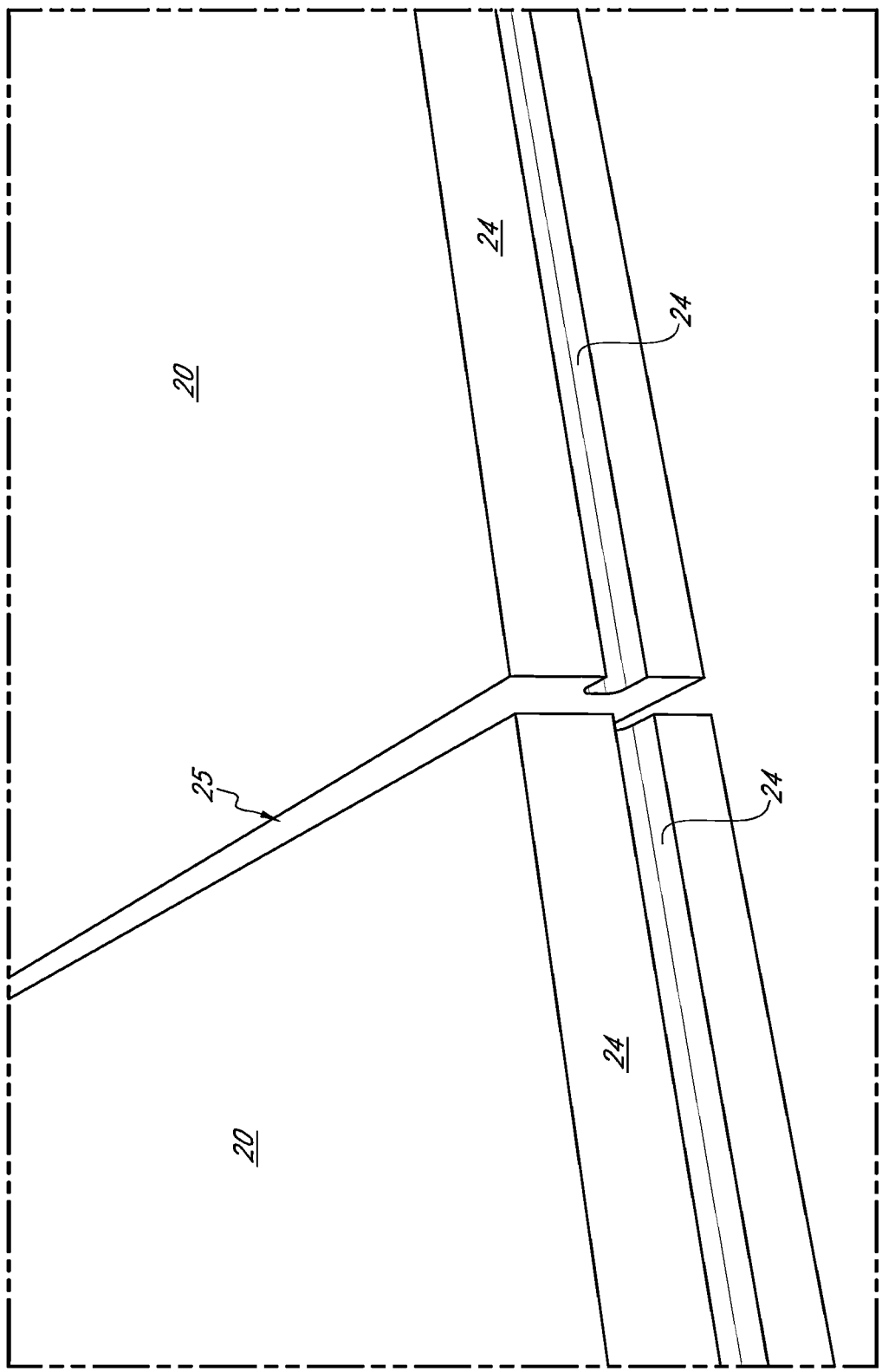
Figure 38C:
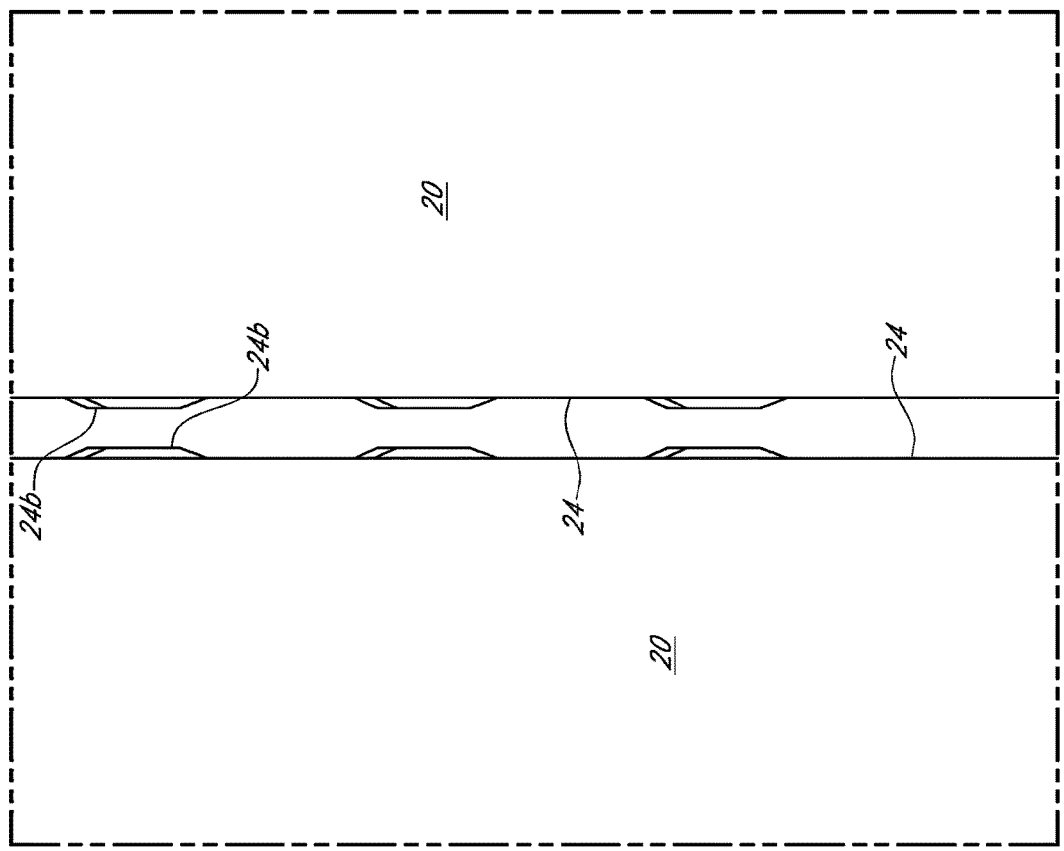
Figure 39A:
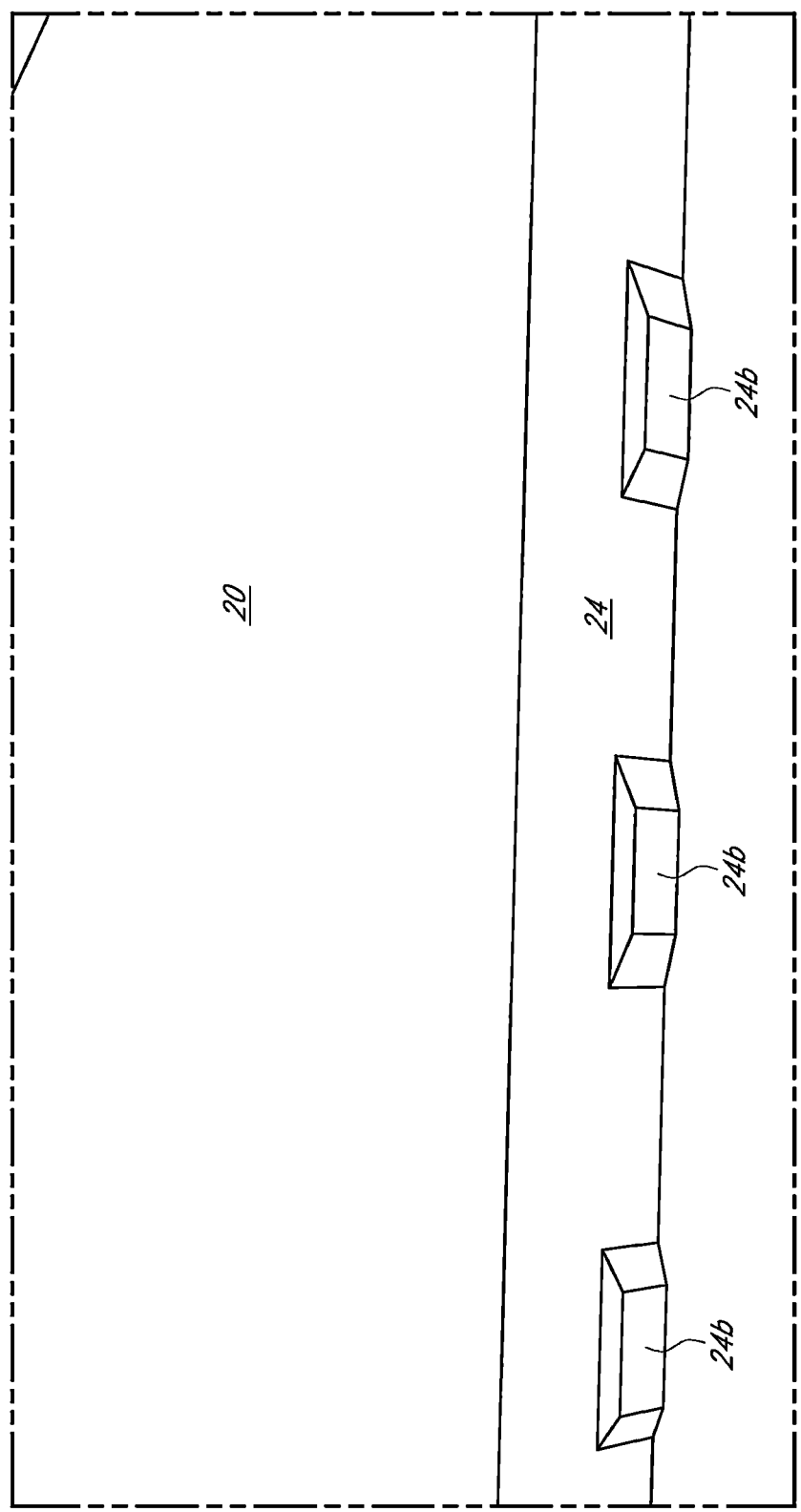
FIGS. 39A-39F provide various views of the illustrative embodiment of a tile.
Figure 39B:
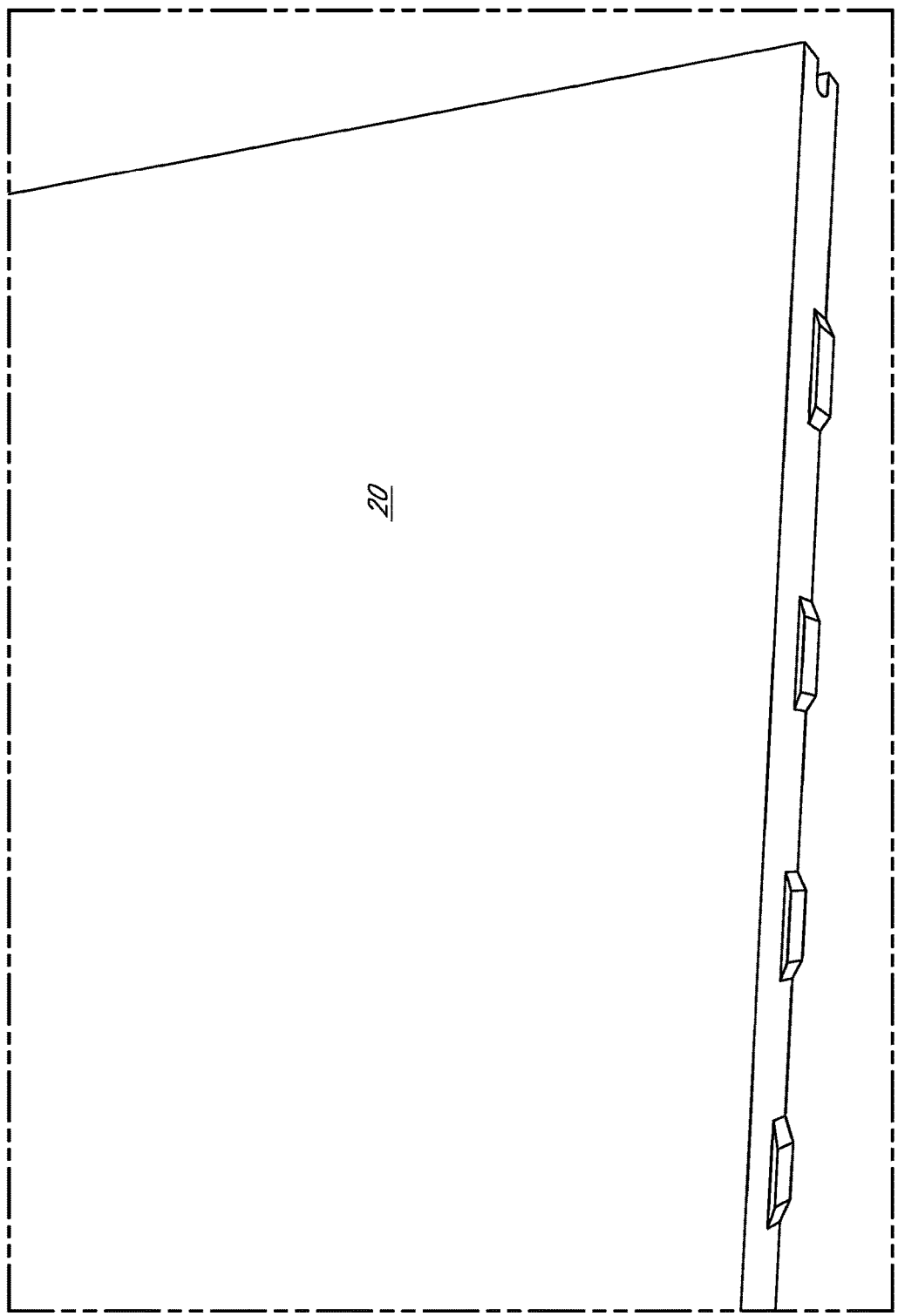
Figure 39C:
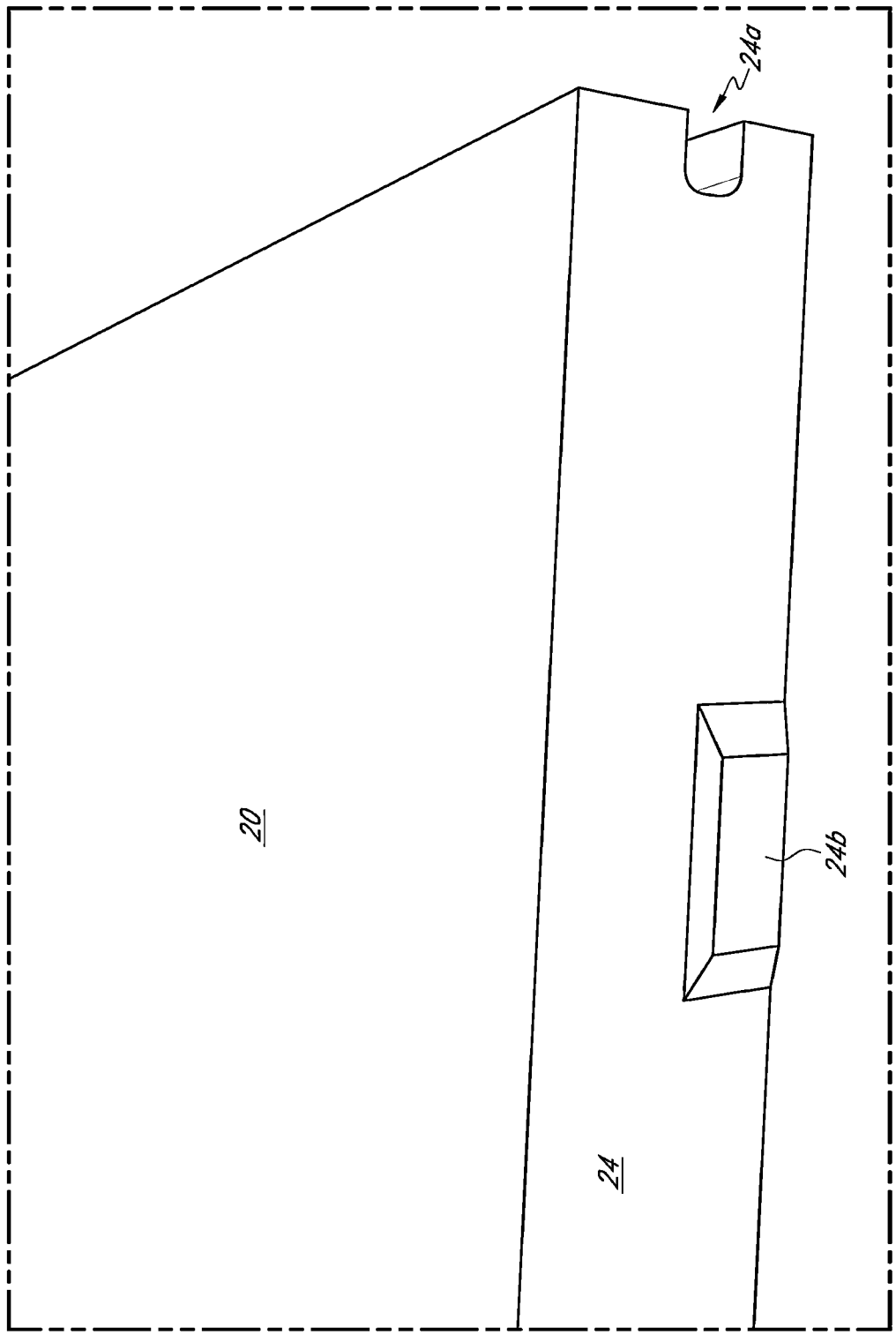
Figure 39D:
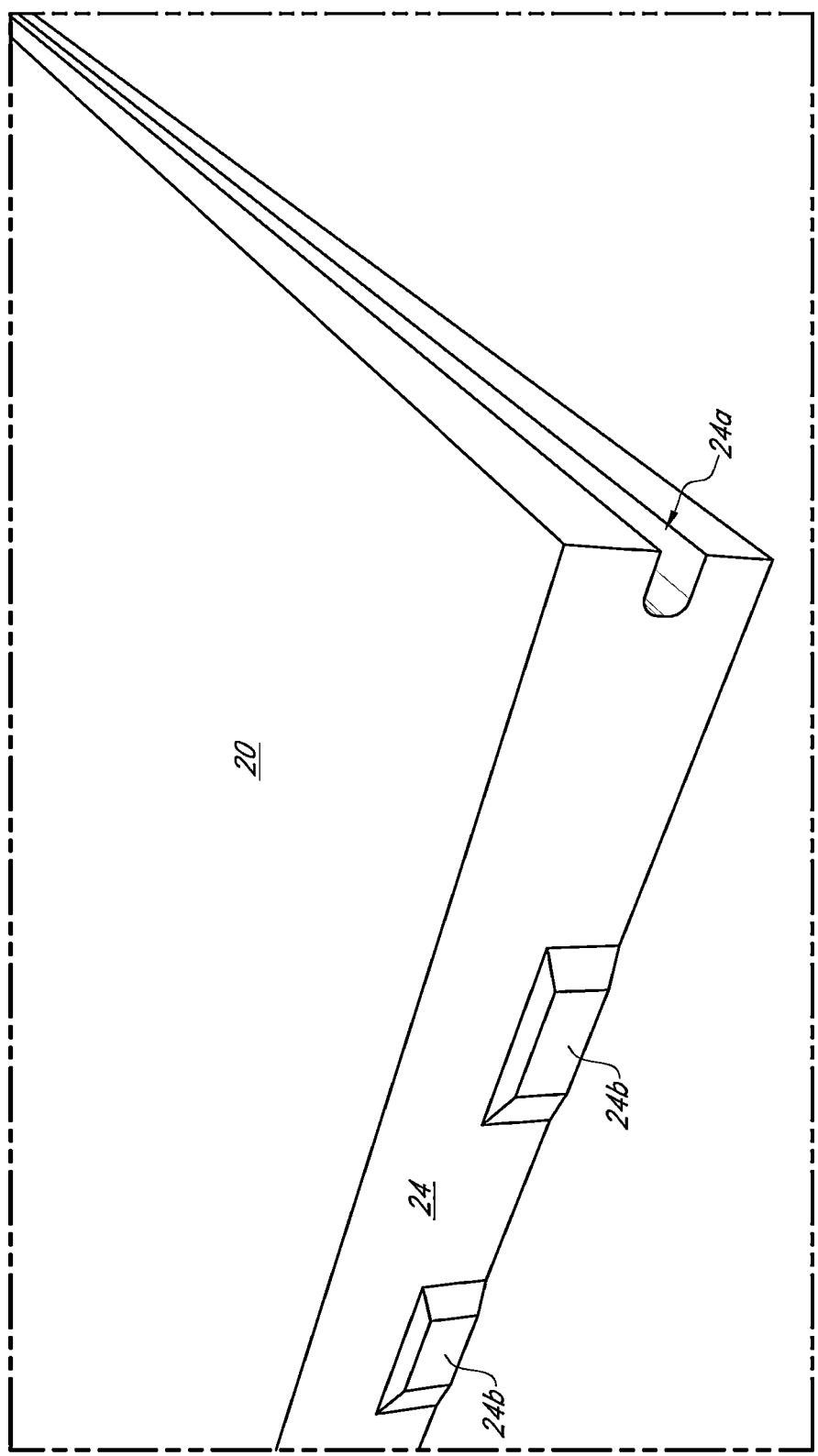
Figure 39E:
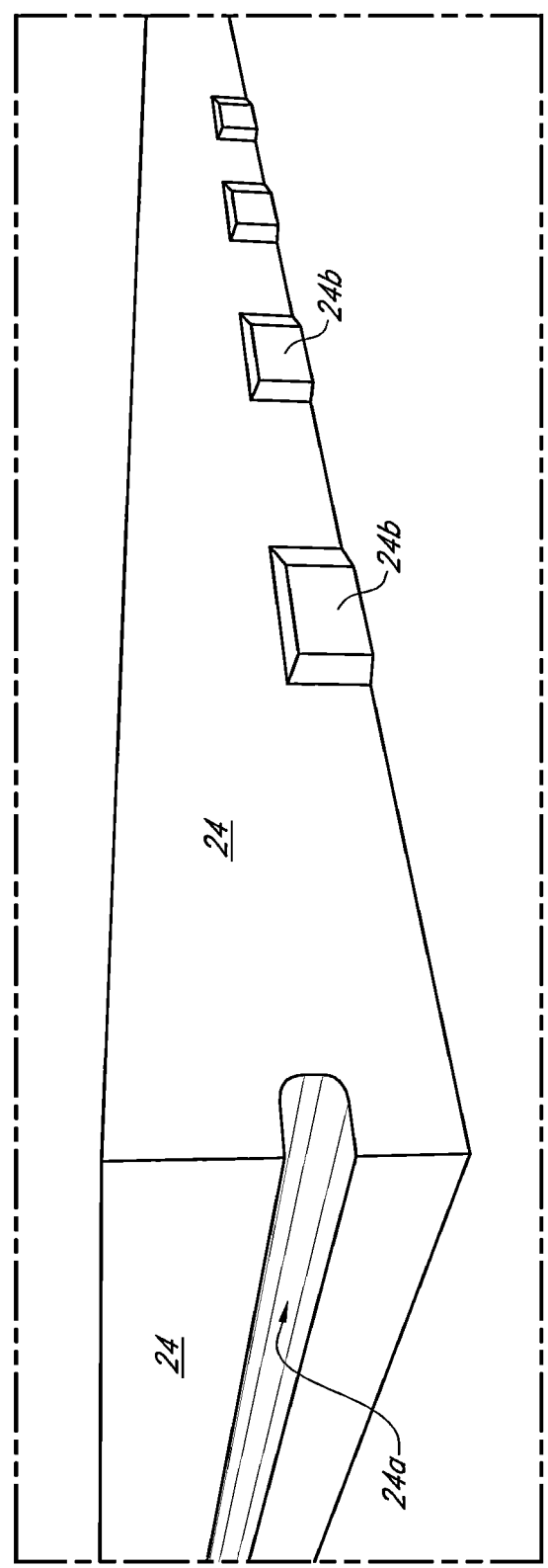
Figure 39F:
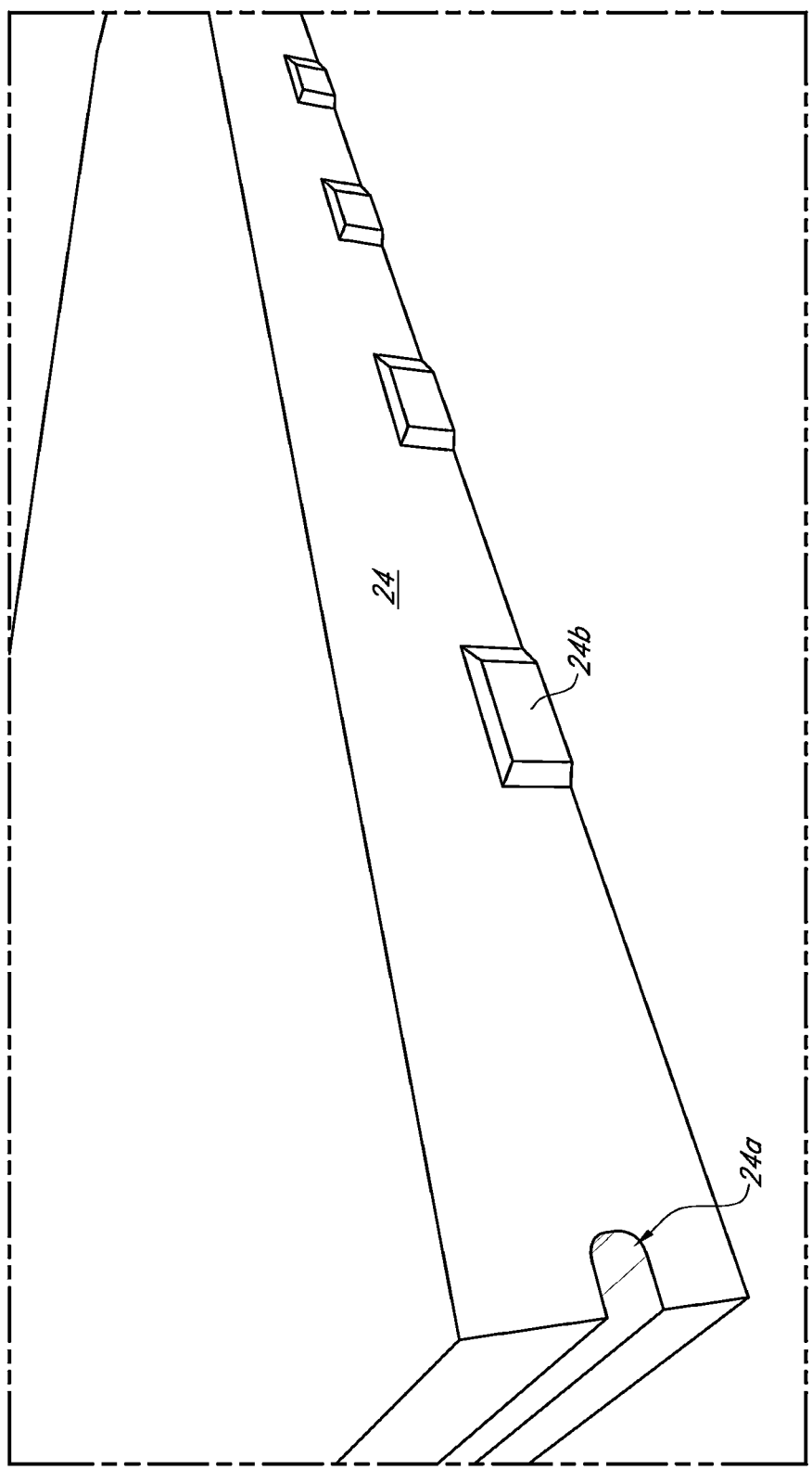

Various illustrative aspects of both a riser tile 220a and horizontal end tile 220b that may be used with the illustrative embodiment of a tile support structure 210 are shown in FIGS. 37-31B, wherein FIGS. 31A and 31B provided a detailed side and bottom view, respectively, of an illustrative embodiment of a horizontal end tile 220b. The tiles 220a, 220b may be generally rectangular in shape, such that two rectangular-shaped faces 222 may be spaced from one another by the height of an edge 224 of the tile 220a, 220b. In one aspect, the height of an edge 224 may be 20 millimeters, and in another aspect the height thereof may be 30 millimeters. However, as previously mentioned, the scope of the present disclosure is not limited by the specific shape, dimensions, and/or configuration of the tile 220a, 220b unless so indicated in the following claims. The bottom face 222 may be engaged with a substrate 228, which may be configured as a synthetic (e.g., fiberglass, plastic, etc.) sheet having a periphery equal to or approximately equal to that of the tile 220a, 220b. In one aspect, the thickness of a substrate may be ¼ of an inch, but the specific dimensions of the substrate 228, if used for that embodiment of a tile 220a, 220b, is in no way limiting to the scope of the present disclosure unless so indicated in the following claims. If a substrate 18 is used, it may be engaged with the tile 220a, 220b using any suitable structure and/or method suitable for the particular application of the tile 220a, 220b, including but not limited to chemical adhesives, mechanical fasteners, and/or combinations thereof. The scope of the present disclosure is in no way limited by whether a substrate 18 is engaged with a tile 220a, 220b unless so indicated in the following claims.

Opposite edges 224 of a tile 220a, 220b may be formed with a groove 224a therein, as clearly shown at least in FIGS. 27, 29, and 30A-31A. The groove 224a may be formed in the edge 224 of the tile 220a, 220b, in a portion of the edge 224 of the tile 220a, 220b, in a portion of a surface of a substrate 228 (if present), and/or a combination of a portion of the tile 220a, 220b and a portion of the substrate 228. The groove 224a may be configured such that it cooperates with the rail 236 at the distal end of the spine 234, and such that the bottom face 222 of the tile 220a, 220b (or bottom surface of the substrate 228, if present for that embodiment of a tile 220a, 220b) rests upon the corresponding surface of the flange 232 and lip 233, as clearly shown at least in FIGS. 30B and 30C. Accordingly, one riser tile 220a may be engaged on opposing edges 224 of the tile 220a with an adjacent upper and lower riser support structure 230a, 230b. In this manner, the riser tile 220a may slide with respect to the riser support structures 230a, 230b along the lengths of the riser support structures 230a, 230b. Such a configuration allows adjacent riser tiles 220a between corresponding riser support structures 230a, 230b to be slid into place from an open end of the riser support structures 230a, 230b until the final riser tile 220a is positioned. Simultaneously, this configuration may secure the relative position of the riser tile 220a with respect to the riser support structures 230a, 230b in all other dimensions (e.g., a vertical dimension and a horizontal dimension perpendicular with respect to the length of the riser support structures 230a, 230b).

It is contemplated that the dimensions of the groove 224a may be selected such that a common blade and/or tool may be used to form the required groove 224a in a given edge 224. It is also contemplated that in certain aspects of a tile and support structure 210, a predetermined amount of space may exist between the surfaces of a groove 224a and the surfaces of a rail 236, between the edge 224 and the spine 234, and/or between the bottom face 222 and flange 232 such that water and/or other liquids and/or other precipitation may flow via gravity between the groove 224a and the rail 236, between the edge 224 and spine 234, and/or between the bottom face 222 and flange 232.

Referring now specifically to FIGS. 3IA & 3IB, the horizontal end tile 220b may be configured such that a first portion thereof has a thinner edge 224 than a second portion thereof. This reduction in the thickness of the edge 224 may be accomplished via not positioning substrate 228 on the first portion (the thinner portion), but the scope of the present disclosure is not so limited unless otherwise indicated in the following claims. As shown in FIGS. 30A and 30B, the tile and support structure 210 may be configured such that this first portion extends outward over part of the riser tile 220a. The edge of the substrate 228 defining the interface between the second portion (that portion of the horizontal end tile 220b having an edge 224 thickness greater than the first portion thereof) and the first portion may engage a surface of the upper riser support structure 230a (and specifically the tip 234a thereof as shown in FIG. 30B but without limitation unless otherwise indicated in the following claims).

In an illustrative embodiment, the edge 224 of the second portion of the horizontal end tile 220b may be at least partially comprised of substrate 228 and be configured with one or more grooves 224a therein for engagement with a support structure 30 and/or edge support structure 30a such as those previously described in detail above for retaining and/or positioning one or more tiles 20 (which tile(s) 20 may be configured as a horizontal end tile 220b). However, the scope of the present disclosure is not so limited unless otherwise indicated in the following claims. In this manner, by manipulating the length of the first portion of the horizontal end tile 220b, the amount by which the horizontal end tile 220b extends over the riser tiles 220a may be manipulated for functional and/or aesthetic purposes. In one illustrative embodiment, the length of the first portion may be approximately 1.5 to 1.9 inches, but the scope of the present disclosure is not so limited unless otherwise indicated in the following claims.

Figure 32A:
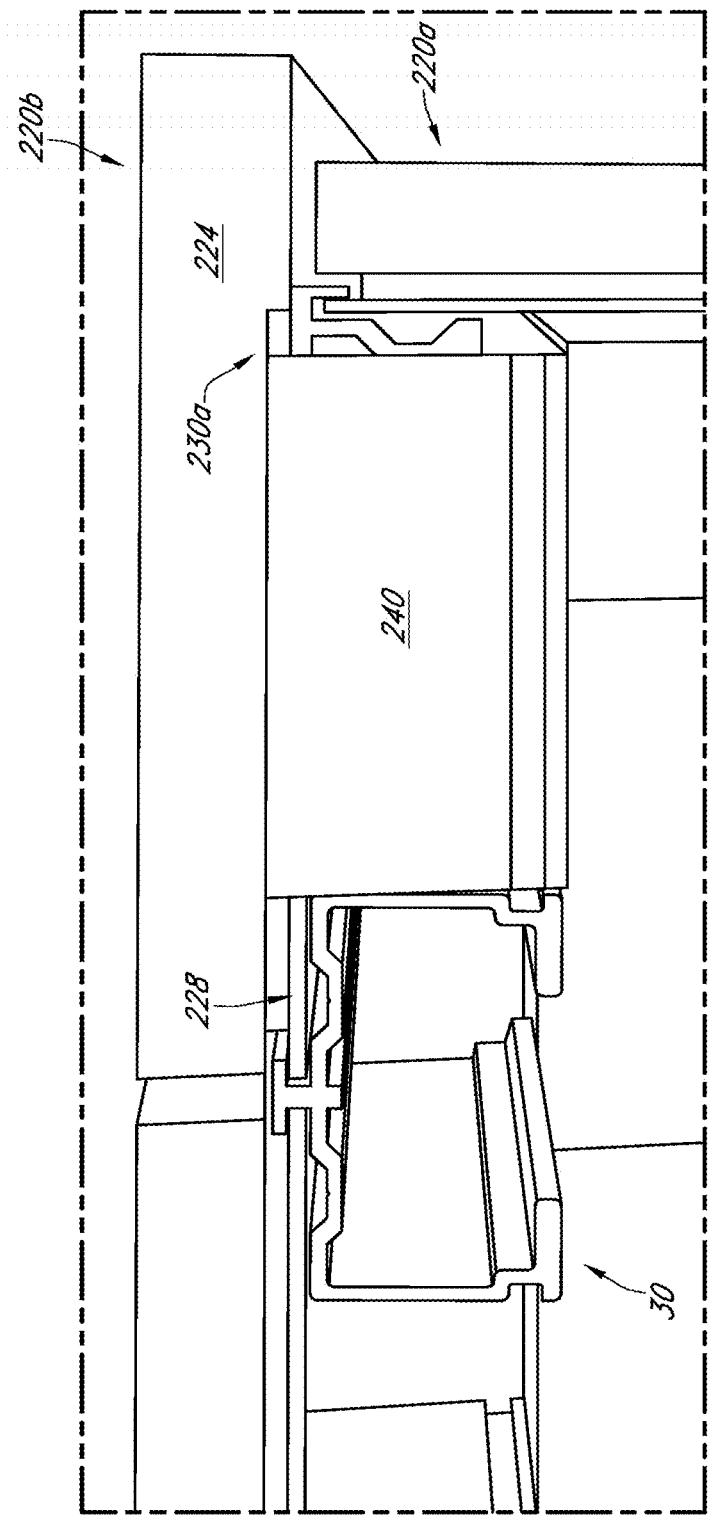
FIGS. 32A through 32D provide various detailed views of a tile and support structure that may be used in a vertical configuration.
Figure 32B:
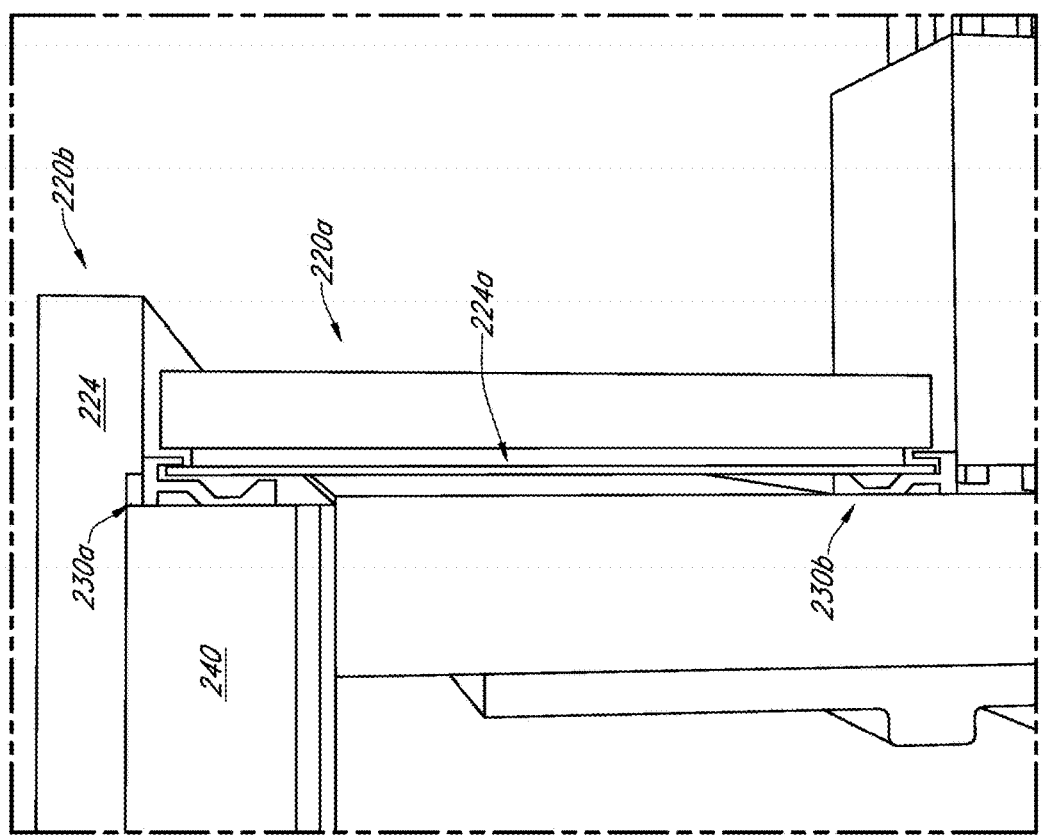

Referring now to FIGS. 32A-33, another embodiment of a tile and support structure 210 that may be used to mount a riser tile 220a in a generally vertical orientation. However, unlike the embodiment of a tile and support structure 210 shown in FIGS. 27-30C (wherein the support structure 30 engaged with the horizontal end tile 220b may be oriented such that its length is generally perpendicular to the length of the upper and lower riser support structures 230a, 230b), in the embodiment shown in FIGS. 32A-33 the support structure 30 engaged with the horizontal end tile 220b may be oriented such that its length is generally parallel to the length of the upper and lower riser support structures 230a, 230b. Accordingly, horizontal end tiles 220b configured for use with the embodiment of a tile and support structure 210 shown in FIGS. 32A-33 may be configured differently from those for use with the embodiment of a tile and support structure shown in FIGS. 27-30C as described in further detail below.

A horizontal end tile 220b may be configured in a manner that is correlative to that of the horizontal end tile 220b previously described above, wherein a first portion thereof has a thinner edge 224 than a second portion thereof. This reduction in the thickness of the edge 224 may be accomplished via not positioning substrate 228 on the first portion (the thinner portion), but the scope of the present disclosure is not so limited unless otherwise indicated in the following claims. As shown in FIGS. 27-29, the tile and support structure 210 may be configured such that this first portion extends outward over a portion of the riser tile 220a. The edge of the substrate 228 defining the interface between the second portion (that portion of the horizontal end tile 220b having an edge 224 thickness greater than the first portion thereof) and the first portion may engage a spacer 240 positioned between a support structure 30 with which the horizontal end tile 220b is engaged and an upper riser support structure 230a as described in further detail below.

In an illustrative embodiment, the edge 224 of the second portion of the horizontal end tile 220b may be at least partially comprised of substrate 228 and be configured with a groove 224a therein for engagement with a support structure 30 and/or edge support structure 30a such as those previously described in detail above for retaining and/or positioning one or more tiles 20. However, the scope of the present disclosure is not so limited unless otherwise indicated in the following claims. In this manner, by manipulating the length of the first portion of the horizontal end tile 220b, the amount by which the horizontal end tile 220b extends over the riser tiles 220a may be manipulated for functional and/or aesthetic purposes.

Figure 32C:
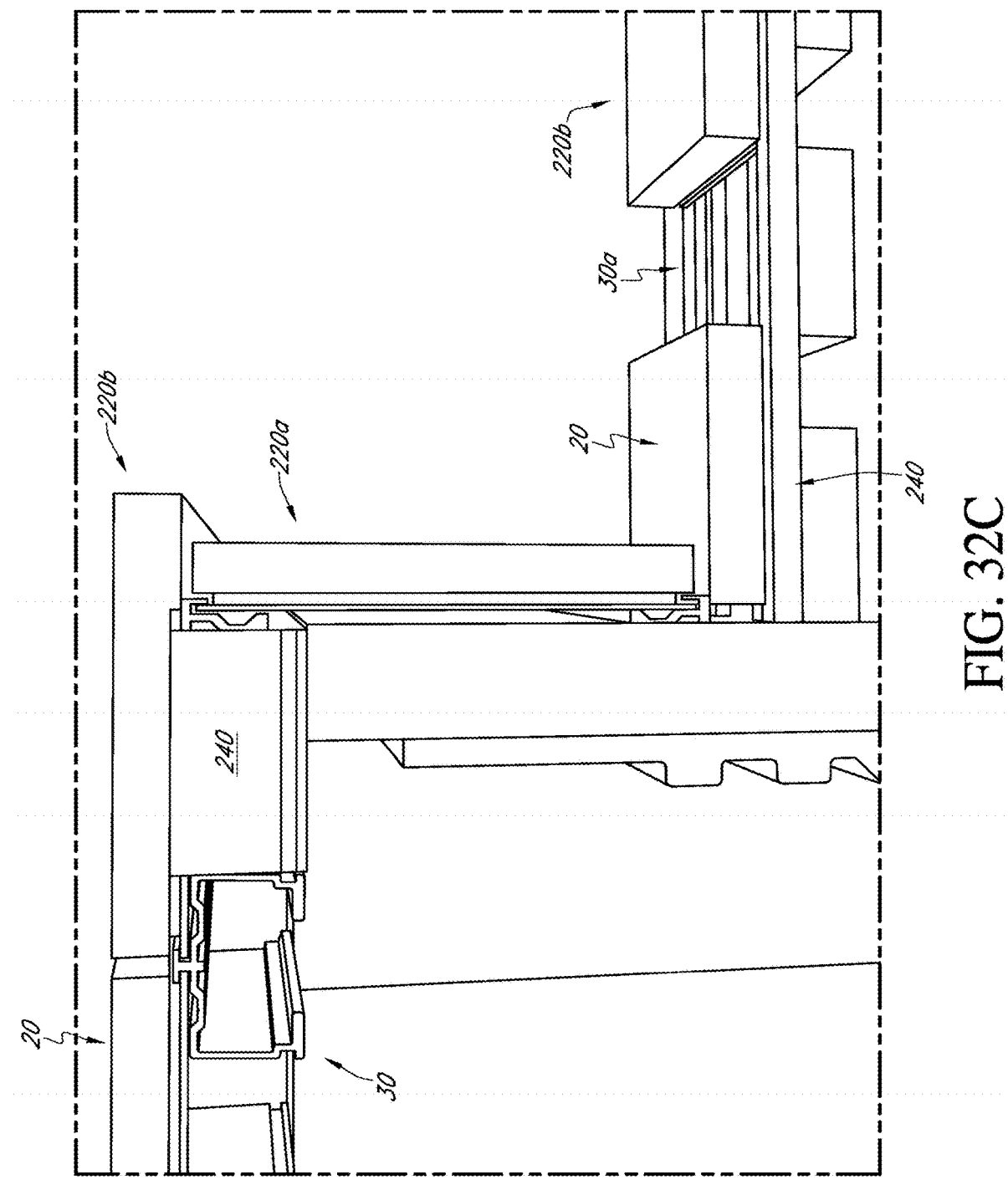
Figure 32D:
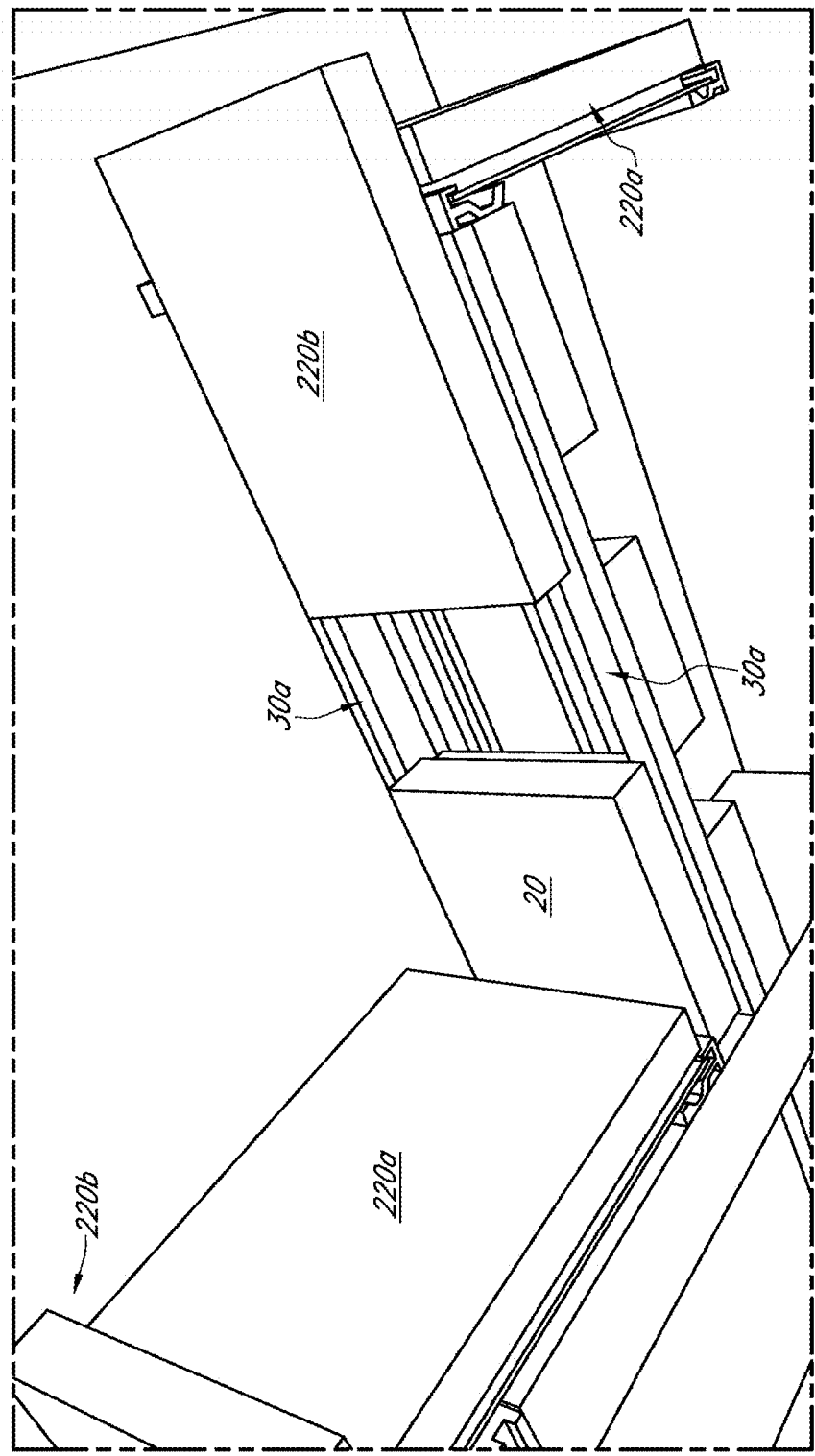

Referring specifically to FIGS. 32A & 32C, the portion of the horizontal end tile 220b without any substrate 228 engaged therewith may rest upon a spacer 240. The spacer 240 may be positioned between a support structure 30 and/or end support structure 30a and an upper riser support structure 230a. It is contemplated that this configuration may be especially useful in the transition from the top stair to a larger tiled area (such as a deck), whereas the configuration shown in FIGS. 27-30C and described above may be especially useful for horizontal tiles 20 and/or horizontal end tiles 220b used specifically as stairs, wherein the tiles 20 and/or horizontal end tiles 220b may be configured as the tread of the stair. However, the optimal orientation and/or configuration of the support structures 30 for a larger flat surface (e.g., deck surface, roof top, raised patio, etc.) will vary from one application to the next and may depend at least upon the location of the stairs with respect to the larger flat surface, the framing plan and/or shape of the larger flat surface, whether the stairs include a landing, and/or other factors. Accordingly, the scope of the present disclosure is not limited by the relative orientation and/or configuration of the support structure 30 and/or edge support structure 30a of the larger flat surface to those of the stairs unless otherwise indicated in the following claims.

Generally, and again without limitation unless otherwise indicated in the following claims, the tread portion of a stair for stairs constructed using a tile and support structure 210 as disclosed herein may include at least one edge support structure 30a, and for at least one preferred embodiment may use two edge support structures 30a, with an edge support structure 30a engaged with two parallel edges 24, 224 of a tile 20 or horizontal end tile 220b configured as the stair tread. In another preferred embodiment the tread portion may include a support structure 30 equally spaced between two edge support structures 30a, and two horizontal end tiles 220b may be configured as the stair tread. The support structure 30 and edge support structures 30a may be oriented such that they are parallel to the length of the stair stringers 202. That is, they may be oriented such that the horizontal end tiles 220b may be removed by sliding them in the horizontal dimension away from the riser tiles 220a along the length of the stair stringer 202. However, other configurations and/or orientations may be used without limitation unless otherwise indicated in the following claims.

In still another preferred embodiment of a tile and support structure 210, the tread portion may include a support structure 30 equally spaced between two edge support structures 30a, and two horizontal end tiles 220b may be configured as the stair tread. Again, the support structure 30 and two edge support structures 30a may be oriented such that they are parallel to the length of the stair stringers 202. That is, they may be oriented such that the horizontal end tiles 220b may be removed by sliding them in the horizontal dimension away from the riser tiles 220a along the length of the stair stringer 202. Additionally, this embodiment may include a third edge support structure 30a positioned adjacent the rear edge 224 of the horizontal end tiles 220b (the edge 224 adjacent the riser tile 220a immediately above the horizontal end tile 220b) that is oriented perpendicular with respect to the first and second edge support structures 30a and the support structure 30 previously described. In this manner, three edges 224 of the horizontal end tile 220b may be engaged with a rail 36 (both side edges 224 and the rear edge 224). However, other configurations and/or orientations may be used without limitation unless otherwise indicated in the following claims.

In one illustrative embodiment the stair tread may be 48 inches wide and 12 inches deep, such that the tread may be formed with two 12-inch-by-24-inch horizontal end tiles 220b. The stair riser may be 48 inches wide and approximately 6.5 inches high, such that the riser may be formed with two 6.5-inch-by-24-inch riser tiles 220a. However, any dimensions disclosed herein are for illustrative purposes only and in no way limiting to the scope of the claims unless otherwise indicated therein.

Additional Illustrative Tile Embodiments and Applications

Referring now to FIGS. 34A-39F, therein is shown various views of a tile and support structure 10 that may be used to mount a tile 20, reinforced tile 120, riser tile 220a, and/or bottom indexing tile 320 in a generally vertical configuration, such as the riser of a step, as a border around a portion of a deck, a building and/or wall fa<,ade, ventilated fa<,ade, interior or exterior wall covering, or other surface without limitation unless otherwise indicated in the following claims.

Referring now specifically to FIGS. 34A-36B, a support structure 30 for such applications may be configured with an upper portion such that it is substantially similar to that of the support structures 30, 30' shown in FIGS. 5-9, 11A-12B, and 13-15B and may be configured with any of the various features and/or elements for a support structure 30, edge support structure 30a, roof support structure 30', roof edge support structure 30a', pedestal 50, and/or support structure 130, as previously described herein above and which features and/or elements may have correlative functions and/or benefits of those previously described without limitation unless otherwise indicated in the following claims.

The support structures 30, 30a shown in FIGS. 34A-37 may be configured with a base 31, at least one flange 32, at least one trough 32a, at least one aperture 32b, a tip 34a, a spine 34, and/or rail(s) 36 as previously described in detail above for engagement of the support structure 30 and/or edge support structure 30a with one or more tiles 20. Two opposing flanges 32 may extend outward from a center of the base 31, and such that a tip 34a may extend downward from the base 31. That is, there may be open areas on either side of the tip 34a on the bottom side of each flange 32. A spine 34 may extend upward from the base 31. At the top distal end of the spine 34, a rail 36 may extend outward from the spine 34 in a generally horizontal dimension, wherein the rail 36 may be generally parallel with respect to the flange 32 and generally perpendicular with respect to the spine 34. The tip 34a may be collinear with the spine 34.

A trough 32a may be formed in each flange 32. A plurality of apertures 32b may be formed either trough 32a at certain intervals and/or locations. In another embodiment (as an alternative to a plurality of apertures 32b or in addition thereto), each trough 32a may be formed with a V-channel 32c therein along the length of the support structure 30, 30a to provide a starter for a screw and/or other fastener. Such a feature may provide for a relatively easier installation process by mitigating and/or eliminating the propensity for the leading tip of the screw or other fastener to slide horizontally within the trough 32a during installation and/or otherwise move in an undesired manner without limitation unless otherwise indicated in the following claims.

Each flange 32 may terminate at a lip 33, and the top surface of each flange 32 at the lip 33 and adjacent the spine 34 may be collinear as previously described for other aspects of a tile and support structure 10. The distal end of the tip 34a may be coplanar with the bottom surface of the base 31. Such a configuration may allow the tip 34a to abut a joist 14, wall surface, stair stringer, border member, and/or structural component during use. As it is contemplated that the embodiment shown in FIGS. 34A-39F may be especially useful in vertical applications (e.g., wherein a tile 20 engaged with the support structure 30 serves as a building and/or wall fa<,ade), the terms "vertical," "horizontal," "top," "bottom," and the like as used herein are relative and not limiting unless otherwise indicated in the following claims.

The support structure 30 may be formed with a channel portion 37. The channel portion may include one or more side members 37a, which may extend downward from either distal end of the base 31 (which distal end may be adjacent a lip 33) of the support structure 30. The side members 37a may terminate at a bottom member 37c, which bottom member 37c may be configured such that it is generally perpendicular with respect to the side members 37a. A notch 37b may be formed in a side member 37a between the bottom member 37c and the base 31. In an aspect of the support structure 30, the support structure 30 may be formed with two distinct bottom members 37c at the terminal end of two distinct side members 37a, as shown at least in FIGS. 34A & 34B, both of which bottom members 37c are perpendicular with respect to the side members 37a but parallel with respect to one another. In another aspect of a support structure 30, the support structure 30 may be formed with one continuous bottom member 37c engaged with each side member 37a, as shown at least in FIG. 15B for a roof support structure 30', which continuous bottom member 37c may be perpendicular with respect to either side member 37b. Accordingly, the specific configuration of the bottom member(s) 37c in no way limits the scope of the present disclosure unless so indicated in the following claims. Various dimensions for the support structure 30, edge support structure 30a, and various features of same are shown in FIGS. 34B-36B. Such dimensions are for illustrative purposes only and are in no way limiting unless otherwise indicated in the following claims.

Figure 35A:
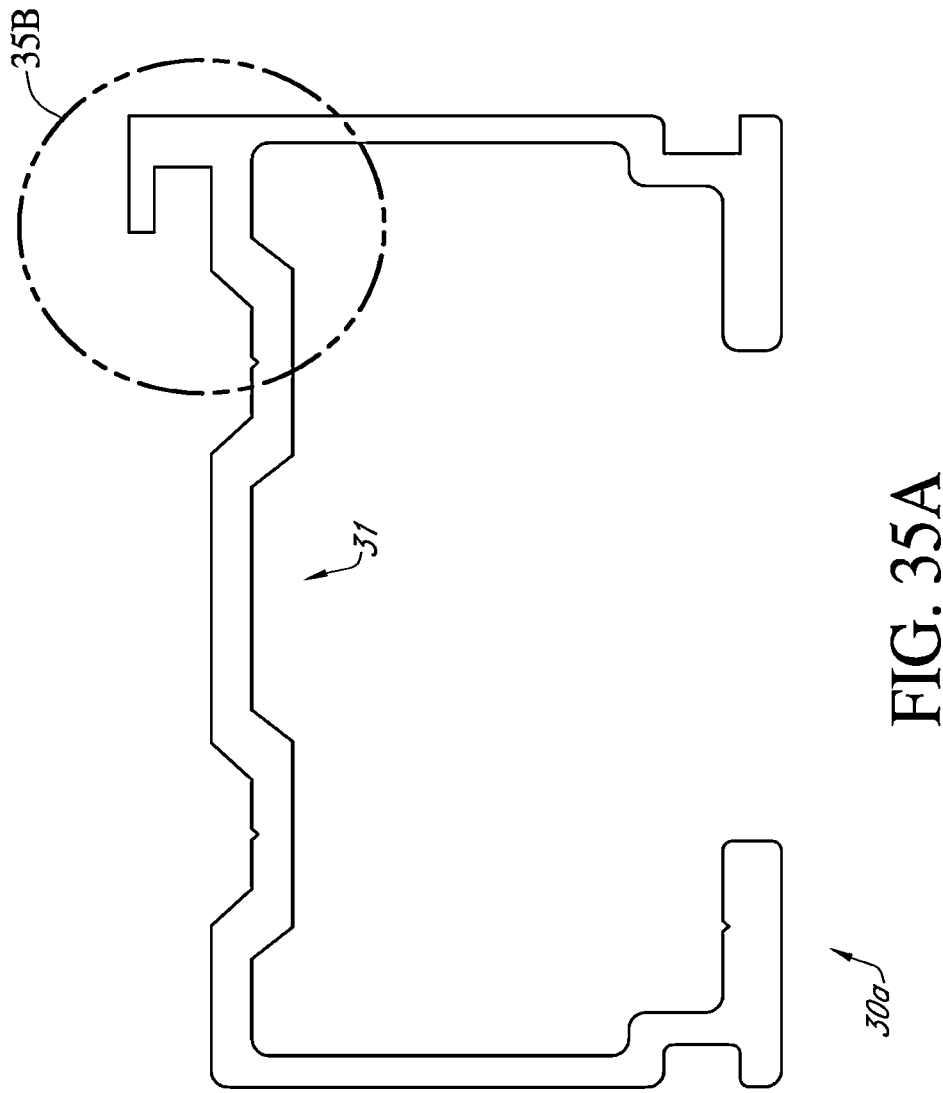
FIG. 35A is a cross-sectional view of an illustrative embodiment of an edge support structure showing illustrative dimensions of various features.
Figure 35B:
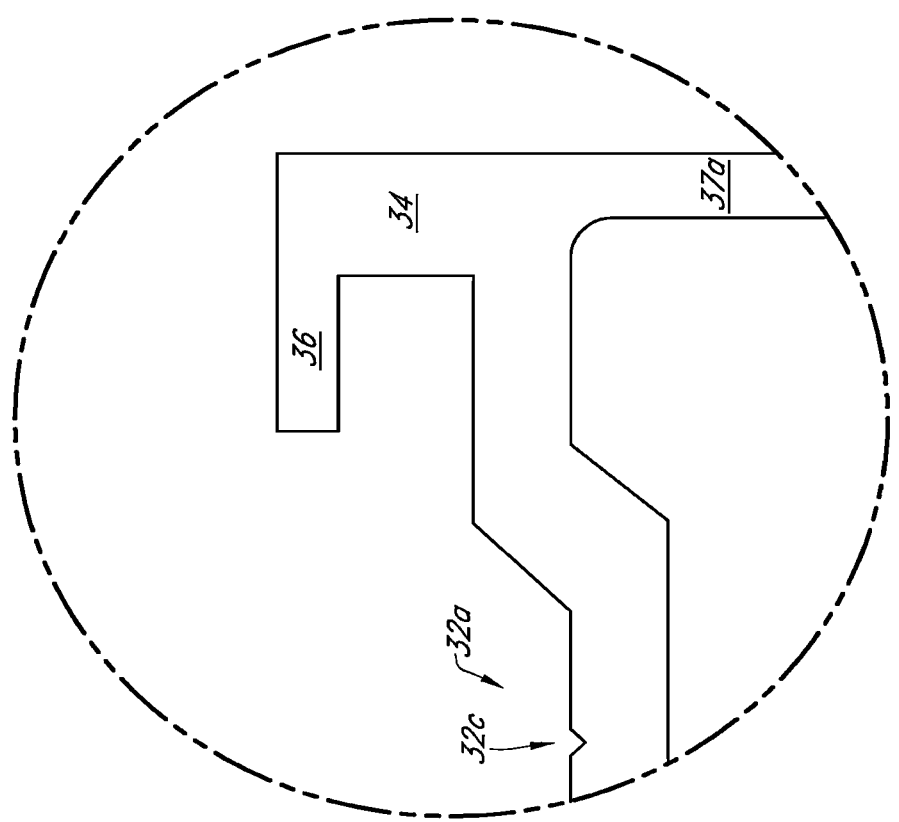
FIG. 35B is a detailed view of a portion of the edge support structure shown in FIG. 35A.
Figure 36A:
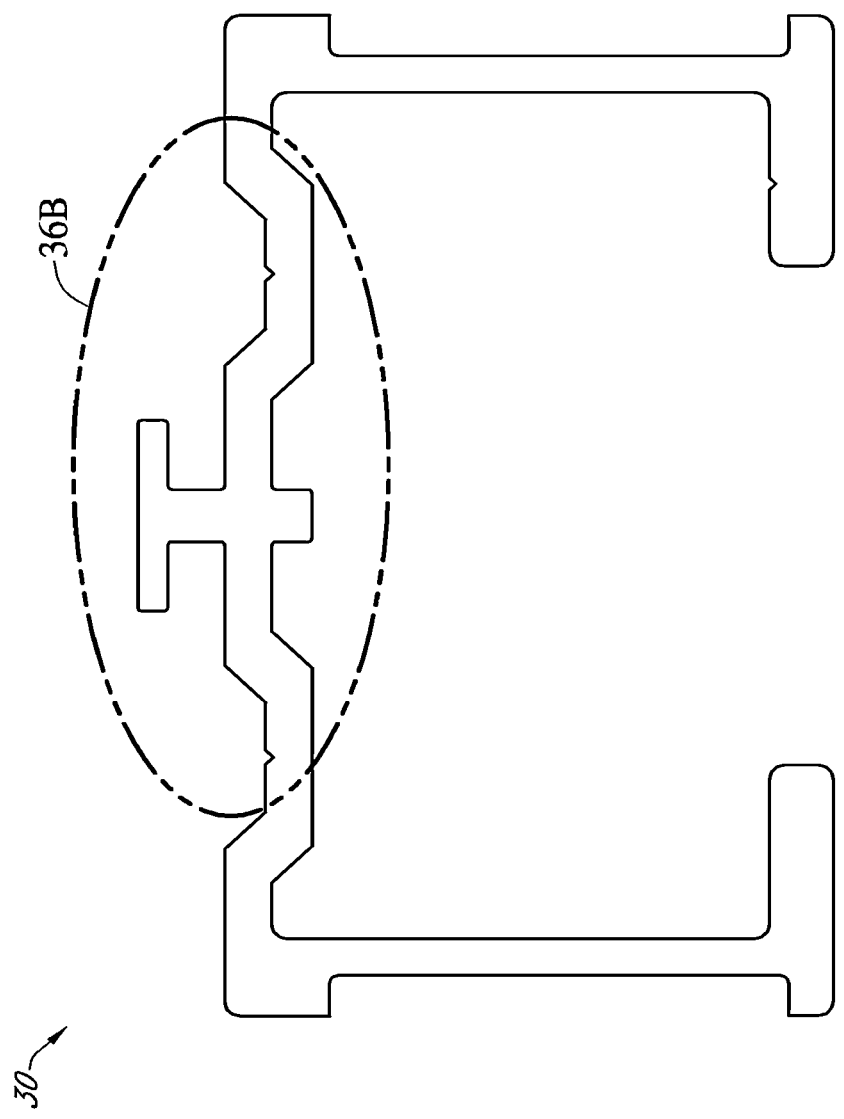
FIG. 36A is a cross-sectional view of another illustrative embodiment of a support structure showing illustrative dimensions of various features.
Figure 36B:
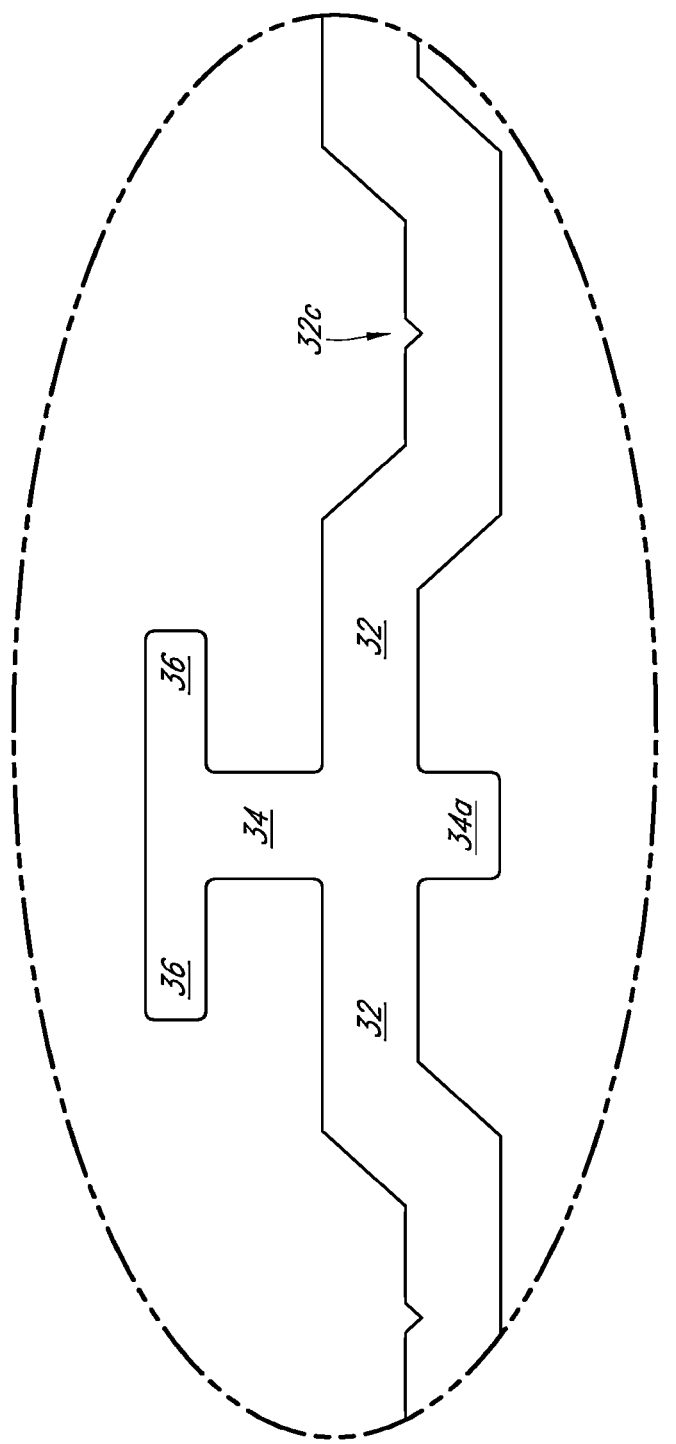
FIG. 36B is a detailed view of a portion of the support structure shown in FIG. 36A.

The edge support structure 30a shown in FIGS. 35A & 35B may have a spine 34 extending upward from one edge of a flange 32 (e.g., the spine 34 may extend upward from there area that constitutes the lip 33 in the support structure shown in FIGS. 36A & 36B) and have a single rail 36 extending inward toward the center of the base 31. In such a configuration, the spine 34 may be generally colinear with the side member 37a of the channel portion 37 without limitation unless otherwise indicated in the following claims. Additionally, the edge support structure 30a may be formed without a tip 34a for certain applications.

The edge support structure 30a shown in FIGS. 35A & 35B and the support structure 30 shown in FIGS. 36A & 36B may be configured in a manner substantially similar to the edge support structure 30a and support structure 30 as previously described above and as shown herein without limitation unless otherwise indicated in the following claims. Generally, the side members 37a in the embodiments shown in FIGS. 36A-37 may be relatively longer than those shown in the embodiments in FIGS. 34A & 34B to provide additional clearance between the tile 20 engaged with the support structure 30, 30*a* and underlying structure (e.g., joists, framing, wall surface, etc.) without limitation unless otherwise indicated in the following claims.

A cross-sectional depiction of the edge support structure 30*a* from FIGS. 35A & 35B and the support structure 30 from FIGS. 36A & 36B engaged with tiles 20 in a typical application is shown in FIG. 37. As shown therein, two illustrative embodiments of a tile 20 are shown positioned adjacent one another with a clearance 25 therebetween, and another tile 20 is shown at the border of the plurality of tiles 20 (e.g., adjacent an exterior wall, border, door threshold, etc.).

Referring now to FIGS. 38A-39F, various views of several illustrative embodiments of a tile 20 are shown therein. Two tiles 20 are shown positioned adjacent to and abutting one another with a predefined clearance 25 therebetween in FIGS. 38A & 38B and spaced from one another by a greater amount in FIG. 38C. Various views of a single tile 20 are shown in FIGS. 39A-39F. The illustrative embodiments of a tile 20 shown in FIGS. 39A-39F may be comprised of a single material without the need for a substrate 20*a* engaged with the tile 20. However, other illustrative embodiments of a tile 20 and/or reinforced tile 120 having a substrate 20*a*, 120*a* engaged therewith may be used with the support structures 30 and/or edge support structures 30*a* shown in FIGS. 34A-37 without limitation unless otherwise indicated in the following claims.

An illustrative embodiment of a tile 20 may be configured with a one or more protrusions 24*b* on one or more edges 24 of the tile 20. Additionally, and illustrative embodiment of a tile 20 may be configured with a groove 24*a* on one or more edges 24 of the tile 20. In the illustrative embodiment of a tile shown in FIGS. 38A-39F, the groove 24*a* in the edge 24 may be positioned at approximately the middle of the tile 20 with respect to the thickness of the tile 20. Accordingly, a groove 24 may be machined into the material of construction for the tile 20 (e.g., cement, ceramic, stone, etc.) rather than a different material (e.g., a substrate 20*a*, 120*a*). Additionally, the protrusions 24*b* may be formed directly from the material of construction of the tile 20 rather than a different material.

The protrusions 24*b* may cooperate with the edge 24 of an adjacent tile 20 and/or protrusion 24*b* of an adjacent tile 20 such that adjacent tiles 20 are spaced from one another by a predetermined clearance 25 when installed. Such a configuration, when employed with an illustrative embodiment of a support structure 30 such as those disclosed herein may allow for uniform, secure, and ideal spacing for a plurality of tiles 20 in addition to allowing for relatively fast and efficient installation and the required resistance to wind up-lift. The protrusions 24*b* may be machined/formed in the tile 20 into the material of which the tile 20 is comprised (e.g., cement, porcelain, stone, etc.) such that a plurality of tiles 20 may be perfectly spaced end-to-end on all sides with no tile spacer, clip, or substrate 20*a*, 120*a* needed without limitation unless otherwise indicated in the following claims. Other advantages and/or benefits of the various apparatuses disclosed herein may also be realized without limitation unless otherwise indicated in the following claims.

Generally, the height of the spine 34 and location of the groove 24*a* on the tile edge 24 may cooperate to determine wherein along the thickness of the tile 20 the rail(s) 36 engage the tile 20. In the illustrative embodiments shown in FIGS. 34A-39F, the groove 24*a* and support structure 30 may be configured such that the groove 24*a* may be positioned at approximately the centerline of the tile 20 with respect to its thickness, as previously described above. The specific number, dimensions, configuration, etc. of the protrusions 24*b* may vary from one application of the tile and support structure 10 to the next, and one or more protrusions 24*b* may be positioned on one, two, three, or four edges 24 of the tile without limitation unless otherwise indicated in the following claims. Furthermore, the specific number, dimensions, configurations, etc. of a groove 24*a* may vary from one application of the tile and support structure 10 to the next, and a groove 24*a* may be positioned on one, two, three, or four edges 24 of the tile without limitation unless otherwise indicated in the following claims.

In applications of the tile and support structure 10 wherein tile 20 shatter and/or fall-through may be of lesser concern (in either interior or exterior applications), tiles 20 not requiring or using a substrate 20*a* 120*a* may be especially advantageous. Such applications include but are not limited to various applications other than elevated decking secured above joists, such as rooftop decks where the tiles 20 may only be suspended by as little as 2 to 3 inches above a flat roof, applications wherein there is very minimal fall-through risk as the tiles 20 may only be a few inches above a solid surface. Additionally, material advances have allowed for tiles 20 without a substrate 20*a*, 120*a* to exhibit significantly improved strength than previously possible. Finally, in certain applications (e.g., when used as a wall covering, façade, etc.) the tile 20 may bear only a nominal or very small load. Generally, it is further contemplated that the production process for tiles 20 such as those shown in FIGS. 38A-39F may be significantly less complicated, less time-consuming, and less costly than tiles 20 and/or reinforced tiles 120 utilizing a substrate 20*a*, 120*a*. In some applications (e.g., for on-grade ground applications) no groove 24*a* may be required, but it may still be advantageous to utilize one or more protrusions 24*b* to provide proper clearance 25 and/or self-spacing between adjacent tiles 20.

Alternatively, the illustrative embodiments of a tile 20 shown in FIGS. 38A-39F may employ a substrate 20*a* and/or backing material use substrate, no substrate, a fiberglass plate substrate, galvanized substrate, mesh, etc. (or any other material needed for the specific application) and still have the tongue-and-groove fastening between the tile 20 and support structure 30 that provides perfect spacing, leveling, fast install, and wind up-lift resistance among other benefits/advantages without limitation unless otherwise indicated in the following claims.

Generally, the installation process for a tile and support structure 10 utilizing the various components shown in FIGS. 34A-39F may correlate directly to the installation processes previously described herein above for other tile and support structures 10 without limitation unless otherwise indicated in the following claims.

Although the descriptions of the illustrative aspects of the present disclosure have been quite specific, it is contemplated that various modifications could be made without deviating from the spirit and scope of the present disclosure. Accordingly, the scope of the present disclosure is not limited by the description of the illustrative aspects and/or corresponding figures unless so indicated in the following claims.

The number, configuration, dimensions, geometries, and/or relative locations of the various elements of the tile 20, reinforced tiles 120, pedestal 50, spine 34, rail 36, and/or support structure 30 will vary from one aspect of the present disclosure to the next, as will the optimal configuration thereof. Accordingly, the present disclosure is in no way limited by the specific configurations, dimensions, and/or other constraints of those elements unless so indicated in the following claims.

In the foregoing detailed description, various features are grouped together in a single embodiment for purposes of streamlining the disclosure. This method of disclosure is not to be interpreted as reflecting an intention that the present disclosure requires more features than are expressly recited in each claim. Rather, as the following claims reflect, inventive aspects lie in less than all features of a single foregoing disclosed embodiment. Thus, the following claims are hereby incorporated into this detailed description, with each claim standing on its own as a separate embodiment.

The materials used to construct the tile and support system 10 and various elements and/or components thereof will vary depending on the specific application thereof, but it is contemplated that polymers, metals, metal alloys, natural materials, stone, cement, ceramics, fibrous materials, and/or combinations thereof may be especially useful for the tile and support system 10 in some applications. Accordingly, the above-referenced elements may be constructed of any material known to those skilled in the art or later developed, which material is appropriate for the specific application of the present disclosure without departing from the spirit and scope of the present disclosure unless so indicated in the following claims.

Having described the preferred embodiments of the various methods and apparatuses, other features of the present disclosure will undoubtedly occur to those versed in the art, as will numerous modifications and alterations in the various aspects as illustrated herein, all of which may be achieved without departing from the spirit and scope of the present disclosure. Accordingly, the methods and embodiments pictured and described herein are for illustrative purposes only, and the scope of the present disclosure extends to all method and/or structures for providing the various benefits and/or features of the present disclosure unless so indicated in the following claims. Furthermore, the methods and embodiments pictured and described herein are no way limiting to the scope of the present disclosure unless so stated in the following claims.

Although several figures are drawn to accurate scale, any dimensions provided herein are for illustrative purposes only and in no way limit the scope of the present disclosure unless so indicated in the following claims. It should be noted that the tile and support structure 10, pedestal 50, spine 34, rail 36 and/or components thereof are not limited to the specific embodiments pictured and described herein, but are intended to apply to all similar apparatuses and methods positioning and/or retaining tile(s) 20 and/or reinforced tiles 120 and/or for increasing the durability and/or strength of reinforced tiles 120. Modifications and alterations from the described embodiments will occur to those skilled in the art without departure from the spirit and scope of the present disclosure.

Any of the various features, functionalities, aspects, configurations, etc. for the tiles 20, reinforced tiles 120, support structure 30, spine 34, rail 36, roof support structure 30', inner member 40 and/or pedestal 50, retaining element 60, 60', and/or components of any of the foregoing may be used alone or in combination with one another (depending on the compatibility of the features) from one embodiment and/or aspect of the tile and support system 10 to the next. Accordingly, an infinite number of variations of the tile and support system 10 exists. All of these different combinations constitute various alternative aspects of the tile and support system 10. The embodiments described herein explain the best modes known for practicing the tile and support system 10 and will enable others skilled in the art to utilize the same. The claims are to be construed to include alternative embodiments to the extent permitted by the prior art. Modifications and/or substitutions of one feature for another in no way limit the scope of the tile and support system 10 and/or component thereof unless so indicated in the following claims.

It is understood that the present disclosure extends to all alternative combinations of one or more of the individual features mentioned, evident from the text and/or drawings, and/or inherently disclosed. All of these different combinations constitute various alternative aspects of the present disclosure and/or components thereof. The embodiments described herein explain the best modes known for practicing the apparatuses, methods, and/or components disclosed herein and will enable others skilled in the art to utilize the same. The claims are to be construed to include alternative embodiments to the extent permitted by the prior art.

While the tiles 20, reinforced tiles 120, support structure 30, spine 34, rail 36, roof support structure 30', inner member 40 and/or pedestal 50, retaining element 60, 60', and/or components thereof and/or methods of using same have been described in connection with preferred aspects and specific examples, it is not intended that the scope be limited to the particular embodiments and/or aspects set forth, as the embodiments and/or aspects herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

It should be noted that the present disclosure is not limited to the specific embodiments pictured and described herein, but are intended to apply to all similar apparatuses and methods for arranging, securing, engaging tiles 20 and/or reinforced tiles 120, and/or otherwise providing any of the features and/or advantages of any aspect of the present disclosure. Modifications and alterations from the described embodiments will occur to those skilled in the art without departure from the spirit and scope of the present disclosure.

What is claimed is:

1. A tile system comprising:
   a support structure;
   a support structure spine extending upward from the support structure;
   a first support structure rail extending perpendicularly outward from the support structure spine;
   a second support structure rail opposite the first support structure rail extending perpendicularly outward from the support structure spine
   a pair of flanges separated by and extending outward from the support structure spine:
   a pair of side members extending downward from respective ends of the pair of flanges opposite the spine;
   a lip formed on each pair of side members of the support structure and configured for engagement by a corresponding pedestal rail of a pedestal to attach the support structure to the pedestal; and
a tile comprising a first face, a second face opposite the first face, a plurality of side edges extending between the first face and the second face, and a groove formed in at least one of the plurality of side edges;
wherein the groove of the at least one of the plurality of edges of the tile is configured for engagement by the first support structure rail of the support structure;
wherein the support structure further comprises a bottom member extending between the pair of side members to define a cavity in the support structure, wherein the cavity is formed by the pair of flanges on a top of the cavity, the pair of side members on opposite sides of the cavity. and the bottom member on a bottom of the cavity.

2. The tile system of claim 1, wherein the tile further comprises a protrusion formed on at least two of the plurality of side edges that are opposite each other configured to provide a spaced relation between adjacent tiles.

3. The tile system of claim 1, wherein the tile further comprises a groove formed in two of the plurality of side edges that are opposite of each other.

4. The tile system of claim 3, wherein the first support structure rail and the second support structure rail are configured to provide a spaced relation in a first direction between adjacent tiles.

5. The tile system of claim 4, wherein adjacent tiles are configured in a spaced relation in a second direction between adjacent tiles.

6. The tile system of claim 5, wherein the tile further comprises a protrusion formed on at least two of the plurality of side edges that are opposite each other configured to provide the spaced relation in the second direction between the adjacent tiles.

7. The tile system of claim 5, and further comprising an element with an element spine, a first element rail extending perpendicularly outward from the element spine, and a second element rail opposite the first element rail extending perpendicularly outward from the element spine configured to provide the spaced relation in the second direction between the adjacent tiles.

8. The tile system of claim 1, wherein the pedestal further comprises an adjustment portion connecting the pedestal base to the pedestal upper surface, wherein the adjustment portion is combined to the pedestal upper surface and is in threaded engagement with the pedestal base for adjusting a height of the pedestal; wherein the pedestal further comprises a pair of pedestal spines extending upward from the pedestal upper surface each of which having a pedestal rail oriented perpendicular to the pedestal spine and projecting inward toward each other; wherein an orientation of the pair of pedestal spines is rotated with the pedestal upper surface due to the threaded engagement of the adjustment portion to the pedestal base; wherein the pedestal upper surface is generally planar in shape; and wherein the pair of pedestal spines are spaced inward from the outer perimeter of the pedestal upper surface and in a spaced relation from each other corresponding to a width of the support structure.

9. The tile system of claim 8, wherein the tile further comprises a groove formed in two of the plurality of side edges that are opposite of each other; wherein the first support structure rail and the second support structure rail are configured to provide a spaced relation in a first direction between adjacent tiles; and further comprising an element with an element spine, a first element rail extending perpendicularly outward from the element spine, and a second element rail opposite the first element rail extending perpendicularly outward from the element spine configured to provide the spaced relation in the second direction between the adjacent tiles.

10. The tile system of claim 1, and further comprising a pedestal comprising a pedestal upper surface and a pedestal base configured to engage an underlying structure; wherein the support structure is configured for attachment to the pedestal upper surface.

11. The title system of claim 10, wherein the pedestal further comprises a pair of pedestal spines extending upward from the pedestal upper surface each of which having a pedestal rail oriented perpendicular to the pedestal spine and projecting inward toward each other.

12. The file system of claim 11, wherein the support structure further comprises a lip formed on each side of the support structure and configured for engagement by the corresponding pedestal rail to attach the support structure to the pedestal.

13. The tile system of claim 12, wherein the support structure further comprises a pair of flanges separated by and extending outward from the spine of the support structure, and a pair of side members extending downward from respective ends of the pair of flanges opposite the spine, and the lip formed on each of the pair of side members.

14. The tile system of claim 13, wherein the pair of flanges each further comprise a trough positioned between the spine and the end of the flange.

15. The tile system of claim 11, wherein the pedestal further comprises an adjustment portion connecting the pedestal base to the pedestal upper surface, wherein the adjustment portion is combined to the pedestal upper surface and is in threaded engagement with the pedestal base for adjusting a height of the pedestal.

16. The tile system of claim 15, wherein an orientation of the pair of pedestal spines is rotated with the pedestal upper surface due to the threaded engagement of the adjustment portion to the pedestal base.

17. The tile system of claim 16, wherein the pedestal upper surface is generally planar in shape, wherein a height of the pair of pedestal spines is defined by a distance from the pedestal upper surface to a distal end of each of the pair of pedestal spines.

18. The tile system of claim 16, wherein the pair of pedestal spines are spaced inward from the outer perimeter of the pedestal upper surface and in a spaced relation from each other corresponding to a width of the support structure.

19. The file system of claim 17, wherein the pedestal rail of each of the pair of pedestal spines is spaced from the pedestal upper surface.

20. The tile system of claim 12, wherein each flange of the pair of flanges extends outward from the support structure spine in each direction and is spaced downward from each of the respective first support structure rail and the second support structure rail, wherein each flange of the pair of flanges comprises a first surface extending from the support structure spine and an upper lip having an upward facing flat surface to present a level, coplanar surface comprising of the first surface and the upper lip upon which the second face of adjacent tiles set with adjacent tiles being separated by the support structure spine, and a trough between the upper lip and the first surface.

21. The tile system of claim 20, wherein the lip formed on each pair of side members of the support structure is positioned at the bottom thereof to attach the support structure to the pedestal rail of the pedestal.

\* \* \* \* \*